United States Patent
Mochizuki

(10) Patent No.: US 6,850,239 B2
(45) Date of Patent: Feb. 1, 2005

(54) 3-D CHARACTER DATA GENERATING DEVICE AND A 3-D GRAPHICS DATA GENERATING DEVICE

(75) Inventor: Yoshiyuki Mochizuki, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 459 days.

(21) Appl. No.: 10/000,129

(22) Filed: Dec. 4, 2001

(65) Prior Publication Data

US 2002/0105515 A1 Aug. 8, 2002

(30) Foreign Application Priority Data

Dec. 5, 2000 (JP) ........................................ 2000-369563

(51) Int. Cl.[7] .............................................. G06T 11/00
(52) U.S. Cl. ........................ 345/467; 345/470; 345/419
(58) Field of Search ................................. 345/467, 468, 345/469, 470, 472, 472.3, 419, 422, 423, 581, 582

(56) References Cited

U.S. PATENT DOCUMENTS

| 4,907,282 A | * | 3/1990 | Daly et al. | 345/472 |
| 5,805,783 A | * | 9/1998 | Ellson et al. | 345/468 |
| 6,677,944 B1 | * | 1/2004 | Yamamoto | 345/422 |

FOREIGN PATENT DOCUMENTS

| JP | 63-103380 | 5/1988 |
| JP | 11-53579 | 2/1999 |
| JP | 11-053578 | 2/1999 |

* cited by examiner

Primary Examiner—Matthew Luu
(74) Attorney, Agent, or Firm—Wenderoth Lind & Ponack, L.L.P.

(57) ABSTRACT

A form analyzing unit receives 2-D outline data stored in an outline data storing unit via an outline data obtaining unit, and judges from the received 2-D outline data whether an outline of a character includes an outline of a hole formed in the character. If so, a top/bottom dividing unit divides an area surrounded by the two outlines into convex polygons. A side generating unit moves each divided structure element in a z-axis direction to generate a side plane of the 3-D character, and generates 3-D data for the character.

32 Claims, 27 Drawing Sheets

FIG. 6
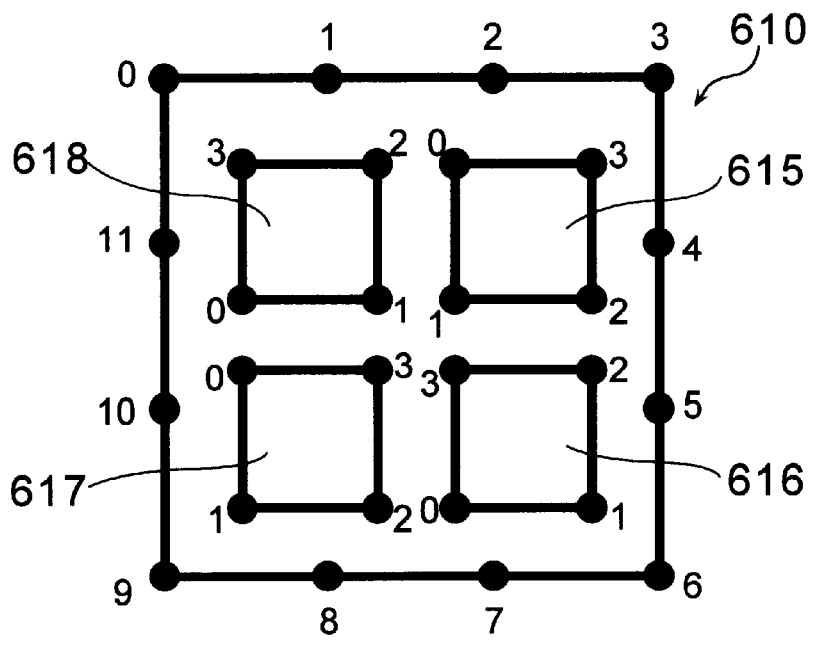
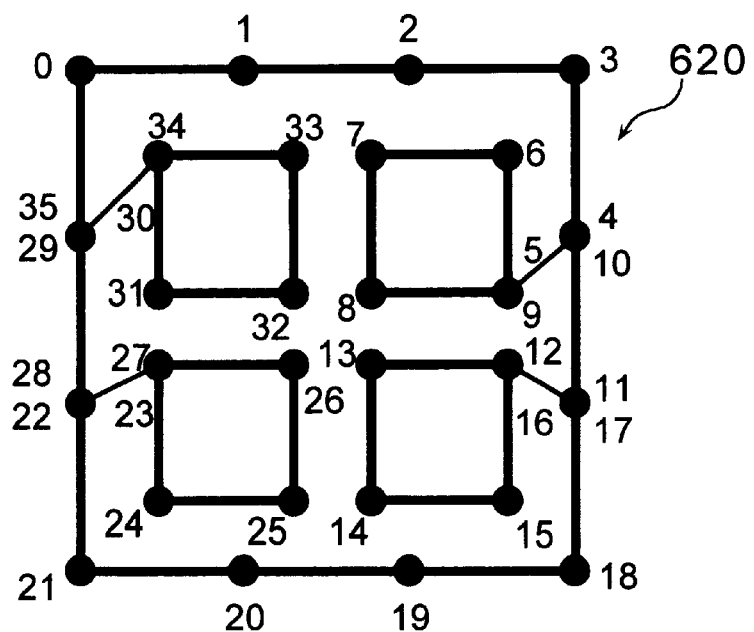

BEVEL PATTERN 1

BEVEL PATTERN 3
(THREE STAGES)

NON-BEVEL TYPE

BEVEL PATTERN 2

FIG. 19
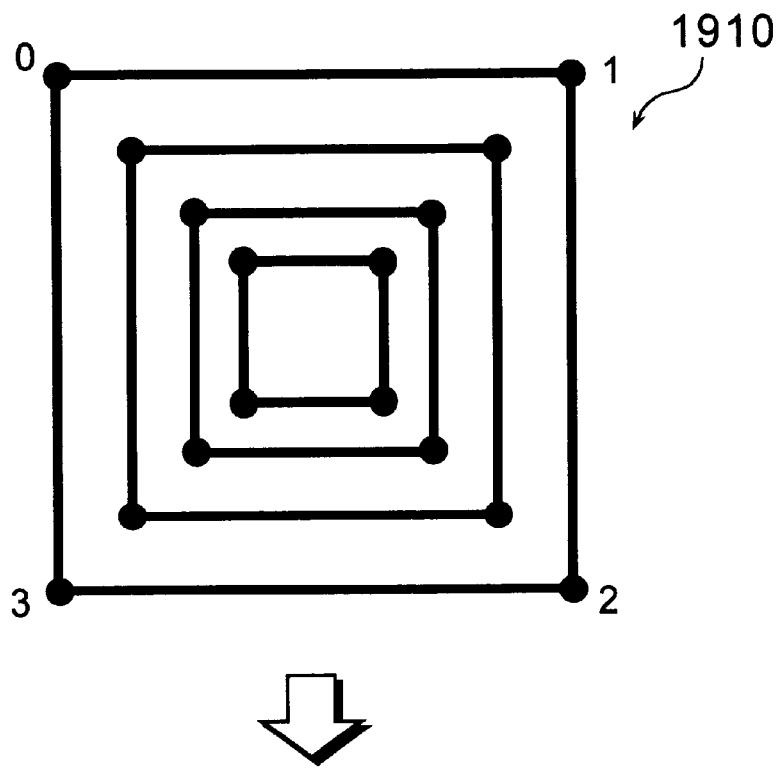
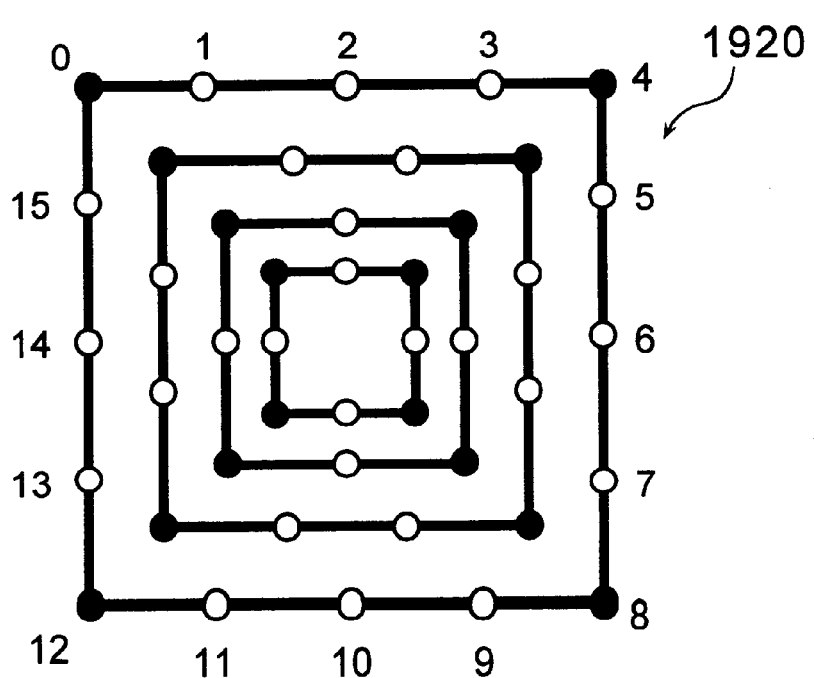

3-D CHARACTER DATA GENERATING DEVICE AND A 3-D GRAPHICS DATA GENERATING DEVICE

TECHNICAL FIELD

The present invention relates to a three-dimensional (3-D) data generating device for generating 3-D data showing 3-D representation from 2-D data which shows 2-D representation of characters and the like by using their outlines. The present invention particularly relates to a 3-D character data generating device and a 3-D graphics data generating device for characters and graphics.

BACKGROUND ART

A conventional 3-D character data generating device is disclosed, for instance, in Japanese Laid-Open Patent Application No. 63-103380, "3-D Character Generating Device". The following describes this device as the first conventional technique with reference to FIG. 1.

A 2-D character input unit 140 inputs a 2-D character, which is stored in a storing unit 120 as a character on an x-y plane. Based on the inputted 2-D character, a 3-D character form is designed by a user's operation of a z-direction correcting unit 130. During this operation, the user views the display unit 110. A z coordinate of each point of the character is changed on an x-z projection face 112 and a y-z projection face 113 to convert the inputted 2-D character to a 3-D character. The 3-D character on which such correction is being made is displayed on a 3-D projection face 114 for viewing. An area background input unit 150 inputs image data. Based on this image data, an image is added onto the surface of the 3-D character stored in the storing unit 120, and the image-applied 3-D character is displayed on the 3-D projection face 114. In this technology, however, a 3-D character is generated not automatically but through adjustments made by the user using the x-z projection face 112 or the y-z projection face 113.

A technique aiming to generate 3-D characters automatically is disclosed, for instance, by Japanese Laid-Open Patent Application No. 11-53578, "Form Converting Method, a Recording Medium Storing a Procedure of the Converting Method, and a Form Converting Device". With this second conventional technique, only side planes of a character are generated based on outline data representing a character form in the 2-D plane. This conventional technique therefore does not generate an entire 3-D character and only generates part of the 3-D character.

Japanese Laid-Open Patent Application No. 11-53579 discloses "Form Converting Method, a Recording Medium Storing the Conversion Procedure, and a Form Converting Device". According to this third conventional technique, a 2-D bitmapped font character is inputted, and each set of bit data constituting the bitmapped font character is corrected to a 3-D form. The sets of bit data are then synthesized to produce the whole character in the 3-D form. Such bitmapped font character, however, is likely to have a coarse outline. It is therefore necessary to use a bitmapped font using many bits for each character so as to minimize the coarse outline of the character.

According to the first conventional technique, 3-D characters are manually generated, which increases an operator's operational load and takes a great processing time. The first conventional technique therefore cannot generate 3-D characters in real time. The second conventional technique tries to generate 3-D characters automatically, but this technique only generates data representing a side plane of a 3-D character without generating front and back planes of the character, which are important elements for 3-D character-representation. The data generated by the second conventional technique is therefore incomplete and not useful. The third conventional technique can provide 3-D characters. However, as it generates 3-D characters from bitmapped data, resulting 3-D characters have a coarse outline. When these characters are used in computer graphics (CG), outlines of these characters become coarser through the CG operation, so that the quality of the characters considerably decreases. In addition, when all the bitmapped data is converted into 3-D characters of a certain quality, a great amount of data is required.

DISCLOSURE OF INVENTION

The present invention is made to solve the above problems and aims to provide a device capable of easily generating high-quality 3-D data. More specifically, the present invention aims to provide a device that can automatically generate 3-D data by using 2-D outline data regarding a character and graphics in real time. In addition, this device can generate 3-D data that represents characters and graphics of far higher quality than a 3-D data generating device based on bitmapped font characters and graphics. The device of the present invention is also capable of providing a variety of texture patterns on the surfaces of the 3-D characters and graphics. Moreover, the present invention is capable of generating a 3-D character provided with a base below and a 3-D character engraved on a base. In this way, the present invention provides a 3-D character data generating device capable of representing a variety of 3-D characters.

The above objects can be achieved by a 3-D character data generating device for generating 3-D character data from 2-D character data. This 3-D character data generating device includes: an outline specifying unit for specifying: (a) a first outline that is an outline of a character part included in a character; and (b) a second outline that is an outline of a hole formed in the character, in accordance with the 2-D character data; an inclusion relation specifying unit for specifying a first outline of a character part, which bears inclusion relation to the specified second outline and exists nearest the hole, wherein the inclusion relation shows that the first outline includes the second outline; a dividing unit for dividing an area enclosed by the first outline specified by the inclusion relation specifying unit into polygons, wherein the area excludes a portion enclosed by the hole, wherein the dividing unit also divides a whole area enclosed by a first outline that is not specified by the inclusion relation specifying unit; and a side generating unit for moving a duplicate of the character part containing the divided area, and generating a side plane based on vertexes of the duplicate and vertexes of the original character part.

For this construction, the present device is capable of automatically generating 3-D character data, which has much higher quality than 3-D character data based on bitmapped fonts, in real time without giving too much operational load to operators.

Here, the 2-D character data may be outline data that is defined in a 2-D plane provided with coordinates to show the first and second outlines. The outline specifying unit may: (a) obtain the outline data; (b) distinguish the first outline data from the second outline data in the obtained outline data; and (c) specify the first and second outlines in accordance with the first and second outline data, respectively.

Here, the dividing unit may regard, as a structure element, (a) the area which is enclosed by the first outline specified by the inclusion relation specifying unit and (b) the whole area enclosed by the first outline that is not specified by the inclusion relation specifying unit, divide each structure element into convex polygons, and generate structure element data showing the divided structure element.

Here, the side generating unit may move a duplicate of the divided structure element in a direction perpendicular to the 2-D plane, and generate side data representing a side plane in accordance with vertexes of the duplicate and vertexes of the original structure element.

Here, the first outline data may contain a sequence of points, which represent the first outline and are arranged either clockwise or counterclockwise, and the second outline data may contain a sequence of points, which represent the second outline and are arranged in a direction opposite to a direction in which the sequence of points representing the first outline are arranged. The outline specifying unit may make the distinction based on a direction of each sequence of points.

Here, the inclusion relation specifying unit may include: a first detecting unit for detecting a first rectangle that surrounds a first outline; a second detecting unit for detecting a second rectangle that surrounds the second outline; a first specifying unit for comparing each detected first rectangle with the detected second rectangle, and specifying at least one first rectangle which surrounds the second rectangle; a second specifying unit for specifying a first outline surrounded by an innermost first rectangle out of the at least one first rectangle; and a relation information generating unit for regarding the specified first outline as a sole first outline surrounding the second outline, and generating inclusion relation information showing inclusion relation between the sole first outline and the second outline.

Here, the inclusion relation specifying unit may include: a first detecting unit for detecting a first rectangle that surrounds a first outline; a second detecting unit for detecting a second rectangle that surrounds the second outline; a length detecting unit for detecting a shortest distance out of: (a) a length from a barycenter of the second rectangle to a side of the first rectangle; and (b) a length from the barycenter to a point in a sequence of points related to a character part corresponding to the detected first rectangle; and a relation information generating unit for: (a) selecting a shortest length out of shortest lengths detected by the length detecting unit for every character part making up the character; (b) judging that a first outline related to the selected shortest length is a sole first outline containing the second outline; and (c) generating inclusion relation information showing inclusion relation between the sole first outline and the second outline.

With this construction, a character represented by its outline is geometrically analyzed to clearly specify the character construction. This allows each character part of the character to be represented in 3-D. This is to say, the present device makes it clear whether a 3-D character has a hierarchical construction, and is therefore capable of generating 3-D representations with high definition, for which each character is divided, when character graphics or animation are edited.

Here, the above 3-D data character data generating device may further include a texture coordinate generating unit for: (a) generating a smallest square enclosing the top and bottom planes of the structure element; (b) translating the smallest square in a manner that the smallest square encloses sequences of points defining the top and bottom planes; (c) specifying each coordinate of the translated smallest square; (d) dividing each specified coordinate by a length of a side of the square; (e) regarding each divided coordinate as a mapping coordinate; (f) calculating a first ratio between a total of lengths between every two consecutive points in a sequence of points defining the generated side plane, and a total of lengths between every two consecutive points out of points that start with a starting point of the sequence and end with a given point; (g) calculating a second ratio between a height from the bottom plane to the top plane, and a height of a given point; and (h) generating texture coordinates based on the first ratio and the second ratio.

This construction generates texture coordinates, and therefore a variety of texture patterns can be applied to the surface of a 3-D character.

Here, the above 3-D character data generating device may further include a data interpolating unit for:(a) dividing, by a predetermined value, an average length between two consecutive points in the sequence of points, which are included in either the first outline data or the second outline data, so that a standard length is produced; and (b) interpolating at least one intermediate point between two consecutive points so as to make a length between the two consecutive points either equal to or shorter than the standard length.

Here, the above 3-D character data generating device may further include a re-dividing unit for re-dividing the convex polygons produced by the dividing unit.

For this construction, intermediate points are interpolated into character and hole outline point sequences, and divided polygons are re-divided into finer polygons. This can raise the quality of 3-D characters.

The above objects can be also achieved by a 3-D character data generating device, including: a receiving unit for receiving a character code and a base code, which are associated with a character and a base, respectively; a character/base form storing unit for storing outline data of the character, and storing 3-D data of the base; a character/base form obtaining unit for obtaining the stored outline data and the stored 3-D data according to the received character code and base code; a character analyzing unit for: (a) analyzing inclusion relation between an outline of the character and an outline of a hole formed in the character in accordance with the obtained outline data, wherein the inclusion relation shows that the outline of the character includes the outline of the hole; (b) specifying a structure element of the character; and (c) calculating a condition that allows the character to lie on a top plane of the base; a base form generating unit for converting the 3-D data in accordance with the calculated condition; a top/bottom dividing unit for dividing each specified structure element into convex polygons; and a character side generating unit for moving each divided structure element to generate a top plane, a bottom plane, and a side plane of the character in 3-D.

The above objects can be also achieved by a 3-D character data generating device, including: a receiving unit for receiving a character code and a base code, which are associated with a character and a base, respectively; a character/base form storing unit for storing outline data of the character, and outline data of the base; a character/base form obtaining unit for obtaining the stored outline data of the character, and the stored outline data of the base according to the received character code and base code; a character/base analyzing unit for: (a) analyzing inclusion relation between an outline of the character and an outline of a hole formed in the character in accordance with the obtained outline data of the character, wherein the inclusion relation shows that the outline of the character includes the outline of the hole; (b) specifying a structure element of the character; (c) analyzing inclusion relation between an outline of the base and an outline of a hole formed in the base, in accordance with the obtained outline data of the base, wherein the inclusion relation shows that the outline of the base includes the outline of the hole; (d) specifying a structure element of the base; and (e) calculating a condition that allows the character to lie inside the outline of the base; a character/base dividing unit for: (a) dividing each specified structure element into convex polygons; (b) converting data representing each structure element of the base in accordance with the calculated condition; and (d) dividing each structure element related to the converted data into convex polygons; and a character/base generating unit for moving each divided structure element to generate top planes, bottom planes, and side planes of the character and the base in 3-D.

Here, the character/base generating unit may generate the side planes having a bevel form.

The above objects can be also achieved by a 3-D character data generating device, including: a receiving unit for receiving a character code and a base code, which are associated with a character and an engraved base, respectively; a character/base form storing unit for storing outline data of the character, and outline data of the engraved base; a character/base form obtaining unit for obtaining the stored outline data of the character, and the stored outline data of the engraved base according to the received character code and base code; a character/base analyzing unit for:(a) analyzing inclusion relation between an outline of the character and an outline of a hole formed in the character in accordance with the obtained outline data of the character, wherein the inclusion relation shows that the outline of the character includes the outline of the hole; (b) specifying a structure element of the character; (c) calculating a condition that allows the character to lie inside the outline of the engraved base; (d) converting the outline data of the engraved base in accordance with the calculated condition; (e) analyzing inclusion relation between the outline of the engraved base and a hole formed in the engraved base in accordance with the converted outline data, wherein the inclusion relation shows that the outline of the engraved base includes the outline of the hole; (f) specifying a structure element of a bottom plane of the engraved base; (g) regarding a sequence of points representing the character outline as a sequence of points representing a hole outline, and regarding a sequence of points representing the hole outline as a sequence of points representing a character outline, so that new outline data of the character is generated; (h) combining the new outline data with the converted outline data of the engraved base, so that combination outline data is generated; and (i) analyzing inclusion relation between an outline related to the converted outline data and an outline related to the new outline data in accordance with the combination outline data to specify a structure element of a top plane of the engraved base; a character/base dividing unit for dividing each structure element specified by the character/base analyzing unit into convex polygons; and a character/base side generating unit for moving each divided structure element of the engraved base to generate the top plane, the bottom plane, and a side plane, and moving the structure element of the top plane of the character by a predetermined depth to generate a bottom surface and a side surface of a pit portion of the engraved base.

Here, the character/base side generating unit may generate the side planes having a bevel form.

With this construction, a character provided with a base below or an engraving in which a character is engraved can be generated. In addition, a variety of bevel shapes can be generated as a side plane of such character and base. As a result, a variety of types of 3-D characters can be flexibly generated in accordance with necessity. The above objects can be also achieved by a 3-D graphics data generating device for generating 3-D graphics data from 2-D graphics data, including: an outline specifying unit for specifying: (a) a first outline that is an outline of a graphic part included in a graphic; and (b) a second outline that is an outline of a hole formed in the graphic, in accordance with the 2-D graphic data; an inclusion relation specifying unit for specifying a first outline of a graphic part, which bears inclusion relation to the specified second outline and exists nearest the hole, wherein the inclusion relation shows that the first outline includes the second outline; a dividing unit for dividing an area enclosed by the first outline specified by the inclusion relation specifying unit into polygons, wherein the area excludes a portion enclosed by the hole, wherein the dividing unit also divides a whole area enclosed by a first outline that is not specified by the inclusion relation specifying unit; and a side generating unit for moving a duplicate of the graphic part containing the divided area, and generating a side plane based on vertexes of the duplicate and vertexes of the original graphic part.

For this construction, the present device is capable of automatically generating 3-D graphic data in real time by using outline data of a 2-D graphic without giving operational load to operators even when a hole is formed in the graphic. In addition, the 3-D graphic generated by the 3-D data of the present device has much higher quality than a 3-D graphic that is generated based on a bitmapped font.

As is clear from the above explanation, the present invention brings about huge and novel effects.

In order to achieve the above objects, the present invention may be embodied as a method, such as a 3-D character data generating method and a 3-D graphics data generating method, including steps of the processing performed by characteristic units of the above devices of the present invention,. The present invention may be also embodied as a program including these steps. Such program may be stored not only in ROM (read only memory) of a 3-D character data generating device and a 3-D graphics data generating device, but also in a recording medium, such as a CD-ROM disc, to be distributed. The program may be also distributed via a communication network and other transmission media.

BRIEF DESCRIPTION OF DRAWINGS

These and the other objects, advantages and features of the invention will become apparent from the following description thereof taken in conjunction with the accompanying drawings which illustrate a specific embodiment of the invention.

In the drawings:

FIG. 6 shows a state in which a first connecting method is applied to the Chinese character "田", and numbers are reassigned to a point sequence representing the character;

FIG. 19 shows an example where intermediate points are interpolated between two points for the character "回";

BEST MODE FOR CARRYING OUT INVENTION

The following specifically describes the present invention based on the first to sixth embodiments with reference to figures.

First Embodiment

Figure 1:
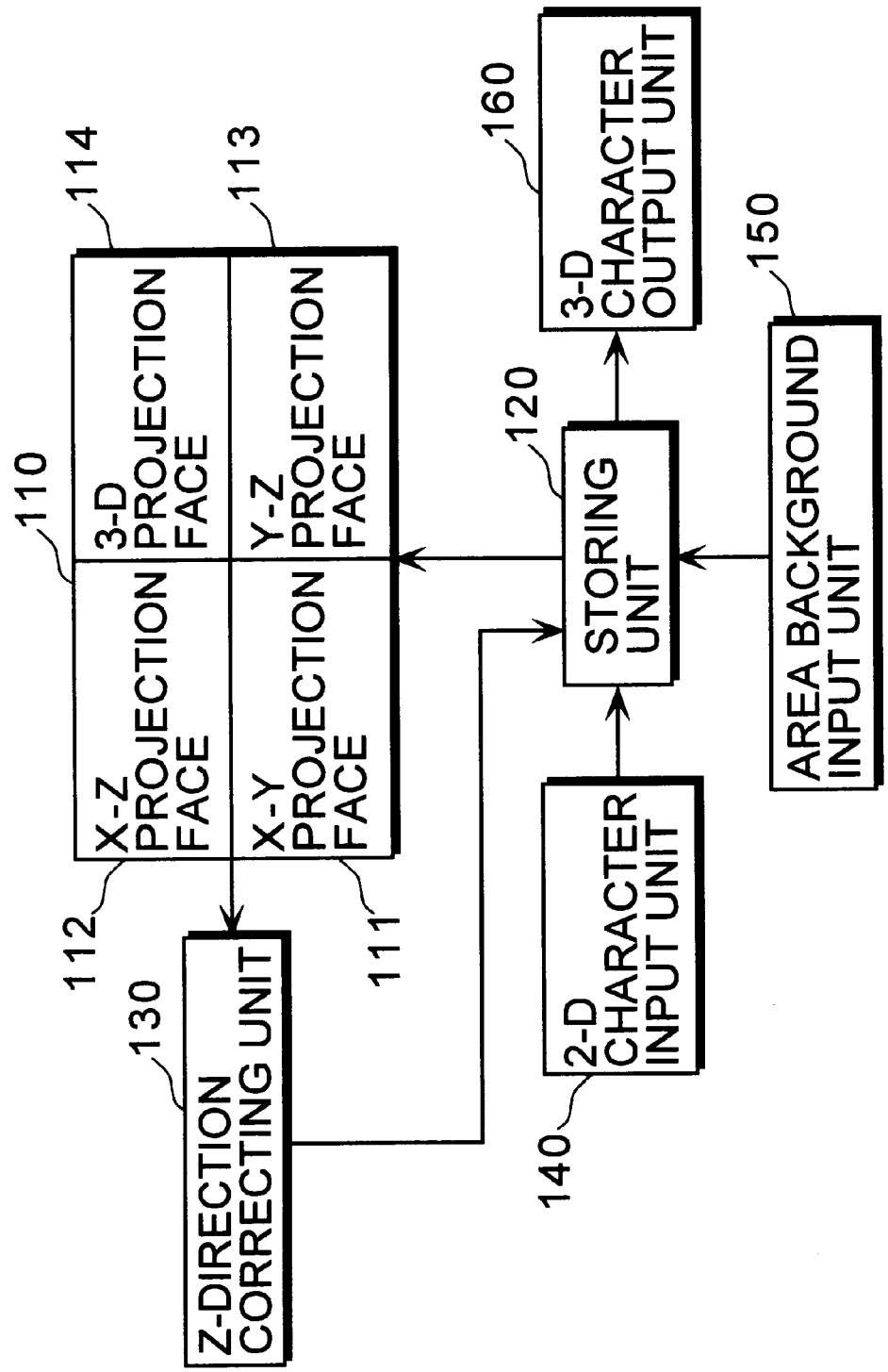
FIG. 1 is a block diagram showing a function configuration of a conventional device for generating a 3-D character.
Figure 2:
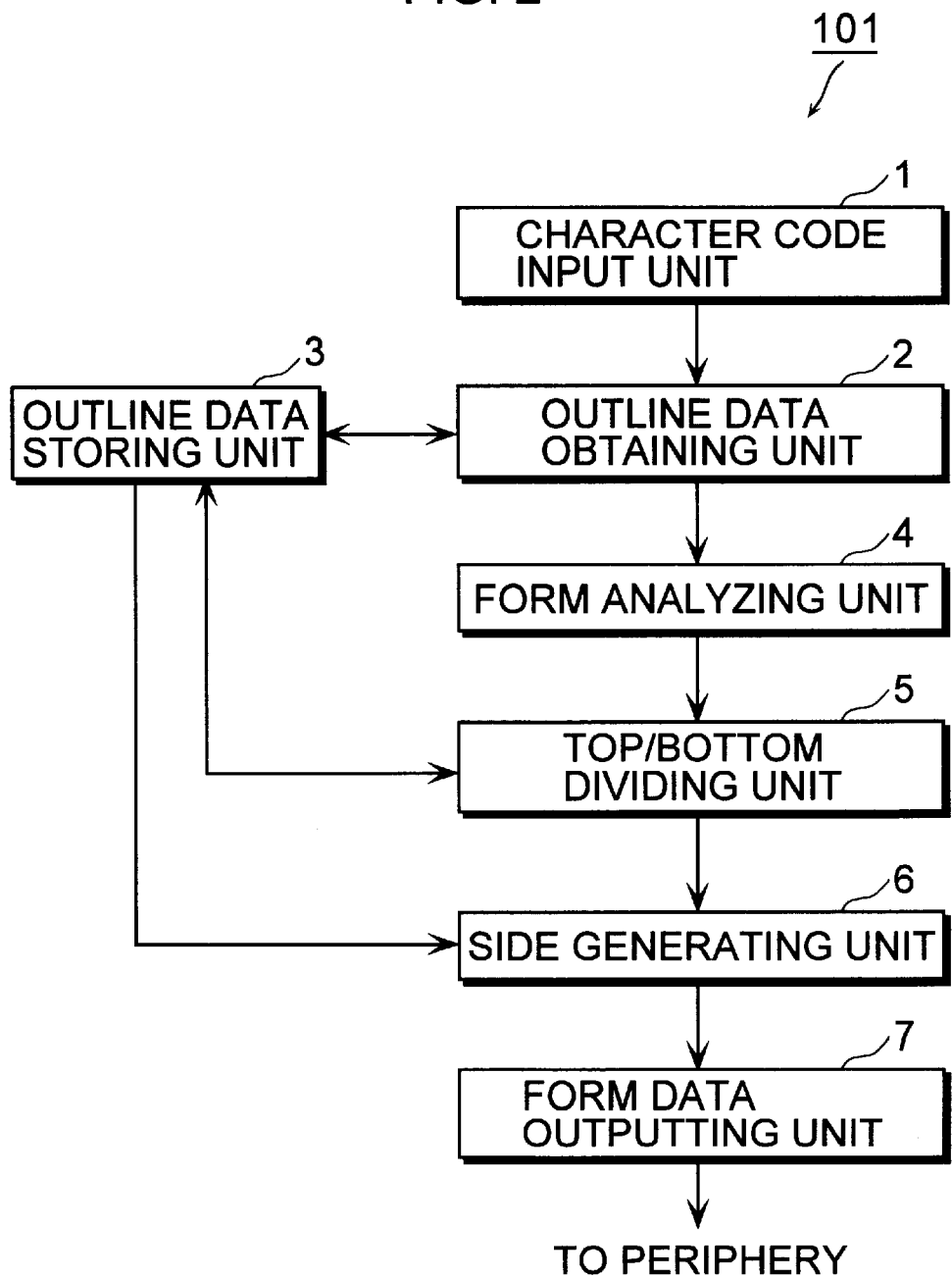
FIG. 2 is a block diagram showing a function configuration of a 3-D character data generating device of the first embodiment according to the present invention.

FIG. 2 is a block diagram showing a function configuration of a 3-D character data generating device 101 according to the first embodiment. The 3-D character data generating device 101 comprises a character code input unit 1, an outline data obtaining unit 2, an outline data storing unit 3, a form analyzing unit 4, a top/bottom dividing unit 5, a side generating unit 6, and a form data output unit 7.

The character code input unit 1 is an input unit, such as a keyboard and a mouse, and converts an input signal to generate a character code and a graphics symbol code such as an ASCII (American Standard Code for Information Interchange) code and a JIS (Japanese Industrial Standard) code. The generated character code is outputted to the outline data obtaining unit 2.

The outline data obtaining unit 2 obtains, from the outline data storing unit 3, outline data corresponding to the character code outputted by the character code input unit 1.

The outline data storing unit 3 stores outline data associated with character codes and font types. The same characters in different fonts are associated with different outline data. This is to say, the outline data storing unit 3 stores outline data associated with character codes and font types. Outline data obtained by the outline data obtaining unit 2 is outputted to the form analyzing unit 4.

Each set of the outline data includes the following information: a total number of points; an identifier specifying a curve type; coordinate data for a starting point (coordinates indicated in the outline data are represented by x-y coordinates in 2D); an identifier specifying a method for connecting the points (such as a method for connecting them with a straight line or a method with a curve); and point sequence coordinate data which shows coordinates of a sequence of points (or control points) that form an outline of a character. This one set of outline data corresponds to a character part (described later) that makes up a character, and therefore sets of outline data corresponding to the total number of character parts making up the character form one group.

Two points are usually connected with either a straight line or a 2-D B-spline curve. When different B-spline curves are connected, a continuous curve is formed. When points are connected with a straight line, corresponding point sequence coordinate data indicates two endpoints. When points are connected with a curve, corresponding point sequence coordinate data indicates control points for forming the curve. When a starting point and an endpoint are connected, a closed curve is formed. Such closed curve represents an outline curve of a character. Note that the point sequence coordinate data in the outline data indicates x-y coordinates for the present embodiment. For representation of a 3-D character, a z-coordinate axis is used to indicate a height direction.

Some characters contain a hole and thus have a "torus" construction. Accordingly, there are two types of point sequences in the outline data, namely, a point sequence that forms a character outline and a point sequence that forms an outline of a hole in the character. Hereafter, the former is called a "character outline point sequence" and the latter is called a "hole outline point sequence".

Other characters, such as a Chinese character "回", may be made up of different "character parts". A character part refers to a part that is not connected to any other part of the character. For instance, the above character "回" is made up of an outer character part "口" and an inner character part "口". A Russian character "ё" is made up of three character parts, that is, two dots of "•" and "е". Each character part therefore has one character outline point sequence, and some character parts may contain one or more hole outline point sequences.

In order to differentiate a character outline point sequence from a hole outline point sequence, these points are arranged in opposite directions. For the present embodiment, this differentiation is made in the outline data storing unit 3 that stores the point sequence coordinate data in such a way that a character outline point sequence is traced clockwise and a hole online point sequence is traced counterclockwise. Note that there is no rule in this combination of a direction and an outline point sequence. It is alternatively possible to provide an identifier to differentiate the two types of point sequences although this would increase the data amount stored in the outline data storing unit 3.

Figure 3:
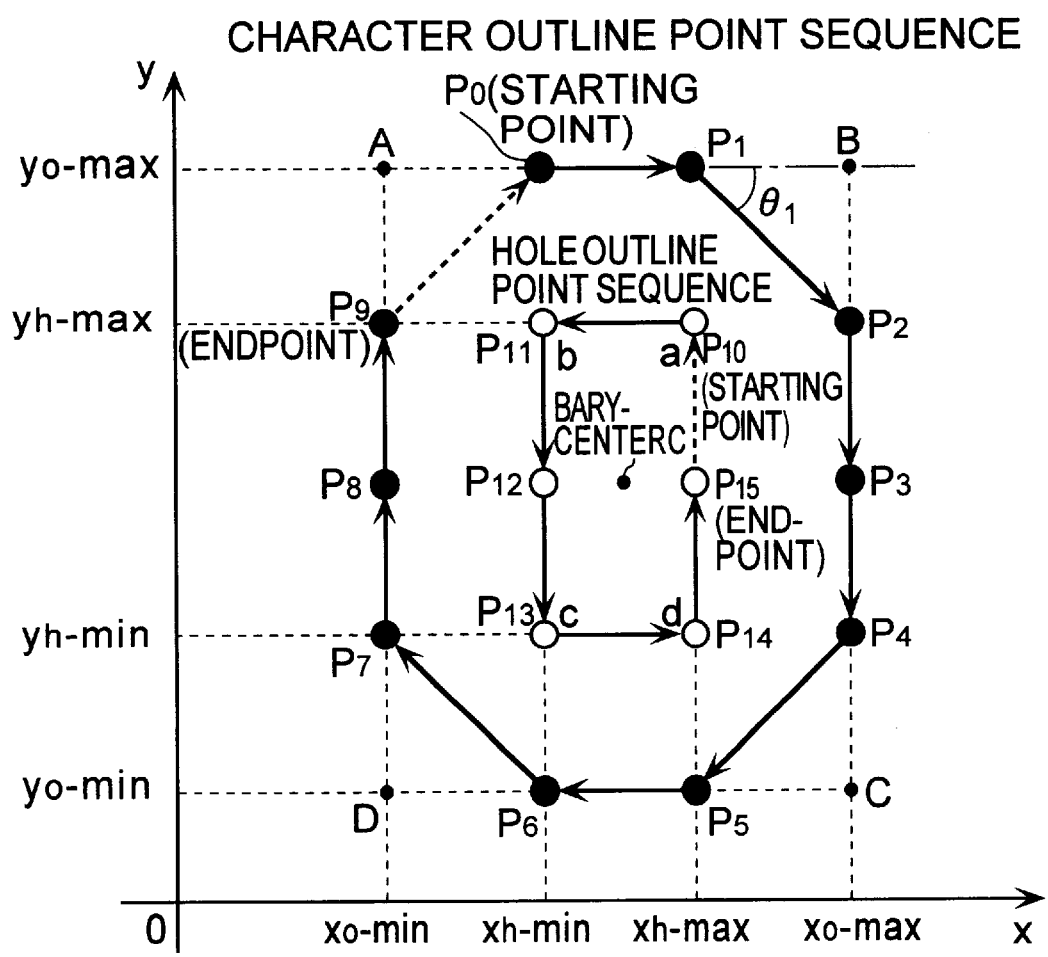
FIG. 3 shows how to trace a character outline point sequence and a hole outline point sequence.

FIG. 3 shows how character and hole outline point sequences are traced as stated above. In this figure, the character outline point sequence is represented by black points "P0" to "P9" arranged clockwise, and the hole outline point sequence is represented by white dots "P10" to "P15" arranged counterclockwise.

The form analyzing unit 4 judges whether the point sequence coordinate data in the outline data corresponding to the received character code is for the character outline point sequence or the hole outline point sequence. The following describes this judgment procedure with reference to FIG. 3.

(1) When the point sequence obtained from the outline data is made up of points "P0", "P1", . . . "Pn", find an angle "θi+1" that forms an inner product with respect to two adjacent vectors "PiPi+1" and "Pi+1Pi+2", which are generated form the point sequence. (Here, i=0, 1, . . . n; and Pn+1=P0, with this being the case for the following explanation.) In a case of a vector "P0P1" and a vector "P1P2", for instance, an angle "θ1" forms an inner product.

(2) Find a cross product of these two vectors related to the angle "θi+1". Add a plus sign when the cross product is a positive value. Add a minus sign when the cross product is a negative value. A total of angles "θi+1" calculated in order becomes ±2π.

(3) Find the total of the angles "θi+1" that form signed inner products obtained in (1) and (2). Judge that the point sequence coordinate data is for the character outline arranged clockwise if the total is −2π. Judge that the point sequence coordinate data is for the hole outline arranged counterclockwise if the total is +2π.

When the above judgment in (3) shows that the character is made up of character outline point sequences only, operation below for finding a "boundary box" is performed, and form analyzing information (described later) and the outline data are outputted to the top/bottom dividing unit 5. When both a character outline point sequence and a hole outline point sequence exist for the character, inclusion relation between these outline point sequences is analyzed as described later.

The following describes the operation for specifying a boundary box for a character outline point sequence with reference to an example for a number "0" as shown in FIG. 3.

(1) Among the character outline point sequence, specify a minimum value "xo-min" and a maximum value "xo-max" in x coordinates, and a minimum value "yo-min" and a maximum value "yo-max" in y coordinates.

(2) Specify a quadrangle "ABCD" formed by four points consisting of a point "A" (xo-min, yo-max), a point "B" (xo-max, yo-max), a point "C" (xo-max, yo-min), and a point "D" (xo-min, yo-min) which are based on the minimum and maximum values obtained in the above (1). This quadrangle "ABCD" is regarded as a boundary box. Note that, for the present embodiment, the four vertexes "A" to "D" are arranged clockwise to make it agreeable with the order in which points of a character outline point sequence are arranged, although vertexes are usually arranged counterclockwise in mathematical notation.

(3) Calculate a length "L", that is, one-half the total lengths of sides of the boundary box "ABCD" by calculating "L=side AB+side BC".

After the above operation, the following information is stored in the outline data storing unit 3: point sequence coordinate data; a number of boundary boxes; coordinates of four vertexes of each boundary box (or coordinates "xo-min", "xo-max", "yo-min", and "yo-max"); and total lengths of all the sides. Similarly for a hole outline point sequence, four coordinates "xh-min", "xh-max", "yh-min", and "yh-max" that form a boundary box "abcd" are specified and stored in the outline data storing unit 3.

For instance, the character "回" is formed by two character outline point sequences for the outer part "口" and the inner part "口", and these two outline point sequences form one group. The character "回" is also formed by two hole outline point sequences for two holes in the outer part "口" and the inner part "口", which form another point sequence group. Accordingly, for the character "回", two boundary boxes "ABCD" are generated based on the two character outline point sequences, and two boundary boxes "abcd" are generated based on the two hole outline point sequences.

After this, inclusion relation judgment is made to specify inclusion relation between the group of character outline point sequences and the group of hole outline point sequences. This judgment is made for four coordinates that make up a boundary box of each hole outline point sequence as described below.

Inclusion Relation Judgement

When the inequalities below are satisfied, a hole outline indicated in the inequalities is judged to be included in a character outline indicated in the inequalities. Otherwise, the hole outline is judged to not be included in the character outline.

Inequalities: xo-min<xh-min<xh-max<xo-max and yo-min<yh-min<yh-max<yo-max

This judgment result may indicate that a single hole outline point sequence is included in character outline point sequences of a plurality of character parts, or that a hole outline point sequence appears to be included in a character outline point sequence although in reality it is not. This can happen, for instance, to characters "国" and "店". In such cases, the inclusion relation judgment result needs to be corrected. This correction may be made in the following correction rules.

Correction Rule

This is the correction rule: when a hole of a character is included in outlines of a plurality of character parts, the hole is included in an outline of an innermost character part.

The following describes two specific methods used for this correction rule. The first method is as follows.

First Method

Inclusion relation judgment for two different outlines of two character parts is made by comparing lengths "L", which have been previously calculated, of the two character parts. A character part with a shorter "L" is judged to be the inner character part. This first method only takes a short calculation time and achieves high-speed judgment. With this method, however, inclusion judgment cannot be always correctly made when unusual fonts are used for characters. The second method below achieves more stable inclusion relation judgment although it requires a longer calculation time.

Second Method (1) The following inclusion relation judgment is made for boundary boxes of character outline point sequences. Here, assume that a plurality of character parts are judged to include a hole, and that coordinates of a boundary box for each character part are "xoj-min", "xoj-max", "yoj-min", and "yoj-max" (with "j" being an index assigned to a character outline including the hole, and j=1 to n). When all the inequalities shown in condition below are satisfied for a character part with an index "k", the hole is judged to be included in this character part.

Condition (1): xoj-min<xok-min, yoj-min<yok-min, xok-max<xoj-max, and yok-max<yoj-max, wherein "j" and "k" are given values, and j≠k.

Perform operation (2) below when the above condition (1) is not satisfied. When the condition (1) is satisfied, the equalities below are satisfied.

xok-min=max (xoj-min)
yok-min=max (yoj-min)
xok-max=min (xoj-max)
yok-max=min (yoj-max)

Accordingly, the above judgment can be made by first finding "k" from "max (xoj-min)=xok-min" (by regarding a character part "j" as a character part "k" when a minimum x coordinate of a boundary box of the character part "j" is larger than x coordinates of other boundary boxes), and then finding whether the remaining three equalities are satisfied.

(2) When the above condition (1) is not satisfied, calculate the shortest length between the barycenter of the boundary box of the hole outline point sequence and each character outline. Among these character outlines, specify a character outline corresponding to the shortest length of all the calculated lengths, and judge that the hole is included in the specified character outline. Here, the above "shortest length between the barycenter of the boundary box of the hole outline point sequence and each character outline" refers to a smaller value out of two shortest lengths from the above barycenter to a point present on the character outline and to a side of the character outline.

The length from the barycenter to a point on the character outline is calculated based on the ordinary Euclidean distance (root-sum-square value). The length from the barycenter to a side of the character outline is calculated using mathematical expressions below. Here, assume that the character outline point sequence includes points "P0(p0x, p0y)", "P1(p1x, p1y)", ... "Pn(pnx, pny)"; the barycenter of the hole boundary box is "C(cx, cy)"; and a pedal from the barycenter "C" to a side "PkPk+1" is "H(hx, hy)".

Expressions: $a = pk+1x - pkx$, $b = pk+1y - pky$, $d = Cx - pkx$
$e = Cy - pky$
$\alpha = (a^*d + b^*e)/(a^{}2 + b^{}2)$
$hx = \alpha^* a + pkx$
$hy = \alpha^* a + pky$ (with $k = 0, 1, 2, \ldots n$; and $Pn+1 = P0$; and $"X^{**}Y"$ indicating "the $Y$th power of $X$")

After this, calculate the length "|CH|" from the barycenter "C" to the side by using the equality below if "min(pkx, pk+1x)≤hx≤max(pkx, pk+1x)" and "min(pky, pk+1y)≤hy≤max(pky, pk+1y)" are satisfied. If the expression below is not satisfied, this means that no length exists from the barycenter to the side, and therefore operation for another side is performed.

$|CH| = (|PkC^* PkPk+1|)/|PkPk+1|$
$= |d^*b - a^*e|/(a^{}2 + b^{}2)^{**}(1/2)$

The form analyzing information on a character can be represented by tree-structured information indicating hierarchy for a construction of the character. For instance, the form analyzing information may be represented by "LA-LB" when a point sequence "LB" is included in a point sequence "LA". The form analyzing information is outputted to the top/bottom dividing unit 5.

Figure 4:
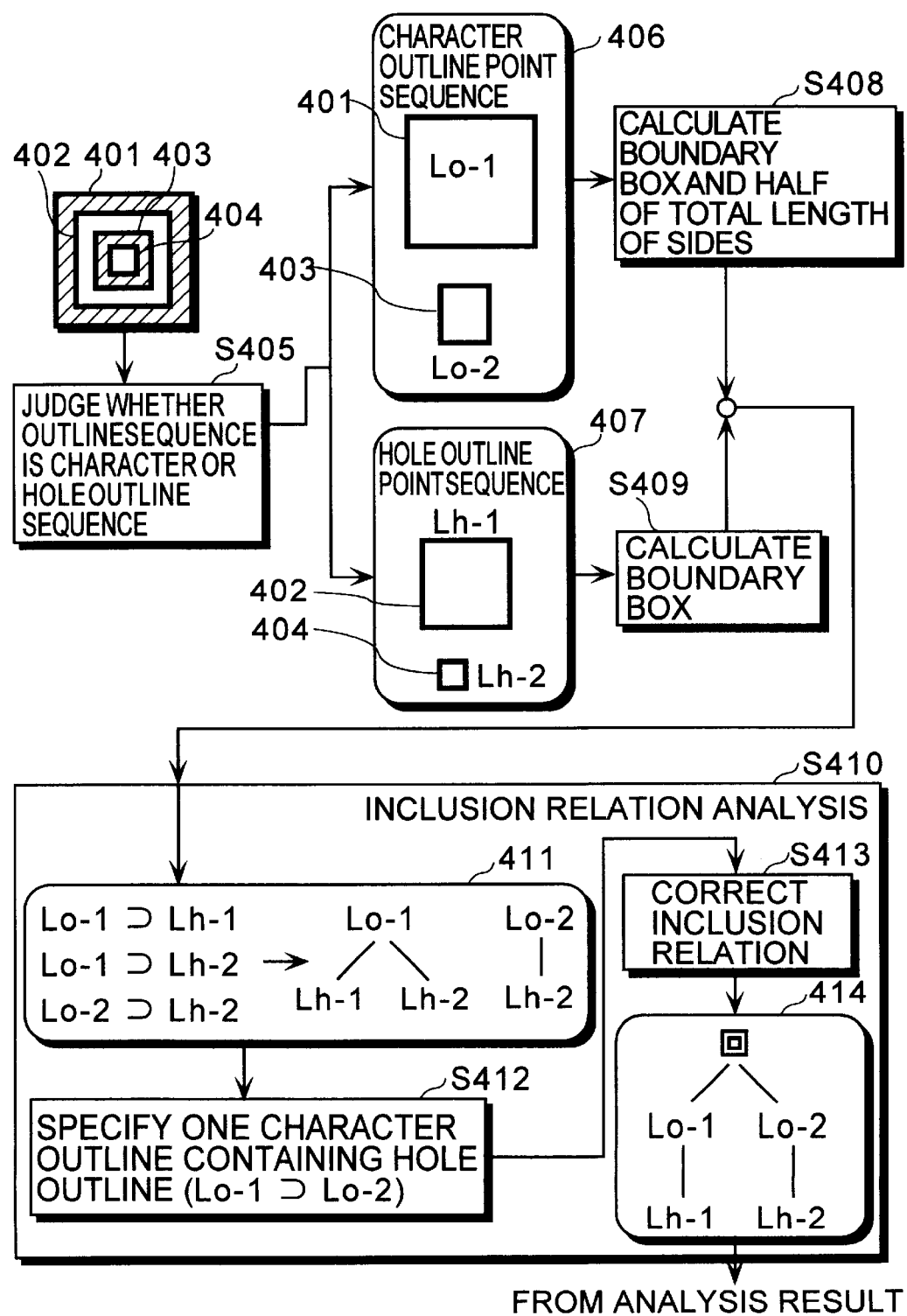
FIG. 4 is a diagram showing a case where form analysis is performed on a Chinese character "回"
Figure 5:
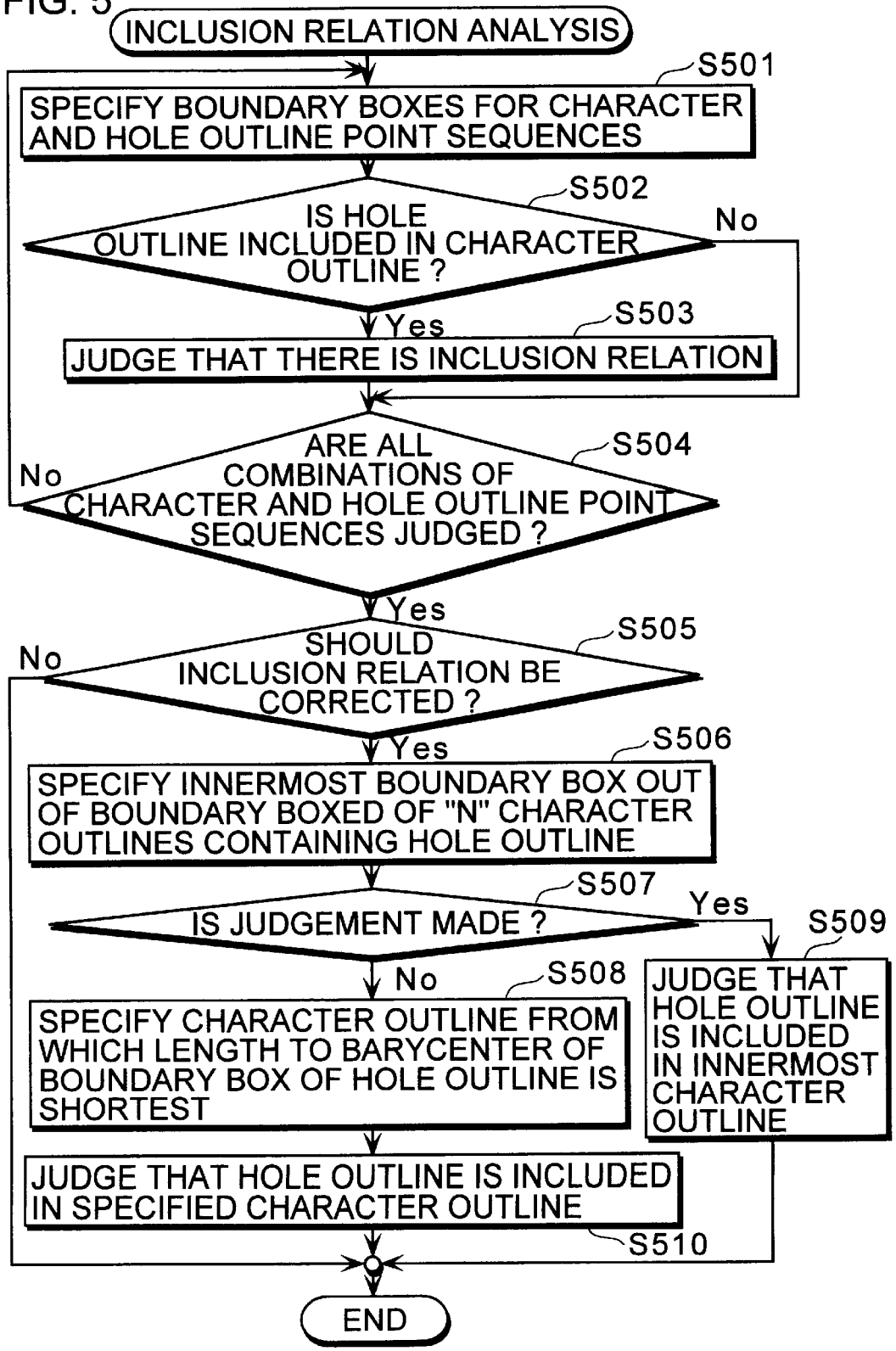
FIG. 5 is a flowchart showing detailed inclusion relation analysis processing shown in FIG. 4.

The following describes the above processing of the form analyzing unit 4 with reference to FIGS. 4 and 5 that use a Chinese character "回" as an example character.

FIG. 4 is a diagram showing the case in which form analysis is performed for the character "回". FIG. 5 is a flowchart showing the detailed processing of inclusion relation analysis shown in FIG. 4. As shown in FIG. 4, the character "回" includes four point sequences: a point sequence 401 forming an outline of an outer character part "口"; a point sequence 402 forming an outline of a hole of the outer character part "口"; a point sequence 403 forming an outline of an inner character part "口"; and a point sequence 404 forming an outline of a hole of the inner character part "口".

After receiving point sequences making up the character "回" from the outline data obtaining unit 2, the form analyzing unit 4 judges, for each point sequence, whether the point sequence is a character outline point sequence or a hole outline point sequence with the method described above (step S405). The judgment result then shows that the point sequences 401 (Lo-1) and 403 (Lo-2) are character outline point sequences (406) and that the point sequences 402 (Lh-1) and 404 (Lh-2) are hole outline point sequences (407). For the character outline point sequences 401 and 403, boundary boxes and lengths "L" are calculated (step S408). For the hole outline point sequences 402 and 404, boundary boxes are calculated (step S409).

After this, the inclusion relation analysis is performed to specify character outline point sequences that include the hole outline point sequences 402 (Lh-1) and 404 (Lh-2) (step S410).

For the inclusion relation analysis in step S410, boundary boxes of the character outline point sequences Lo-1 and Lo-2 and those of the hole outline point sequences Lh-1 and Lh-2 are specified (step S501). After this, the form analyzing unit 4 judges whether a specified boundary box of a hole outline point sequence is included in a specified boundary box of a character outline point sequence (steps S502 and S503). This judgment is made for every combination of character and hole outline point sequences (steps S504 and S501-S503). For the character "回", it is judged that the character outline point sequence Lo-1 includes the hole outline point sequences Lh-1 and Lh-2 and that the character outline point sequences Lo-2 includes the hole outline point sequence Lh-2 (411).

If the above judgment result indicates that a single hole outline point sequence is included in a plurality of character outline point sequences, it is necessary to specify only one character outline point sequence that contains the hole outline point sequence. Accordingly, the inclusion relation should be corrected as described below (steps S412, S413, and S505).

One of the hole outline point sequences is first specified, and then all the character outline point sequences (for instance, "N" point sequences, with "N" indicating a number) that include this specified hole outline point sequence are specified. Among the specified "N" character outline point sequences, the innermost character outline point sequence is specified by using the aforementioned first method or the above operation (1) in the second method (steps S506 and S509).

If such innermost character outline point sequence is not specified (step S507), perform the above operation (2) in the second method to specify the innermost character outline point sequence (steps S508 and S510).

As a result of the above processing, the inclusion relation for the character "回" is corrected as showing that the inner hole outline point sequence Lh-2 is only included in the inner character outline point sequence Lo-2. As a result, the form analyzing information for this character can be represented using a tree structure (414).

When a character (or a character part) does not include any holes, the form analyzing information on this character shows that the character has a flat structure without hierarchy, and this form analyzing information is sent to the top/bottom dividing 5 as in the case for a character containing a hole. A "structure element" of a character (or a character part) can be represented by the form analyzing information, which is obtained from the form analyzing unit 4, as "external shape only" or "external shape and hole" using a tree structure. Here, the "structure element" refers to an element, on which polygon dividing (described later) is performed, of a character or a character part. This element is either: (a) an area which is enclosed by a character outline defined by a character point sequence and which includes the character point sequence; or (b) an area which is enclosed by a character outline but excludes a part enclosed by a hole outline defined by a hole point sequence, with the character and hole point sequences included.

The top/bottom dividing unit 5 performs convex polygon division for each of the above structure elements. The present embodiment uses a triangle as an example of a convex polygon to describe the convex polygon division processing.

When a structure element to be divided includes a hole outline point sequence, the top/bottom dividing unit 5 connects the hole outline point sequence to a character outline point sequence (hereafter, this operation is called "connecting operation") to generate a single outline point sequence. The top/bottom dividing unit 5 performs this operation prior to the division operation. At the same time, the top/bottom dividing unit 5 changes numbers assigned to points in the point sequence to show an arranging order of the points. Based on the stated outline data, the connecting operation connects the character outline to the hole outline so as to produce point sequence coordinate data which allows the character to be traced in a single stroke. The connecting operation may be performed with two connecting methods below.

FIG. 6 shows a state in which the first connecting method is applied to the Chinese character "回" and point numbers are reassigned to points of a point sequence. The following describes the first connecting method with reference to FIG. 6.

First Connecting Method (1) Based on a hole outline point sequence of each hole, maximum values of x-y coordinates "x-max" and "y-max", and minimum values of x-y coordinates "x-min" and "y-min" are found. After this, center coordinates ((x-max+x-min)/2, (y-max+y-min)/2) of each hole are obtained.

(2) A character outline point closest to the obtained center coordinates is found. Hereafter, such character outline point is called a "proximity point". A length between the center coordinates and the proximity point is obtained by calculating a sum square of x-y coordinates, without a root calculated, to reduce calculation load. After one proximity point is found for a hole of a character, this found proximity point is excluded from a candidate of a proximity point for another hole of the same character to avoid overlaps. In the example shown in FIG. 6, a proximity point for a hole 615 is a point "4" on a character outline point sequence.

(3) A hole outline point closest to the obtained proximity point is found, and numbers are reassigned to points forming the hole outline point sequence in such a way that the closest hole outline point is set as a starting point. For instance, when hole outline points are originally assigned numbers {P0, P1, ... Pk, ... Pm}, with a point "Pk" closest to the proximity point, new numbers are assigned to these points as follows: {Pk, ... Pm, P0, P1, ... Pk−1}. Among points of a hole outline point sequence for the hole 615 in FIG. 6, a point "2" is closest to the proximity point "4". Accordingly, points of this hole outline point sequence are reassigned numbers composed of {2, 3, 0, 1}.

(4) The hole outline point sequence is embedded in the character outline point sequence, and numbers are reassigned to them. For instance, assume that points of a character outline point sequence are arranged in order of {Q0, Q1, Q2 ... Qi, Qi+1, ... Qn} with the point "Qi" as a proximity point, and that points of a hole outline point sequence are arranged in order of {P0, P1, ... Pm} as a result of the above operation in (3). The hole outline point sequence is then embedded so as to produce a point sequence made up of points {Q0, Q1, Q2, ... Qi, {P0, P1, ... Pm, P0}, Qi, Qi+1, ... Qn}. Points of the produced point sequence are reassigned numbers made up of {0, 1, 2, ... i, i+1, ... i+m+1, i+m+2, i+m+3, ... n+m+3}. When there are a plurality of holes, embedding operation is performed in order, starting from a proximity point assigned a smaller number so as to connect all the points. The following describes the case of FIG. 6 more specifically with the assumption that only the hole outline point sequence for the hole 615 is embedded for ease of explanation. Points of the character outline point sequence are arranged in order of {0, 1, ... 4, ... 11}, and points of the hole outline point sequence are arranged, as a result of the above operation (3), in order of {0, 1, 2, 3}. As the proximity point for the hole 615 is the point "4" points of a point sequence in which the hole outline point sequence is embedded are arranged in order of {0, 1, ... 4, {0, 1, 2, 3, 0}, 4, ... 11}. To this point sequence, new numbers are assigned as {0, 1, ... 4, 5, ... 9, 10, ... 17}. When the above connecting (embedding) operation is also performed for other holes 616–618, the connected outline point sequence is assigned numbers {0, 1, ... 35} as shown in FIG. 6. Hereafter, such connected point sequence assigned new numbers is called an integrated point sequence.

After this, the top/bottom dividing unit 5 associates the integrated outline point sequence with original character and hole outline point sequences by using a table, for instance, and places it into the outline data storing unit 3. Note that the integrated outline point sequence contains overlapping points, and therefore identifies are assigned to these overlapping points and then placed into the outline data storing unit 3.

The following describes the second connecting method that expands the algorithm used in the first method so as to process unusual characters (or character parts).

Second Connecting Method (1) Focus on one character hole, and calculate a length from each point of a point sequence of the focused hole to each point of a character outline point sequence to specify shortest length out of the calculated lengths. Calculate also a length from each point of the hole point sequence to each side of the character outline to specify a shortest length out of the calculated lengths.

(2) Select a shorter length out of the two shortest lengths obtained above, and recognize the selected shortest length as corresponding to the focused hole. Recognize also: (a) a point, which corresponds to the selected shortest length, of the hole outline point sequences; and (b) either a point, which corresponds to the selected shortest length, of the character outline point sequences, or a pedal formed by the hole outline point onto a side of the character outline.

(3) Reassign numbers to points of the hole outline point sequence in such a way that the hole outline point recognized above (2) is set as a starting point. For instance, when the hole outline points are originally arranged in order of {0, 1, ... k, ... m} with a point "k" closest to a proximity point, these hole outline points are reassigned numbers composed of {k, ... m, 0, 1, ... k−1}.

(4) When a character outline point is recognized above operation (2), the hole outline point sequence is embedded in the character outline point sequence, and numbers are reassigned to points of these point sequences. Assume, for instance, that points forming the character outline point sequence are arranged in order of {0, 1, 2, ... i, i+1, ... n} with a point "i" closest to the starting point of the hole outline point sequence, and that points forming the hole outline point sequence are arranged in order of {0, 1, ... m} after the above operation (3). When this hole outline point sequence is embedded in the character outline point sequence, a connected point sequence is made up of points arranged in order of {0, 1, 2, ... i, {0, 1, ... m, 0}, i, i+1, ... n}. Points of this connected point sequence are then reassigned serial numbers composed of {0, 1, 2, ... i, i+1, ... i+m+1, i+m+2, i+m+3, ... n+m+3}. This integrated point sequence is then placed into the outline data storing unit 3 together with the starting point of the hole outline point sequence, unconnected hole and character outline point sequences before the connecting operation, and information showing that points "i", "i+1", "i+m+1", "i+m+2" are overlapping points.

When a pedal on a side of the character outline is recognized above operation (2), the pedal is embedded in the character outline point sequence, and numbers are reassigned. For instance, when the pedal is present on a side formed by two points "k" and "k+1" in the character outline point sequence, the pedal is embedded in between the two points "k" and "k+1". After this, the hole outline point sequence is embedded in the character outline point sequence in the same manner as stated above, and numbers are reassigned to points of these outline point sequences. When the two outline point sequences are connected to produce the integrated point sequence, the above pedal (the newly embedded character outline point "k+1") is regarded as a proximity point to be embedded. The produced integrated point sequence is then placed into the outline data storing unit 3, together with the starting point of the hole outline point sequence, unconnected hole and character outline point sequences, and information showing that points "k+1", "k+2", "k+m+3", "k+m+4" are overlapping points.

(5) When a character includes a plurality of holes, the above operations from (1) to (4) are repeated for each hole. Note that a point specified as an overlapping point in the above operation (4) cannot be used in the calculation of the shortest length in the operation (1).

Two different triangle division methods used for a structure element are described below.

The following first describes the first triangle division method. Research is being made for convex-closure triangle division algorithms for a point sequence on a plane. Among them, Dulaunay triangle division algorithm is well-known. As a convex-closure calculation algorithm for a point sequence, Graham and Quickhull algorithms are available. Accordingly, when a structure element of a character only includes a character outline and has a convex external shape, triangle division can be performed on this character according to Dulaunay algorithm. As is clear from the explanation above, however, structure elements of many of characters include a hole, and an external shape of a character is often a concave polygon as in a character "あ". The first method described below is an improved method that combines the above algorithms to perform triangle division on a structure element of a character.

(1) Among each set of overlapping points of an integrated point sequence produced in the prior operations, delete an overlapping point assigned a larger number. This integrated point sequence from which the overlapping points are deleted is called a point sequence "B". Correspondence between this point sequence "B" and the integrated point sequence before deletion is represented in a table form and placed into the outline data storing unit 3. This is to say, this table associates the integrated point sequence with its original unconnected point sequences and with the point sequence "B".

(2) Generate a convex closure for the point sequence "B" according to Graham or Quickhull algorithm.

(3) Assign an identifier "0" if the outline point sequence of the structure element corresponds to a single character external form, and a point sequence of an external shape of the generated convex closure is the same as that of the character outline before connection. Assign an identifier "1" in any other cases.

(4) Divide the convex closure generated in the above operation (1) into triangles according to Dulaunay algorithm. Perform operations for a next structure element, starting from (1) above, if the identifier is shown as "0". If the identifier shows "1", move to operation (5) below.

(5) Calculate a barycenter of each triangle generated in the above operation (4).

(6) Here, assume that points forming the integrated point sequence are "P0", "P1", . . . "Pm". Out of points of the point sequence "B", find points that correspond to points "Pi" and "Pi+1" with reference to the above table, and assume the found points as points "Q" and "R". Calculate a cross product of vectors "PiPi+1" and "PiCi" with respect to a barycenter "Ci" of a triangle including "QR" as its side (there are two barycenters "Ci" at most). When there are two triangles that include the side "QR", a cross product is calculated for each barycenter of the triangles.

When the calculated cross product is a plus value and space in which the character form is defined is the right-handed coordinate system, the triangle is formed in either a concave portion of the character external shape or a character hole. This triangle is therefore discarded. In the case of the left-handed coordinate system, the triangle is discarded when the calculated cross product is a minus value. The stated operations are repeated for cases of i=0, . . . m−1 in order. Note that when both points "Pi" and "Pi+1" are overlapping points, the point sequence "B" includes an overlapping point "Pj−1" (corresponding to the point "Pi") behind the point "Pi" and an overlapping point "Pj" (corresponding to the point "Pi+1") behind the point "Pi+1" (i.e., i<j−1). Accordingly, a termination identifier is set in the table to prevent the judgment from being made for a side "Pj−1Pj" after the triangle deletion judgment is made for the side "PiPi+1". When the operations for a case of "i=m−1" have been completed, the operations from (1) to (6) are repeated for each of remaining structure elements.

Figure 7A:
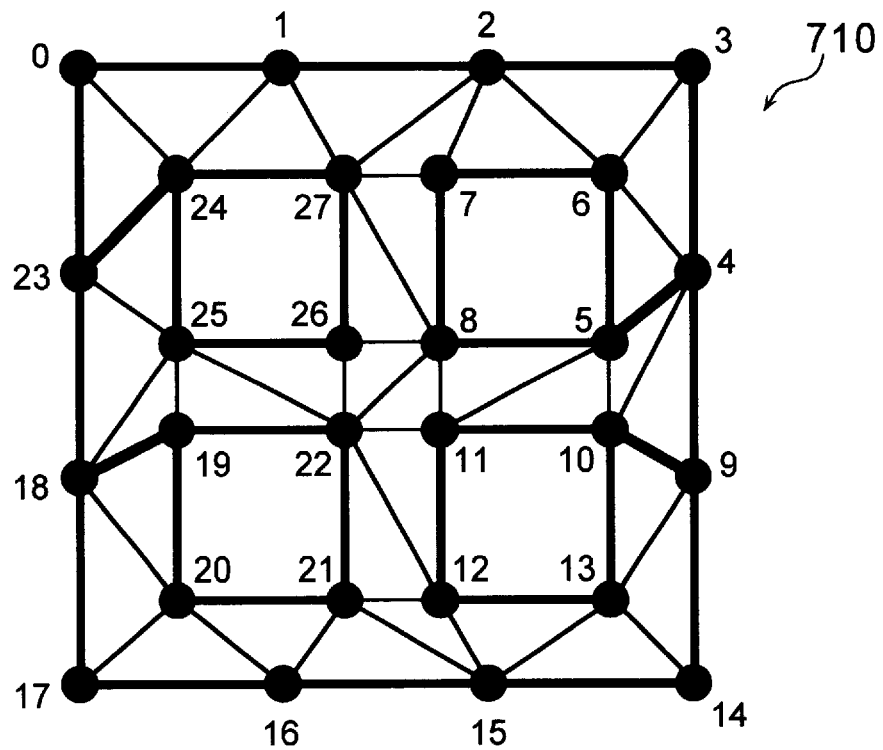
FIG. 7A shows a processing result obtained when a first triangle division method is applied to the character "田"

FIG. 7A shows an example in which the first triangle division method is applied to a character "田". Numbers in the figure are numbers assigned to the point sequence "B". A divided triangle is indicated by a combination of three points of the point sequence "B". When the three points in the combination are arranged counterclockwise in the right-handed coordinate system, a plane including these points is defined as the front. When the three points are arranged clockwise, a plane including these points is defined as the back. (It is of course possible to associate the clockwise direction with the back, and the counterclockwise direction with the front.) This direction of three points can be judged as follows. Calculate a cross product of vectors "PQ" and "PR" with the assumption that the three points forming a triangle are points "P", "Q", and "R". Based on a sign of the calculated cross product, the direction can be judged. For instance, when the calculated cross product has a plus sign in the right-handed coordinate system, order represented by "P-Q-R" is counterclockwise, and order represented by "P-R-Q" is clockwise. This judgment can be made similarly in the case of the left-handed coordinate system. Note that the clockwise direction is generally defined as the front.

The following describes the second triangle division method. Here, assume that the integrated point sequence produced in the prior operation is assigned numbers made up of "P0", "P1", . . . "Pm". The aforementioned table stores an identifier shown as "1" for a point in a concave portion of a character outline and for a point of a hole outline. A point on a concave portion can be detected by calculating a cross product of two vectors "PiPi+1" and "Pi+1Pi+2" that are generated from a character outline point sequence. When the calculated cross product has a plus sign in the right-handed coordinate system, the point "Pi+1" is a point on a concave portion (for the left-handed coordinate system, the opposite judgment is made).

(1) Calculate a cross product of vectors "P0P1" and "P1P2", and obtain its sign. (The following explanation is provided for a case of the right-handed coordinate system although the present method can be also used for the left-handed coordinate system by applying an opposite sign.) Note that the calculation to obtain a cross product is not performed when the number of remaining points reaches three as point deletion is performed in step (2b) below. In this case, the last three points are stored in their current arranging order, and the processing is terminated because a triangle formed by these three points is the last triangle for which division operation is performed.

(2a) When the cross product calculated in step (1) is a minus value, judgment is made, for a point that is present on one of: (a) a hole outline; and (b) a concave portion of a character outline of a point sequence "B", as to whether the point is included in a triangle "P0P1P2". The point is judged as being included in the triangle when the following three conditions are satisfied: (a) a cross product of the vector "P0P1" and a vector formed by connecting the point "P0" to the judged point has a plus sign; (b) a cross product of the vector "P1P2" and a vector formed by connecting the point "P1" to the judged point has a plus sign; and (c) a cross product of a vector "P2P0" and a vector formed by connecting the point "P2" to the judged point has a plus sign.

(2b) When the judgment result in step (2a) shows that the judged point is not included in the triangle, the three points "P0", "P1", and "P2" are stored in this order (which corresponds to the clockwise direction), and a new point sequence is generated by deleting the point "P1" from the point sequence "B". The above operation is then performed, beginning from step (1), for a triangle "P0P2P3".

(2c) When the judgment result in step (2a) shows that the judged point is included in the triangle "P0P1P2", a new point sequence is generated by moving the point "P0" to the end of the point sequence "B". After this, the above operation is performed, beginning from step (1), for a triangle "P1P2P3".

(2d) When the cross product calculated in step (1) is either a plus value or zero, a new point sequence is generated by moving the point "P0" to the end of the point sequence "B". After this, the above operation is performed, beginning from step (1), for the triangle "P1P2P3".

Figure 7B:
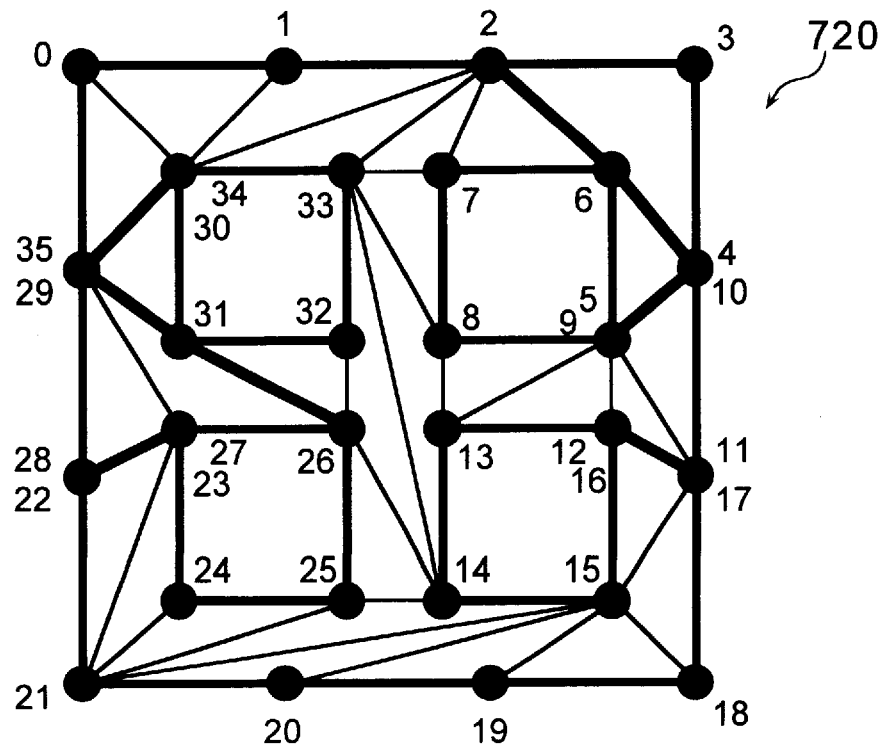
FIG. 7B shows a processing result obtained when a second triangle division method is applied to the character "田"

FIG. 7B shows a processing result obtained with the second triangle division method applied to the character "田". Numbers in the figure are numbers assigned to the integrated point sequence for which the connecting operation has been performed. By combining a plurality of sides and triangles generated in the above processing, division processing based on a polygon can be also performed.

Figure 8:
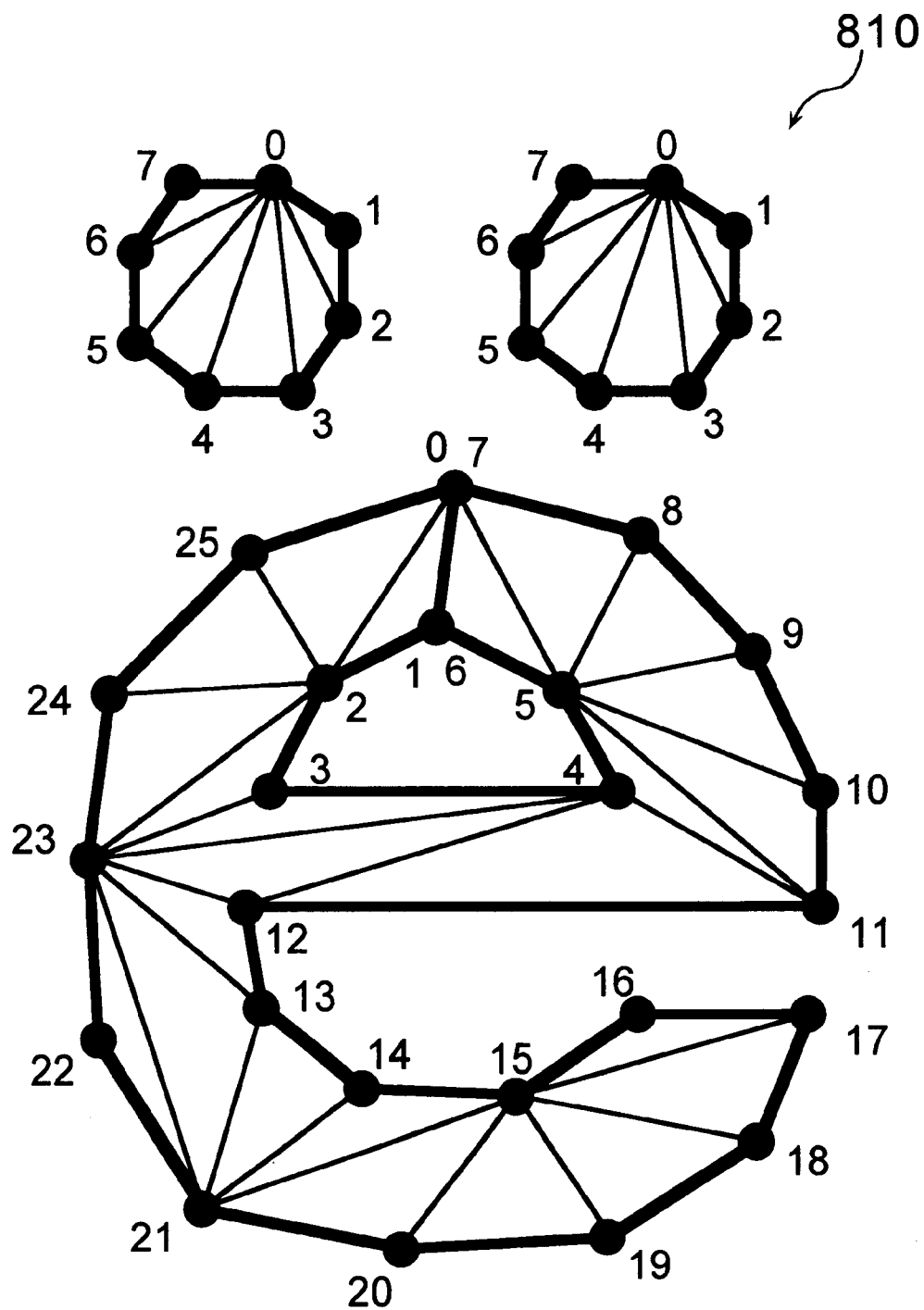
FIG. 8 shows a processing result obtained when the second triangle division method is applied to a Russian character "ё"

The processing result obtained with the second triangle division method is also shown in FIG. 8, in which the second method is applied to a Russian character "ё".

When the first triangle division method is applied to each structure element, the following two sets of data are produced: coordinate data of the point sequence "B" (which is in 2-D form for the present embodiment); and three-point data which shows three points representing each divided triangle by using indexes of three points on the point sequence "B". In the ordinary right-handed coordinate system, such three points are arranged clockwise when they correspond to a structure element of a bottom plane of a character. When they correspond to a structure element of a top plane, they are arranged counterclockwise. On the other hand, when the second triangle division method is applied, the following two sets of data are produced: coordinate data of the integrated point sequence (in 2-D form for the present embodiment); and three-point data which shows three points of each divided triangle by using indexes of the integrated point sequence. Each "index" in the indexed surface data refers to an identifier representing a vertex of a divided triangle. For instance, a triangle "P1P2P3" corresponds to indexes "1", "2", and "3". Formats of these sets of data generated according to the first and second triangle division methods are generally called "indexed surface data". Note that in the left-handed coordinate system, points of a point sequence are arranged in the direction opposite to that in the right-handed coordinate system. In this way, the top/bottom dividing unit 5 generates indexed surface data for top and bottom planes of each structure element. The top/bottom dividing unit 5 outputs the generated indexed surface data to the side generating unit 6.

After receiving the indexed surface data from the top/bottom dividing unit 5, the side generating unit 6 obtains, from the outline data storing unit 3, data showing unconnected character and hole outline point sequences, for which the connecting operation is not performed, of each structure element. The side generating unit 6 then expands the received indexed surface data into a 3-D form. The following describes character side forming operation by the side generating unit 6 for expanding the indexed surface data into the 3-D form with reference to FIGS. 9 and 10.

Figure 9:
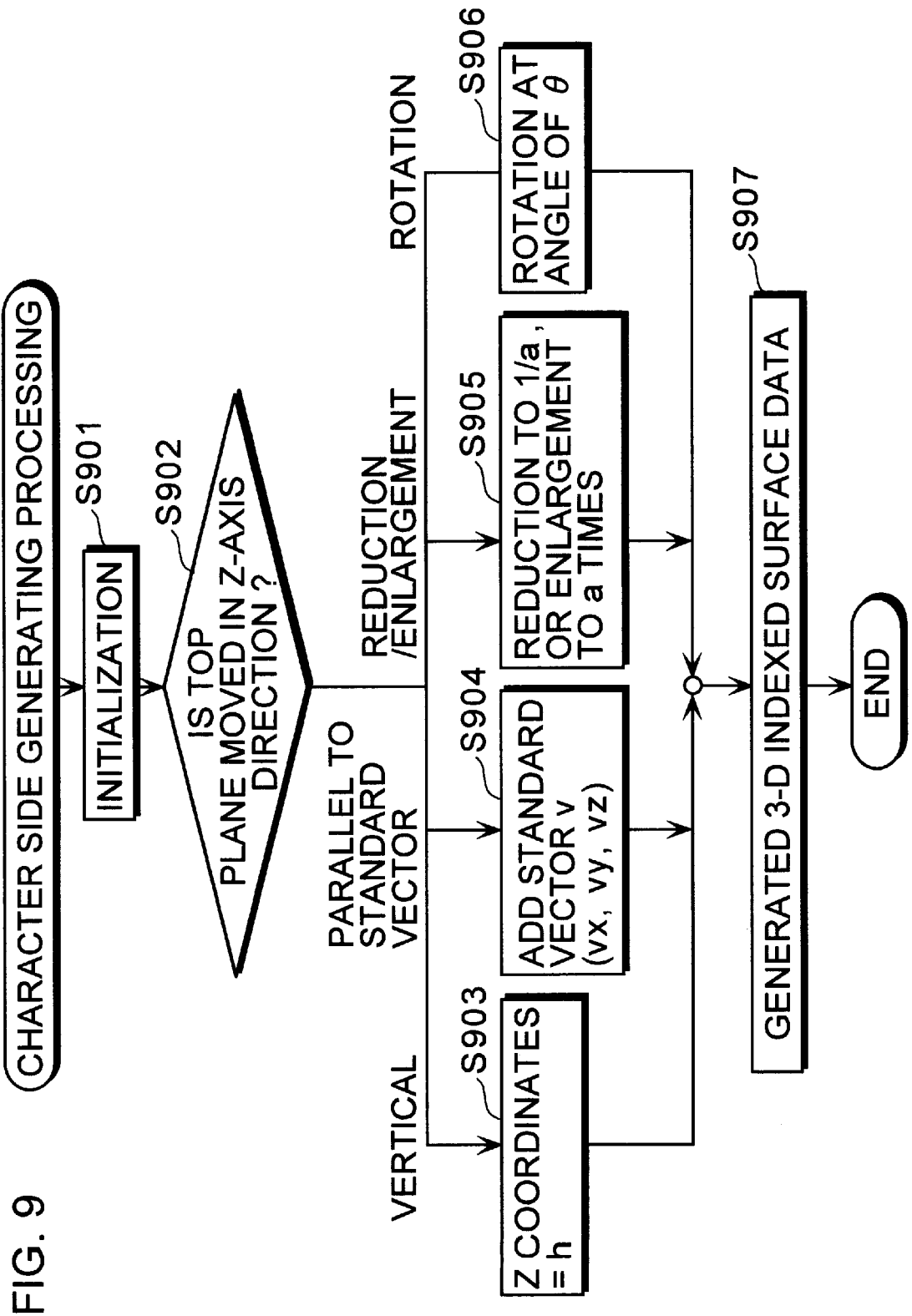
FIG. 9 is a flowchart showing a flow of character side generating processing by a side generating unit.

FIG. 9 is a flowchart showing the processing flow of this operation. FIGS. 10A–10D are diagrams showing four types of methods for moving a top plane of a character in a direction of height to expand the indexed surface data into the 3-D form.

As initialization, the side generating unit 6 expands point sequence coordinate data in the indexed surface data for a bottom plane into the 3-D form, and sets "0" as z coordinates. Similarly, the side generating unit 6 sets "0" as z coordinates of a point sequence (hereafter, a "bottom point sequence") of the 3-D bottom plane (step S901).

After this, a method for moving the top plane in the height direction is specified (step S902). According to the specified method, z coordinates of point sequence coordinate data in the indexed surface data for each top plane structure element, and z coordinates of a point sequence (hereafter, a "top point sequence") of the 3-D top plane are determined.

Figure 10A:
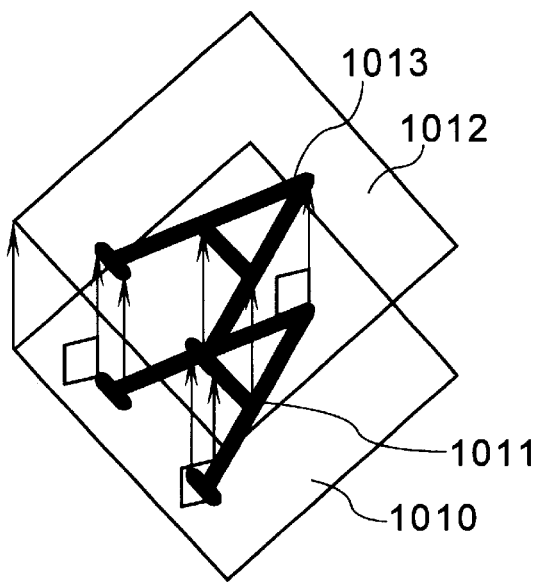
FIG. 10A is a diagram showing a first moving method for vertically moving a top plane of a character.

FIG. 10A is a diagram showing the first moving method. With this method, the top plane is vertically lifted to a height "h" in the height direction. In this case, a value "h" is set as z coordinates of the point sequence coordinate data in the indexed surface data for each top plane structure element. Similarly, a top point sequence is generated by expanding point sequence coordinate data for an original outline point sequence into the 3-D form and setting "h" as z coordinates (step S903).

Figure 10B:
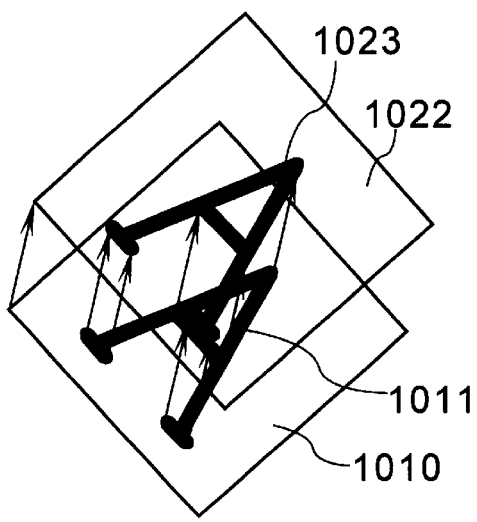
FIG. 10B is a diagram showing a second moving method for vertically moving the top plane of the character.

FIG. 10B is a diagram showing the second moving method. With the second method, the top plane is moved by parallel translation in a direction of a standard vector "v" (vx, vy, vz). In this case, the point sequence coordinate data in the indexed surface data for each top plane structure element is expanded into the 3-D form with a value "0" being set as z coordinates. Coordinates corresponding to the standard vector "v" are then added to coordinates of the point sequence coordinate data. Similarly, a top point sequence is generated by expanding point sequence coordinate data for an original outline point sequence into the 3-D form by setting "0" in z coordinates and by adding coordinate values corresponding to the standard vector "v" (step S904).

Figure 10C:
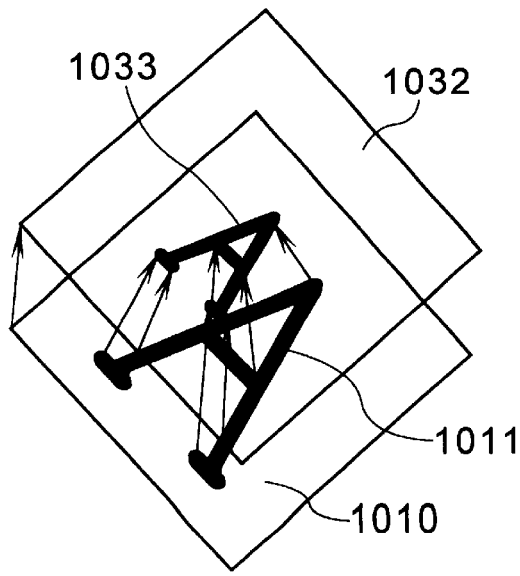
FIG. 10C is a diagram showing a third moving method for vertically moving the top plane of the character.

FIG. 10C is a diagram showing the third moving method. With the third method, a character is first reduced or enlarged, and then moved to a height "h" in the vertical direction. In this case, the point sequence coordinate data in the indexed surface data for each top plane structure element is reduced or enlarged, and then expanded into the 3-D form with a height "h" set as z coordinates. Similarly, outline point sequence coordinate data for an original outline point sequence is enlarged or reduced, and expanded into the 3-D form with the height "h" set as z coordinates so as to produce a top point sequence (step S905).

Figure 10D:
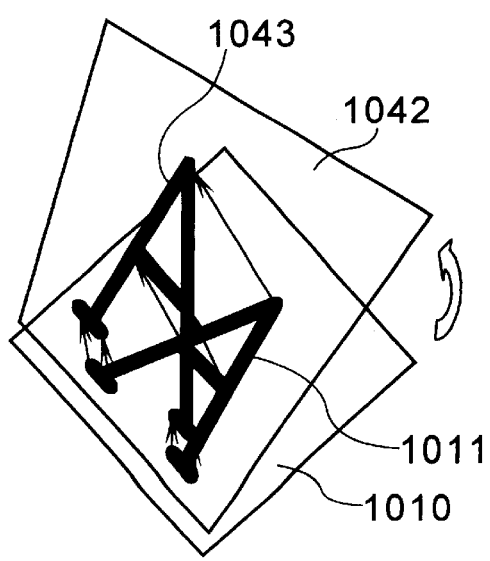
FIG. 10D is a diagram showing a third moving method for vertically moving the top plane of the character.

FIG. 10D is a diagram showing the fourth moving method. With the fourth method, the top plane is moved by rotation, and therefore a rotation axis vector and a rotation angle "θ" are provided in advance. In this case, the point sequence coordinate data in the indexed surface data for each top plane structure element is expanded into the 3-D form with a value "0" set as z coordinates. Rotational conversion, defined by the rotation axis vector and the rotation angle "θ", is performed on the coordinates, and converted coordinate values are calculated. Similarly, outline point sequence coordinate data for an original outline point sequence is expanded into the 3-D form with the value "0" set as z coordinates to produce a top point sequence. Rotational conversion, defined by the rotation axis vector and the rotation angle "θ", is performed on coordinates of the top point sequence, and converted coordinate values are calculated (step S906).

As is clear from the above processing, the same numbers are assigned to bottom and top point sequences of the above outline point sequence expanded into the 3-D form. As has been described, the side generating unit 6 generates indexed surface data for each of top and bottom plane structure elements expanded in the 3-D form (step S907), and outputs the indexed surface data to the form data output unit 7.

When a bottom point sequence of each structure element is represented by {P'n} and its top point sequence is represented by {Pn}, a side plane can be generated as a quadrangle "PiP'iP'i+1Pi+1" arranged counterclockwise in the right-handed coordinate system. (Arrange the above points clockwise in the left-handed coordinate system.) Data showing the side plane in the format of the indexed surface data is formed by the following data: (a) coordinate data of a point sequence (represented by {Q2n} for this example) in which a top point sequence is followed by a bottom point sequence; and (b) index data "QiQi+nQi+1Qi+n+1". Such indexed surface data generated for each side plane structure element is outputted to the form data output unit 7.

The form data output unit 7 receives, from the side generating unit 6, indexed surface data for top and bottom planes and indexed surface data for side planes. The form data output unit 7 then put together the received indexed surface data by using a hierarchical representation, and outputs it to the periphery (such as a 3-D graphics display unit). When a format of the data needs to be converted, the format conversion is first performed and then converted data is outputted.

As has been described, the present embodiment defines inclusion relation between a character hole and an external shape of a character or a character part so as to achieve 3-D presentation for which even every character part is divided for 3-D representation.

Second Embodiment

The above first embodiment describes an example of the 3-D character generating processing for which a top plane of a character is lineally lifted in the direction of the z axis, and a side plane for the 3-D character is lineally formed. The second embodiment describes an example in which an intermediate outline is provided for a 3-D character side plane, and a character side having a variety of bevel forms is generated based on the intermediate outline. In the present embodiment, the same elements as described in the first embodiment will not be described.

Figure 11:
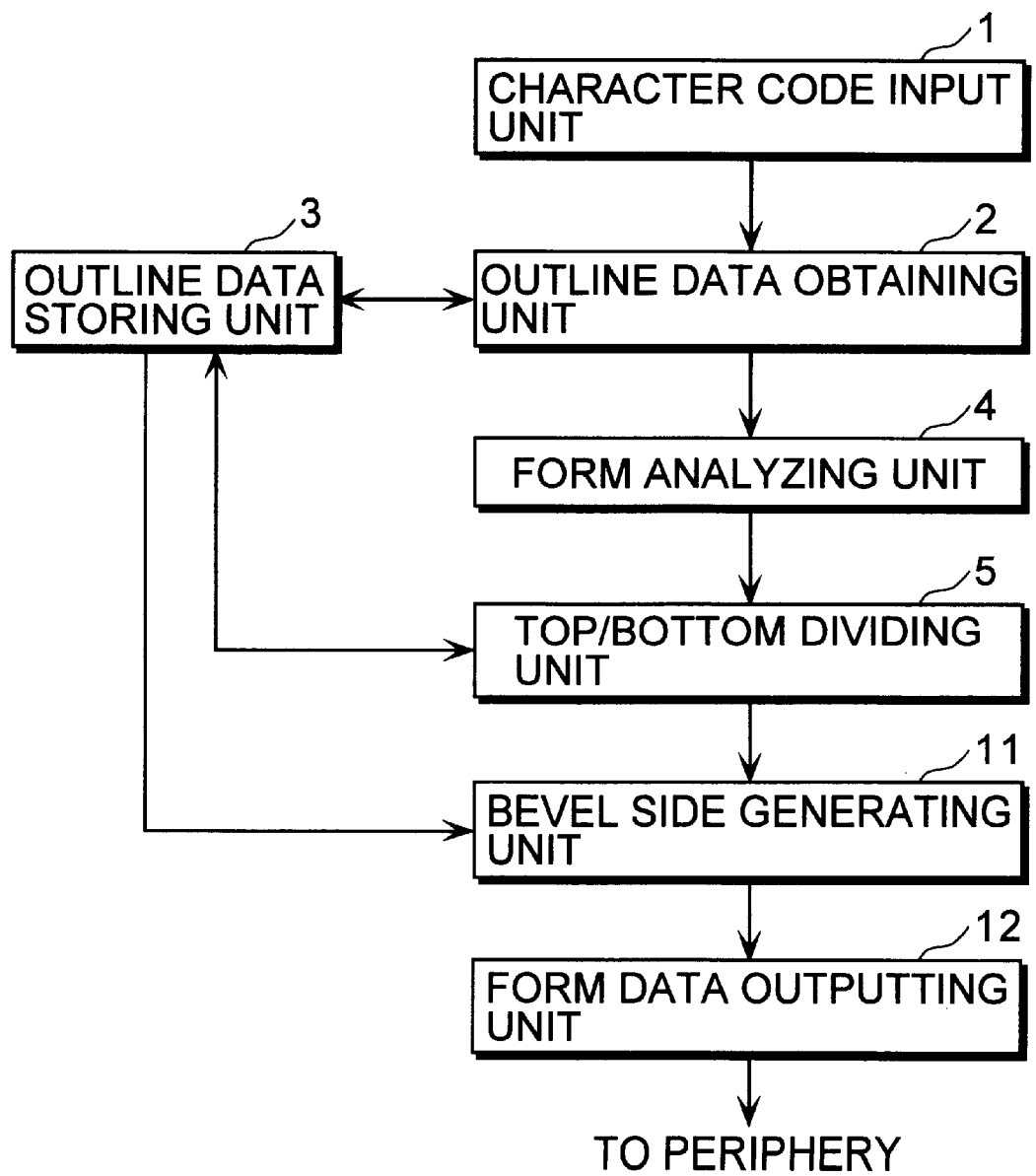
FIG. 11 is a block diagram showing a function configuration of a 3-D character data generating device according to the second embodiment.

FIG. 11 is a block diagram showing a function configuration of a 3-D character data generating device 201 of the present embodiment. This 3-D character data generating device 201 includes a bevel side generating unit 11 instead of the side generating unit 6, and also includes a form data output unit 12 instead of the unit 7. The following describes the 3-D character data generating device 201 in detail.

The bevel side generating unit 11 receives not only an output from the top/bottom dividing unit 5 but also point sequence coordinate data for character and hole outlines, for which the connecting operation is not performed, from the outline data storing unit 3. The bevel side generating unit 11 then expands point sequence coordinate data in indexed surface data for each bottom plane structure element into the 3-D form, and sets "0" as z coordinates. Similarly, the bevel side generating unit 11 generates a bottom point sequence by expanding outline point sequence coordinate data for the original outline point sequence into the 3-D form, and sets "0" as z coordinates.

After this, the bevel side generating unit 11 vertically lifts a top plane structure element to a height "h", and expands point sequence coordinate data in indexed surface data for each top plane structure element into the 3-D form by setting "h" as z coordinates. Similarly, the bevel side generating unit 11 generates a top point sequence by expanding outline point sequence coordinate data for the original outline point sequence into the 3-D form, and sets "h" as z coordinates. The indexed surface data for each of 3-D top and bottom plane structure elements is outputted to the form data output unit 12 (although this is not the case for a bevel form of a mold type described later).

Figure 12A:
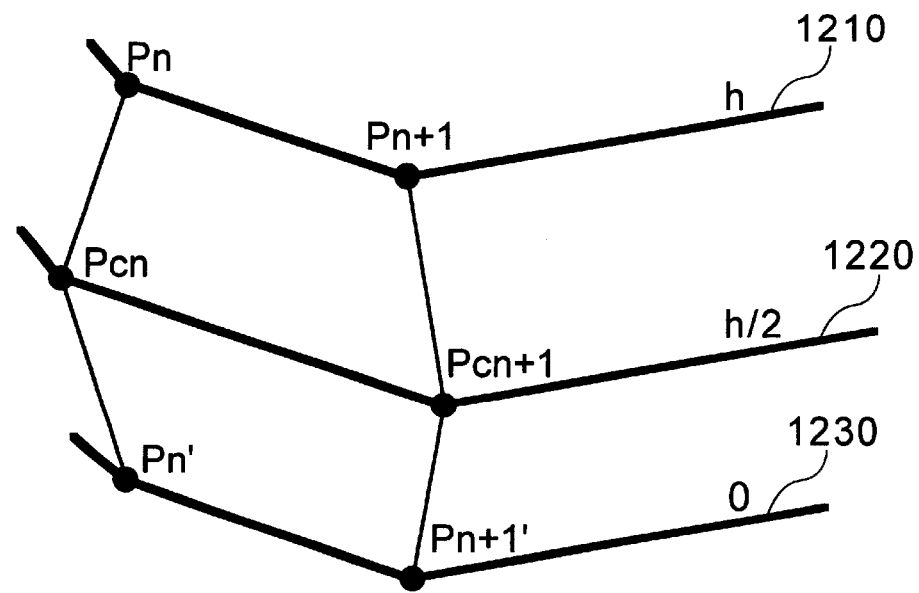
FIG. 12A shows a simplest external form of a bevel side.
Figure 12B:
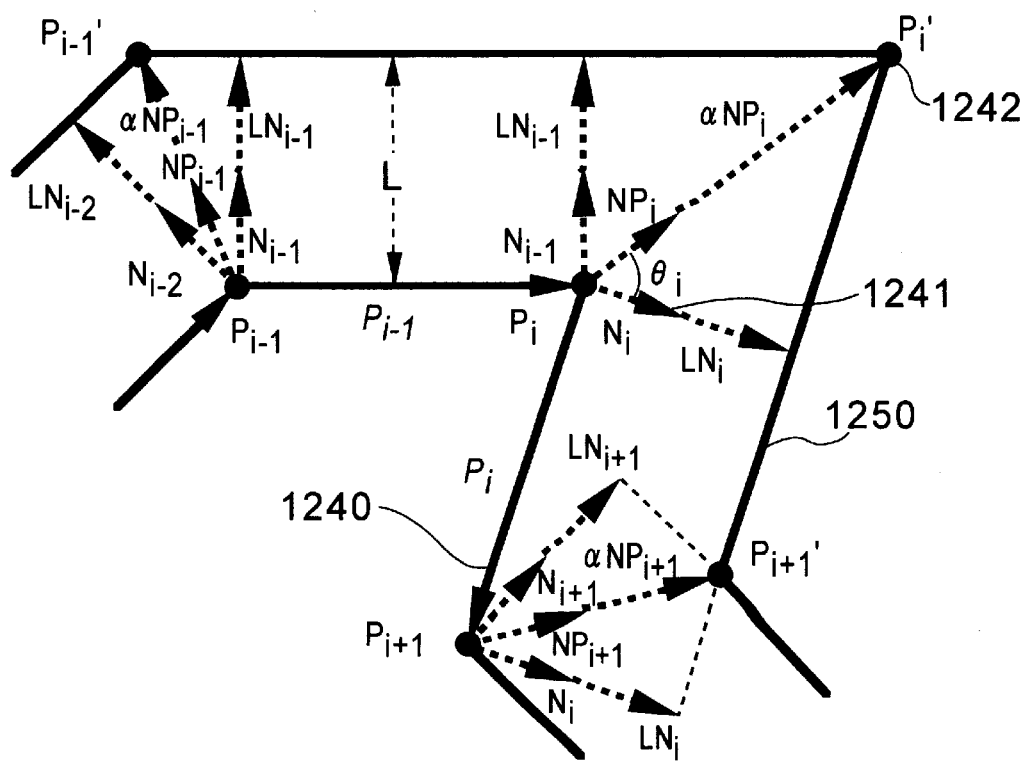
FIG. 12B shows a method for generating an intermediate outline for the bevel side.

FIGS. 12A and 12B show an external form of a bevel and how the intermediate outline for a bevel is generated.

FIG. 12A shows a simplest bevel form. As shown in the figure, an intermediate outline 1220 is generated between a character top plane and a character bottom plane. A bevel is formed in such a way that a section, obtained by diagonally cutting a side plane of a character, forms a convex hexagon. The intermediate outline 120 of the character is generated by enlarging an outline 1210 (or 1230) of a top (or bottom) plane of the character. An intermediate outline of a character hole is generated by reducing a hole outline of a character top (or bottom) plane.

Another bevel form may be generated by cutting a side plane of a character inward and diagonally in such a way that its section forms a concave hexagon. In this case, an intermediate outline of the character is generated by reducing the outline 1210 (or 1230) of a top (or bottom) plane of the character. An intermediate outline of a character hole is generated by enlarging a hole outline of a character top (or bottom) plane. Other combinations of an intermediate outline of a character and an intermediate outline of a character hole may be provided by enlarging or reducing the character outline and the hole outline.

Figure 13:
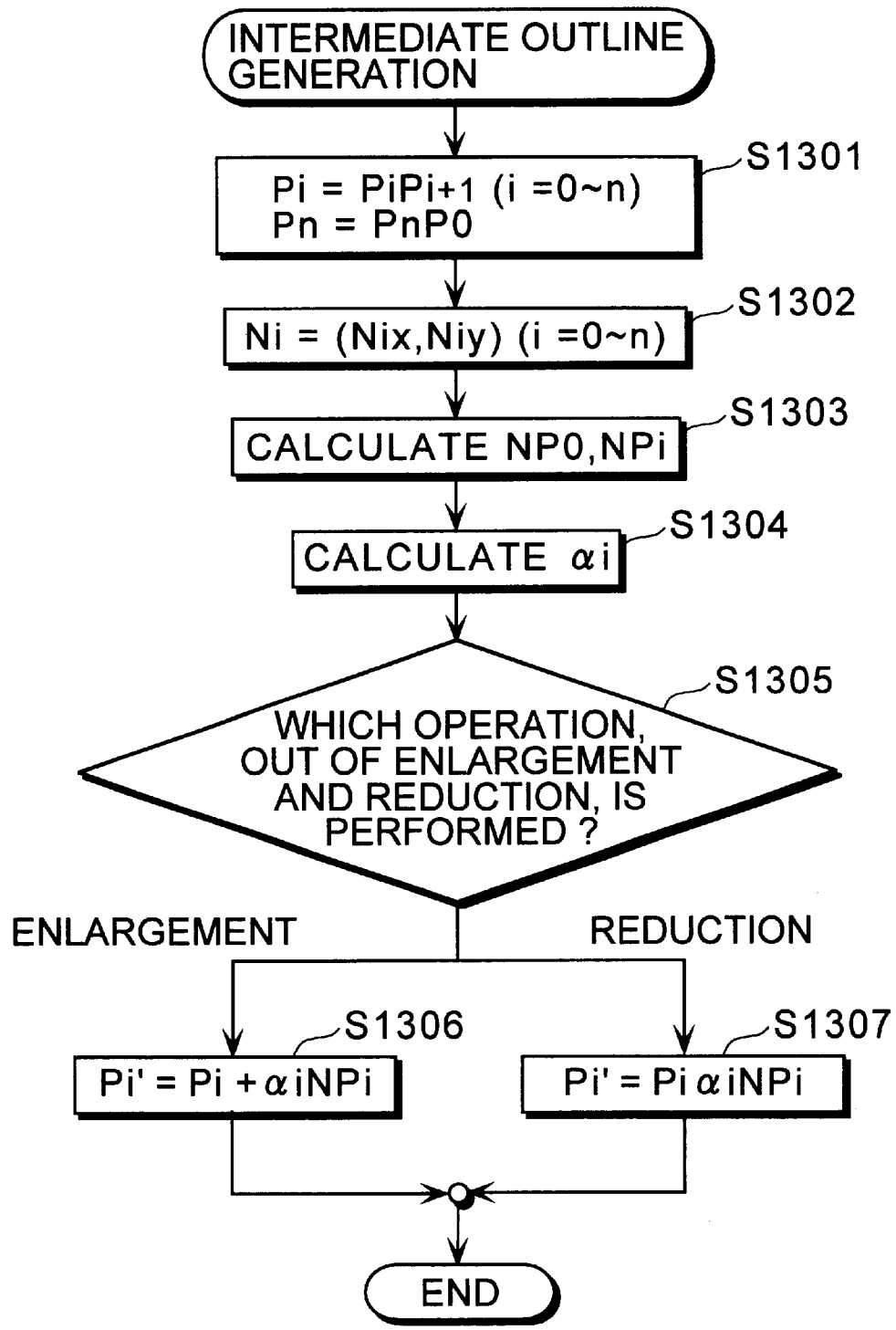
FIG. 13 is a flowchart showing the intermediate outline generating processing.

The following describes a method for generating an intermediate outline with reference to FIG. 12A and a flowchart of FIG. 13.

As stated above, an outline of each structure element needs to be enlarged or reduced to generate an intermediate outline. An intermediate outline is obtained by finding a normal vector of a structure element outline, and moving points of a point sequence of the structure element outline in the direction of the normal. For enlargement, the normal vector is moved in the plus direction, while for reduction, the normal vector is moved in the minus direction. The following describes the intermediate outline generating method with the assumption that points on a structure element outline point sequence are "P0", "P1" . . . "Pn".

Intermediate Outline Generating Method (1) Find a vector "pi=PiPi+1" 1340 (i.e., a vector "pi" containing a starting point "Pi" and an endpoint "Pi+1"). Here, a vector found last is assumed to be "pn=PnP0" (i.e., a vector "pn" containing: (a) a stating point "Pn", which is the last point of the point sequence; and (b) an endpoint "P0", which is the starting point of the point sequence) (step S1301).

(2) Find a normal vector "Ni=(Nix, Niy)" for each vector "pi=(pix, piy)" according to the following algorithm (step S1302). Two normal vectors are found.

In the case of $pix*piy \neq 0$:

$Nix = \pm 1/(1+(pix/piy)2)(1/2)$ $-Niy = \pm +(pix/piy)*1/(1+(pix/piy)2)(1/2)$ In the case of $pix=0, piy \neq 0$:

$Nix = \pm 1, Niy = 0$

In the case of $pix \neq 0, piy=0$:

$Nix = 0, Niy = \pm 1$

Out of the two normal vectors found above, select one normal vector that satisfies an expression below.

Expression: $pix*Niy - piy*Nix > 0$ (3) Find a normal vector "NPi=(NPxi, Npyi)" to each point "Pi" of the outline point sequence according to an expression below (S1303).

$NPi = (Ni-1 + Ni)/\|Ni-1 + Ni\|$ $= ((Ni-1x + Nix)/((Ni-1x + Nix)2 + (Ni-1y + Niy)2))(1/2),$ $(Ni-1y + Niy)/((Ni-1x + Nix)2 + (Ni-1y + Niy)2))(1/2)$

Note that "NP0" is found as follows.

$$NP0 = (Nn - N0)/\|Nn + N0\|$$
$$= ((Nnx + N0x)/((Nnx + N0x)^{}2 + (Nny + N0y)^{}2))^{**}(1/2),$$
$$(Nny + N0y)/((Nnx + N0x)^{}2 + (Nny + N0y)^{}2))^{**}(1/2))$$

(4) Assume that a quantity of enlargement/reduction for the outline point sequence is "L", and calculate "αi" as follows (step S1304). The enlargement/reduction quantity "L" will be specifically described later.

$$\alpha i = L/\cos \theta i = L/(NpixNix + NpiyNiy)$$

Note that, in the case of the structure element outline, there is no possibility of a denominator in the above expression becoming "0" or lower. An error is therefore caused when the denominator becomes "0" or lower.

(5) When each point of the structure element outline is "Pi", find a point "Pi'" 1242, which corresponds to the point "Pi", of the intermediate outline according to an expression below. The points represented by "Pi'" make up a point sequence forming the enlarged intermediate outline (step S1306).

$$Pi' = Pi + \alpha i NPi$$

In the case of a point "Pi'" of the reduced intermediate outline, the point "Pi'" is found by an expression below (step S1307).

$$Pi' = Pi \alpha i NPi$$

With reference to FIG. 12A, the following describes a method for generating a side plane by using the intermediate outline point sequence generated above, the top point sequence, and the bottom point sequence.

The point sequence of the intermediate outline is expanded into the 3-D form by setting "h/2" (i.e., half of a length from the bottom plane to the top plane) as z coordinates. Note that any value between "0" and "h" can be alternatively set as z coordinates. Here, assume that a top point sequence represented by "Pn" and "Pn+1" corresponds to an intermediate outline point sequence "Pcn" and "Pcn+1", and to a bottom point sequence "Pn'" and "Pn+1'", respectively. When an outline of the top plane is connected to the intermediate outline, a side plane "PnPn+1Pcn+1Pcn" (in the case of the clockwise direction) is generated. When the intermediate outline is connected to an outline of the bottom plane, a side plane "PcnPcn+1Pn+1'Pn'" is generated.

Consequently, indexed surface data for the side plane formed by the top plane outline and the intermediate outline is shown as a point sequence "Qi" . . . "Qn", "Qn+1" . . . "Q2n", which is generated by appending the intermediate outline point sequence to the top point sequence (which includes n points). In the case of the counterclockwise direction, an index of "Qi", "Qi+1", "Qi+n+1", "Qi+n" is formed in order. Similarly, indexed surface data for a side plane formed by the intermediate outline and the bottom plane outline is generated.

With reference to FIG. 14, the following describes a method for generating a typical bevel form for which edges of the top and bottom planes are removed. This method is achieved by advancing the above method for generating the intermediate outline so as to generate two intermediate outlines. A method for generating such two intermediate outlines is basically the same as the method described above.

Figure 14A:
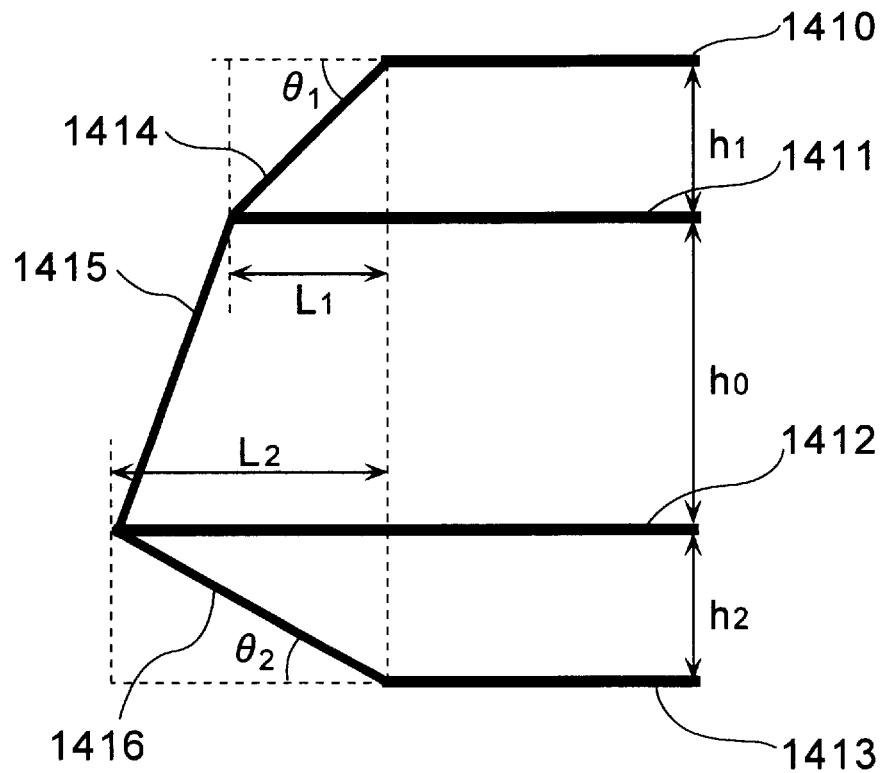
FIG. 14A is a diagram showing a case where two intermediate outlines forming a convex side are generated.

FIG. 14A is a diagram showing a convex side formed by two intermediate outlines. Compared with top and bottom planes of a character, the side of the character juts out. The two intermediate outlines consist of a first intermediate outline 1411 closer to the top plane, and a second intermediate outline 1412 closer to the bottom plane. An edge of the top plane is removed at an angle of "θ1" with respect to the top plane, and an edge of the bottom plane is removed at an angle of "θ2" with respect to the bottom plane. The two intermediate outlines 1411 and 1412 are enlarged from the character outline 1410.

As is clear from FIG. 14A, "tan θi=hi/Li" is satisfied when the top plane character outline 1410 is enlarged to generate the intermediate outline. Accordingly, "hi=Litan θi" can be obtained. In this case, however, "i=1 or 2" must be satisfied. After this calculation, calculate "h0=h−(h1+h2)". Set "h0+h2(=h−h1)" as z coordinates of the first intermediate outline 1411, and set "h2" as z coordinates of the second intermediate outline 1412. This generates point sequences expanded into the 3-D form. Side planes can be generated in basically the same way as the above case of generating one intermediate outline although it should be noted that there are two intermediate outlines in the current case.

Figure 14B:
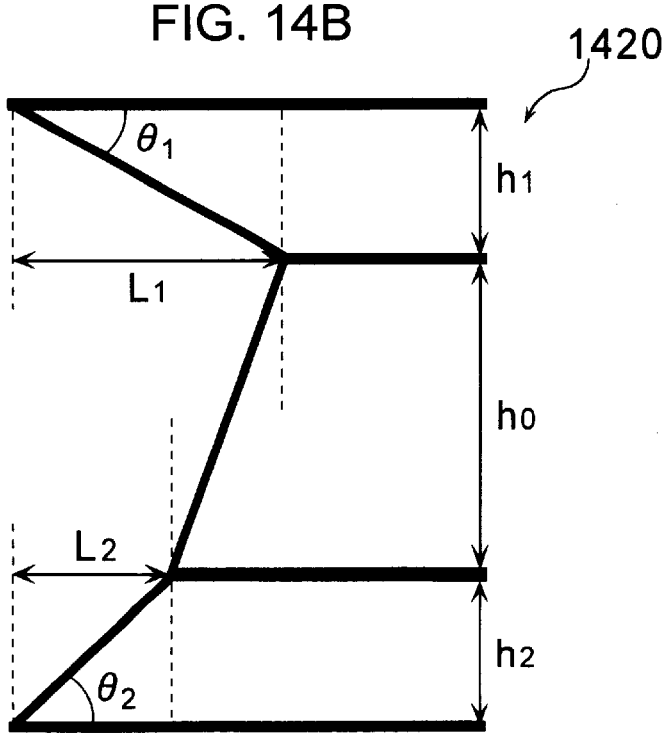
FIG. 14B is a diagram showing a case where two intermediate outlines forming a concave side are generated.

FIG. 14B is a diagram showing, contrary to FIG. 14A, a concave side form generated by two intermediate outlines. In this case, the two intermediate outlines are generated by reducing the top plane outline 1420 although their generation method is basically the same as described for FIG. 14A.

The following describes a method for generating a curved side form of a character with reference to FIG. 15. This is achieved by approximating the curve by using a polygon and generating many intermediate outlines that match with the polygon. The following explanation is provided with the assumption that the curve, based on which the intermediate outlines are generated, is a quadric curve, such as a circle, a parabola, and a spline curve.

Figure 15A:
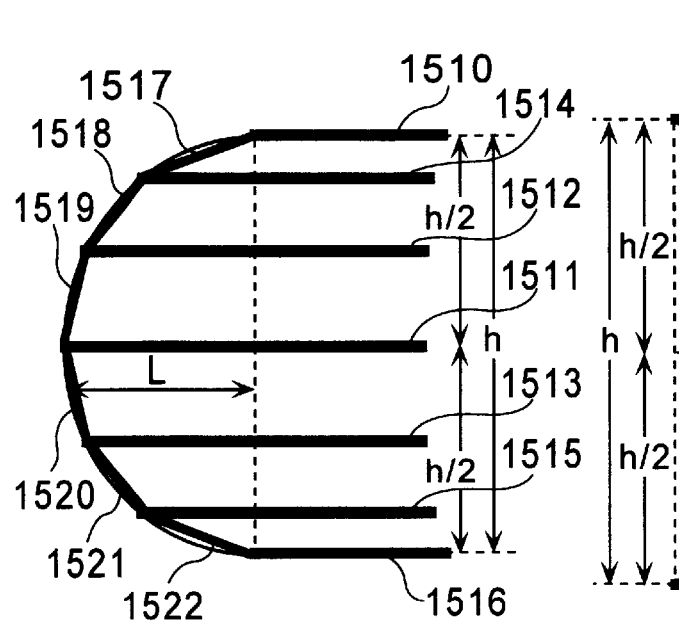
FIG. 15A shows a side having a semicircular convex form.

The following first describes a side form shown in FIG. 15A which is a half-round convex form. Here, assume that an enlargement quantity is "L", a lifted height is "h($\geq$2L)", and a number of generated intermediate outlines is "2n+1" with "n=2" for the current example.

As is clear from FIG. 15A, intermediate outlines are generated symmetrically with respect to a center intermediate outline 1511 that is present at the height of "h/2", i.e., the center of the height "h". Accordingly, once intermediate outlines above (or below) the center intermediate outline 1511 are generated, remaining intermediate outlines below (or above) can be generated using the symmetry. Side planes can be generated based on the same method as described above. What is important in this generation of intermediate outlines is how enlargement quantities for these intermediate outlines (except for the center intermediate outline 1511) and their z coordinates can be obtained. The following describes this calculation method with reference to FIG. 15C.

Figure 15B:
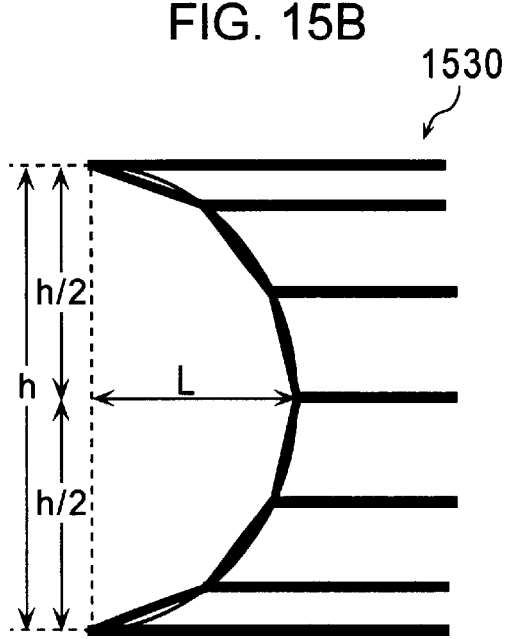
FIG. 15B shows a side having a semicircular concave form.
Figure 15C:
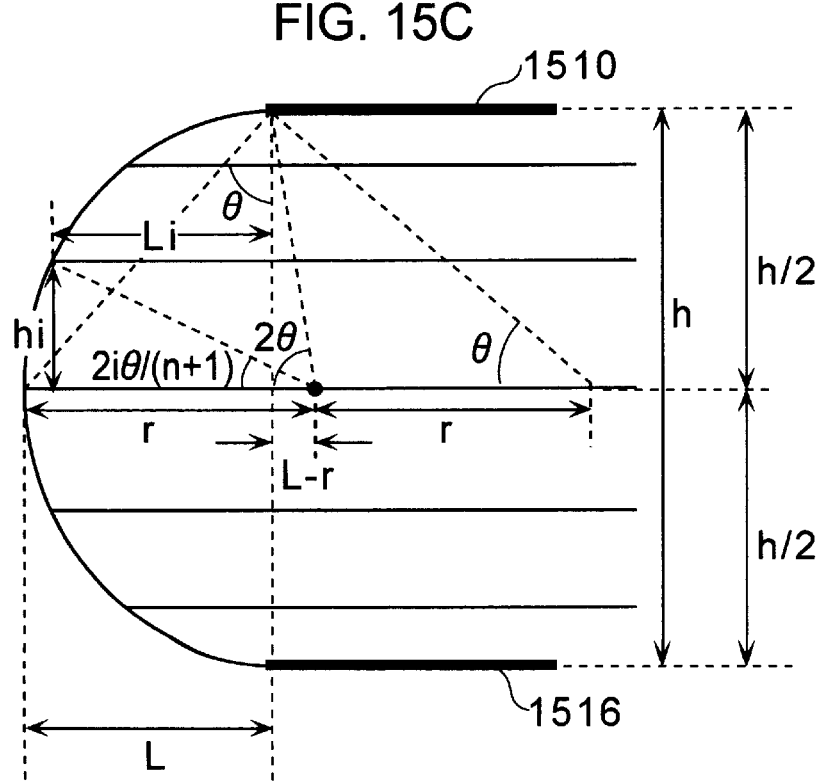
FIG. 15C is a diagram showing a method for calculating each value on an intermediate outline of the side having a semicircular convex form.

For the example in FIG. 15C, assume that the center intermediate outline 1511 is an intermediate outline "0", and other intermediate outlines are assigned numbers "1", "2" . . . , with an intermediate outline farther from the intermediate outline "0" assigned a larger number. An enlargement quantity "Li" and a z coordinate "zi" of an intermediate outline "i" can be obtained by expressions below. In the expression below, "r" indicates a radius of the circle corresponding to the bevel form, and i=0, 1, ... n.

$$Li = L - r(1 - \cos(2i\theta/(n+1)))$$

$$zi = h/2 \pm hi = h/2 \pm r\sin(2i\theta/(n+1))$$

$$r = 1/2L(L^{}2 + h^{}2/4)$$

$$\theta = \arctan(2L/h)$$

Note that a plus value "zi" indicates a z coordinate of an intermediate outline above the center intermediate outline 1511, and a minus value "zi" indicates a z coordinate of an intermediate outline below.

FIG. 15B shows an external view of a concave side form. For this concave side, the above "Li" with a minus sign is used as a reduction quantity although a coordinate "zi" is the same as the case described for FIG. 15A.

The following describes a case in which a side bevel takes a parabola form. As in the above case of the semicircular bevel form, assume that a number of generated intermediate outlines is "2n+1", an enlargement/reduction quantity of an intermediate outline is "Li" and its z coordinate is "zi", with i=0, 1, ... n. For a convex parabola side form, a z coordinate "zi" and an enlargement/reduction quantity "Li" are obtained by the following expressions.

$$Li=L(1-i^{}2/(n+1)^{}2)zi=h/2\pm ih/2(n+1)=h(1\pm i/(n+1))/2$$

Note that a plus value "zi" indicates a z coordinate of an intermediate outline above a center intermediate outline, and a minus value "zi" indicates a z coordinate of an intermediate outline below.

For a concave parabola side form, a value "Li" with a minus sign is used as a reduction quantity, and a z coordinate "zi" is the same as in the case of the convex parabola side form.

When a side form takes a quadratic spline curve, parameters from "0" to "h" are used as virtual z coordinates between a bottom plane and a top plane. The spline curve is generated based on the above parameters and a given control point between the top plane and the bottom plane. This control point is inputted by a user of the 3-D character data generating device 201. Note that endpoints of the top plane and the bottom plane are fixed as "0". Convex/concave quantity formed by the spline curve is an enlargement/reduction quantity. A z coordinate of a parameter is a z coordinate of an intermediate outline. In this way, intermediate outlines are generated based on the quadratic spline line, and then side planes of a character are generated in a similar way to that described above.

Figure 16:
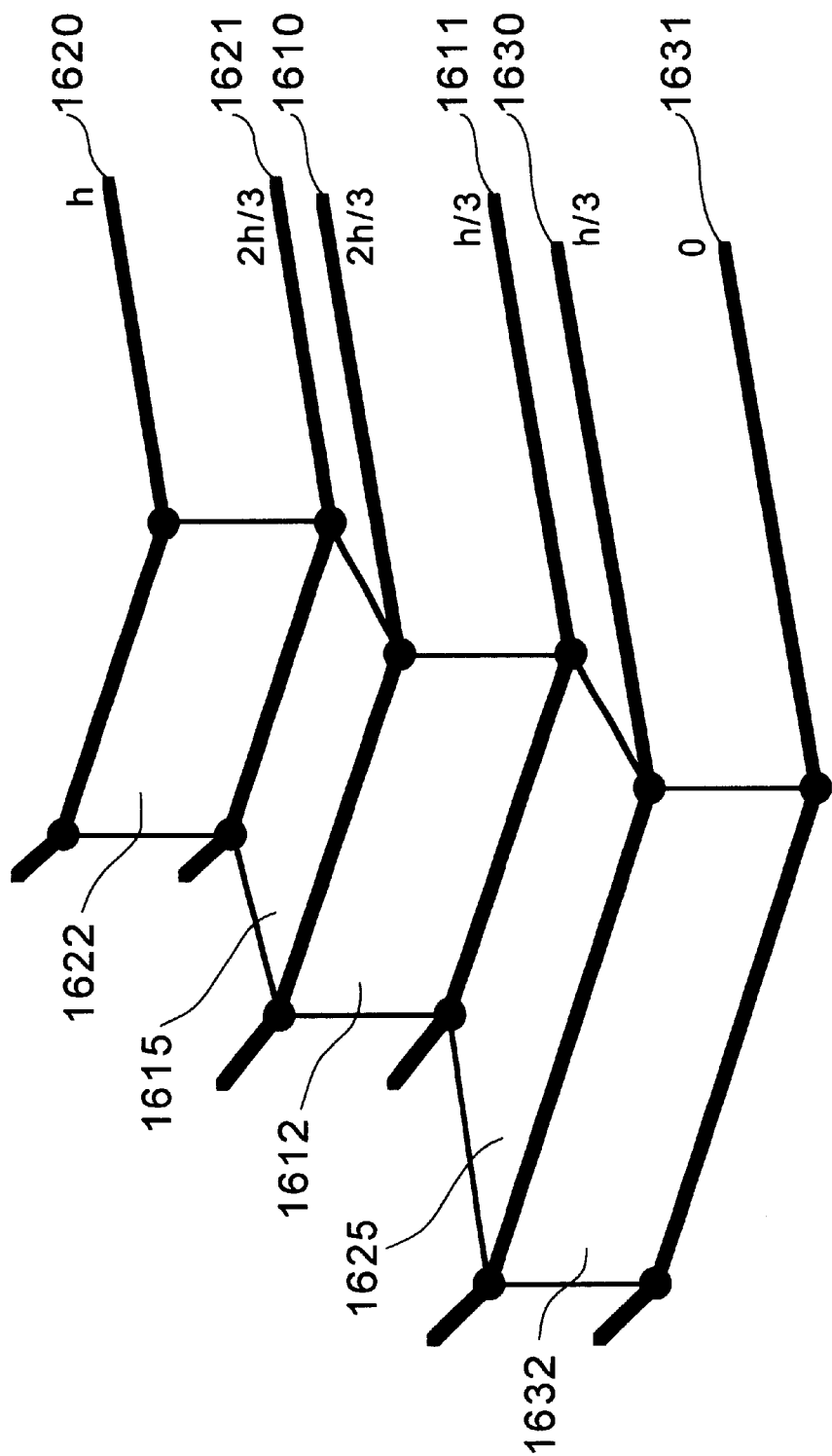
FIG. 16 shows a state in which a bevel form of a mold type is generated.

Lastly, a method for generating a bevel form of the mold type is described with reference to FIG. 16. The mold-type bevel form can be generated with a method that modifies the above method with which two intermediate outlines are generated. The following shows a procedure for generating a bevel form of a three-stage mold type.

(1) Generate the following intermediate outlines according to the stated method: outlines 1610 and 1611 that are the same as an original outline of a structure element (although z coordinates of the two do not need to be the same); two outlines 1620 and 1621 generated by reducing the original outline; and outlines 1630 and 1631 generated by enlarging the original outline.
(2) Assume that a lifted height is "h", which is either inputted from the periphery, or a default value. Specify z coordinates of the two reduced intermediate outlines 1620 and 1621 as "h" and "2h/3", respectively, and specify z coordinates of the two intermediate outlines 1610 and 1611, which are equal to the original outline, as "2h/3" and "h/3", respectively. Specify z coordinates of the two enlarged intermediate outlines 1630 and 1631 as "h/3" and "0", respectively.
(3) Regard a plane formed by the higher intermediate outline 1620 out of the reduced outlines 1620 and 1621 as a top plane structure element. Set "h" as z coordinates of a point sequence of the higher intermediate outline 1620 (i.e., the top plane is generated by the reduced intermediate outline 1620 having z coordinates of "h").
(4) Regard a plane formed by the lower intermediate outline 1631 out of the enlarged outlines 1630 and 1631 as a bottom plane structure element. Set "0" as z coordinates of a point sequence of the lower intermediate outline 1631 (i.e., the bottom plane is generated by the enlarged intermediate outline 1631 having z coordinates of "0").
(5) Connect points of the reduced intermediate outline 1620 to corresponding points of the outline 1621 to generate a side plane 1622 of a highest stage in the same way as described above.
(6) Connect points of the reduced intermediate outline 1621 (with z coordinates of "2h/3") to corresponding points of the intermediate outline 1610 (with z coordinates of "2h/3") to generate a top horizontal plane 1615 of a middle stage in the same way as described above.
(7) Connect points of the intermediate outline 1610 to corresponding points of the intermediate outline 1611 to generate a side plane 1612 of the middle stage in the same way as described above.
(8) Connect points of the intermediate outline 1611 (with z coordinates of "h/3") to corresponding points of the enlarged intermediate outline 1630 (with z coordinates of "h/3") to generate a top horizontal plane 1625 of a bottom stage in the same way as described above.
(9) Connect corresponding points of the enlarged intermediate outlines 1630 and 1631 to generate a side plane 1632 of the bottom stage in the same way as described above.

When top and bottom planes are generated according to the above method, correspondence of an index of an outline does not change as long as triangle division is performed for original structure element. Accordingly, it is necessary to only reduce or enlarge point sequence coordinate data in the indexed surface data. In this case, indexed surface data for the original top and bottom plane structure elements are not outputted to the form data output unit 12. Instead, the indexed surface data generated here is outputted.

The form data output unit 12 combines the indexed surface data for top and bottom plane structure elements of a character with indexed surface data for bevel side plane structure elements by using a hierarchical representation. The form data output unit 12 then outputs it to the periphery. When a format of the data needs to be converted, the format conversion is first performed and then the converted data is outputted.

FIGS. 17A–17D show four types of bevel forms according to the first and second embodiments.

Figure 17B:
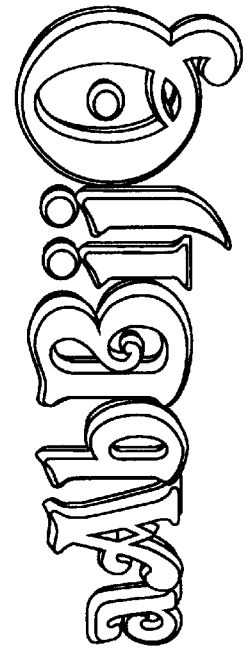
FIG. 17B shows an example of a bevel form whose section is a projecting convex hexagon.
Figure 17D:
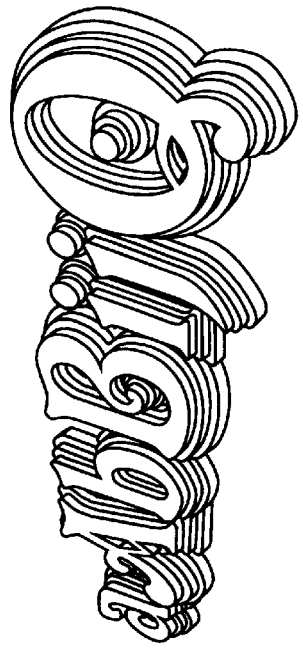
FIG. 17D shows a bevel form of the mold type.
Figure 17A:
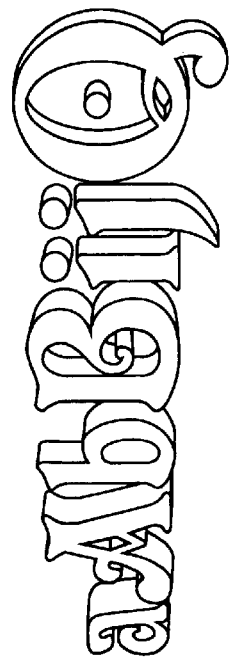
FIG. 17A shows a side form obtained when a character top plane of the first embodiment is vertically lifted.
Figure 17C:
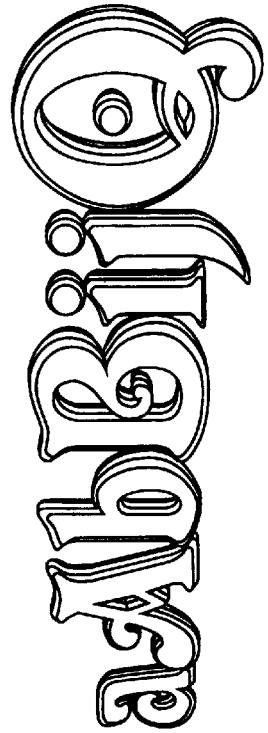
FIG. 17C shows a bevel form generated based on two intermediate outlines, with edges of its top and bottom planes removed at the same angle with respect to their respective outlines to form a section with a convex-trapezoid form.

FIG. 17A shows a side form generated by lifting a top plane of a character in the vertical direction according to the first method of the first embedment. This side form is called a "non-bevel type" as shown in the figure. FIG. 17B shows a bevel form whose section is a projecting convex hexagon, as shown in FIG. 14A. FIG. 17C shows a bevel form generated based on two intermediate outlines. For this bevel form, edges of the top and bottom planes are removed at the same angle with respect to their respective outlines to form a section with a convex-trapezoid form. FIG. 17D shows the bevel form of the molding type shown in FIG. 16.

As has been described, the 3-D character data generating device 201 of the present embodiment generates intermediate outlines, based on which side planes are generated. As a result, a variety of side forms of 3-D characters can be automatically generated.

Third Embodiment

The present embodiment describes a 3-D character data generating device 301 that interpolates points between points of character and hole outline point sequences to generate a 3-D representation with higher definition. In the following explanation, structure elements that are the same as described above will not be described.

Figure 18:
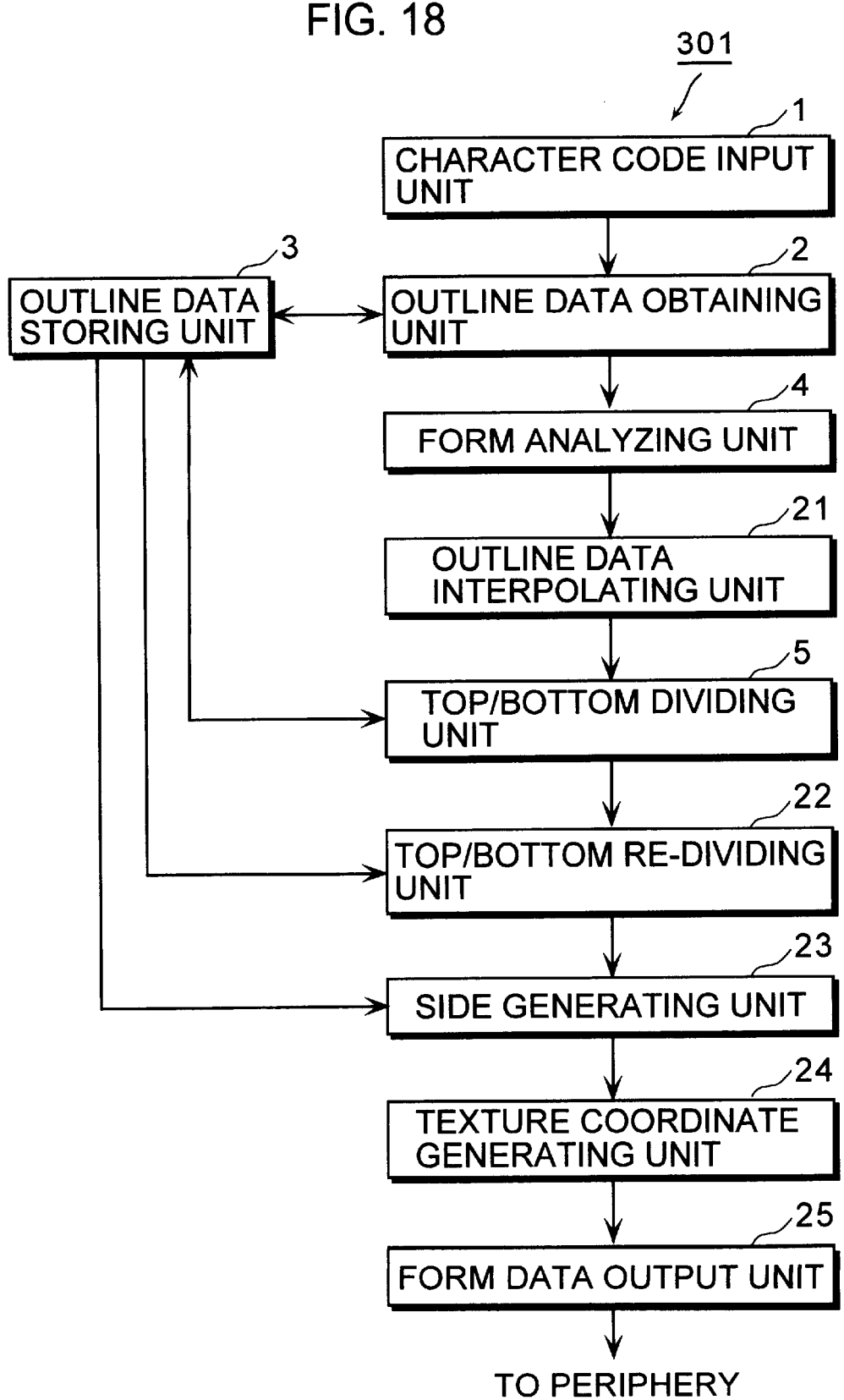
FIG. 18 is a block diagram showing a 3-D character data generating device of the third embodiment.

FIG. 18 is a block diagram showing a function configuration of the 3-D character data generating device 301 of the present embodiment. The 3-D character data generating device 301 includes the following units that are unique to the present embodiment: an outline data interpolating unit 21; a top/bottom re-dividing unit 22; and a texture coordinate generating unit 24. The device 301 also includes a side generating unit 23 and a form data output unit 25, instead of the unit 6 and the unit 7, respectively. The following describes this 3-D character data generating device 301 in detail.

The outline data interpolating unit 21 receives character and hole outline point sequences from the form analyzing unit 4, and interpolates points into these outline point sequences to generate a 3-D character representation with higher definition. The following describes a method for interpolating points into character and hole outline point sequences.

(1) Calculate a total of lengths between every two consecutive points of each of character and hole outline point sequences sent from the form analyzing unit 4. Calculate also a total number of points included in each outline point sequence.
(2) Divide the calculated total length by the calculated total number of points to produce an average length. Divide the produced average length by a number corresponding to a given level of definition to produce a standard length.
(3) When a length between two consecutive points of the hole outline point sequence or the character outline point sequence is longer than the produced standard length, an intermediate point is generated to shorten the length between the two points to the standard length or shorter. This intermediate point is generated on one of a line and a curve which are produced above (1) and indicated in outline data stored in the outline data storing unit 3. When an intermediate point is interpolated on an existing point sequence, numbers are reassigned to these points without changing their arranged order.

FIG. 19 shows an example for which intermediate points are interpolated into point sequences for the character "回". As shown in the figure, three intermediate points are interpolated into each side of a character outline point sequence 1911, and two points are interpolated into each side of a hole outline point sequence 1912. Similarly, one intermediate point is interpolated into each side of character and outline point sequences 1913 and 1914.

In this way, intermediate points are interpolated into outline data for each structure element, and the outline data is corrected accordingly. The outline data interpolating unit 21 then outputs the corrected outline data to the top/bottom dividing unit 5.

The top/bottom re-dividing unit 22 further divides a triangle divided by the top/bottom dividing unit 5. This dividing processing is performed for the following reason. Vertexes of a triangle generated by the top/bottom dividing unit 5 exist on a character outline point sequence. As a result, the character outline is lineally deformed when it is bent or twisted, so that the character having an improper form is generated. This can be prevented by re-dividing a triangle generated by the top/bottom dividing unit 5.

This re-dividing method is described below with reference to FIGS. 20–22.

Figure 20:
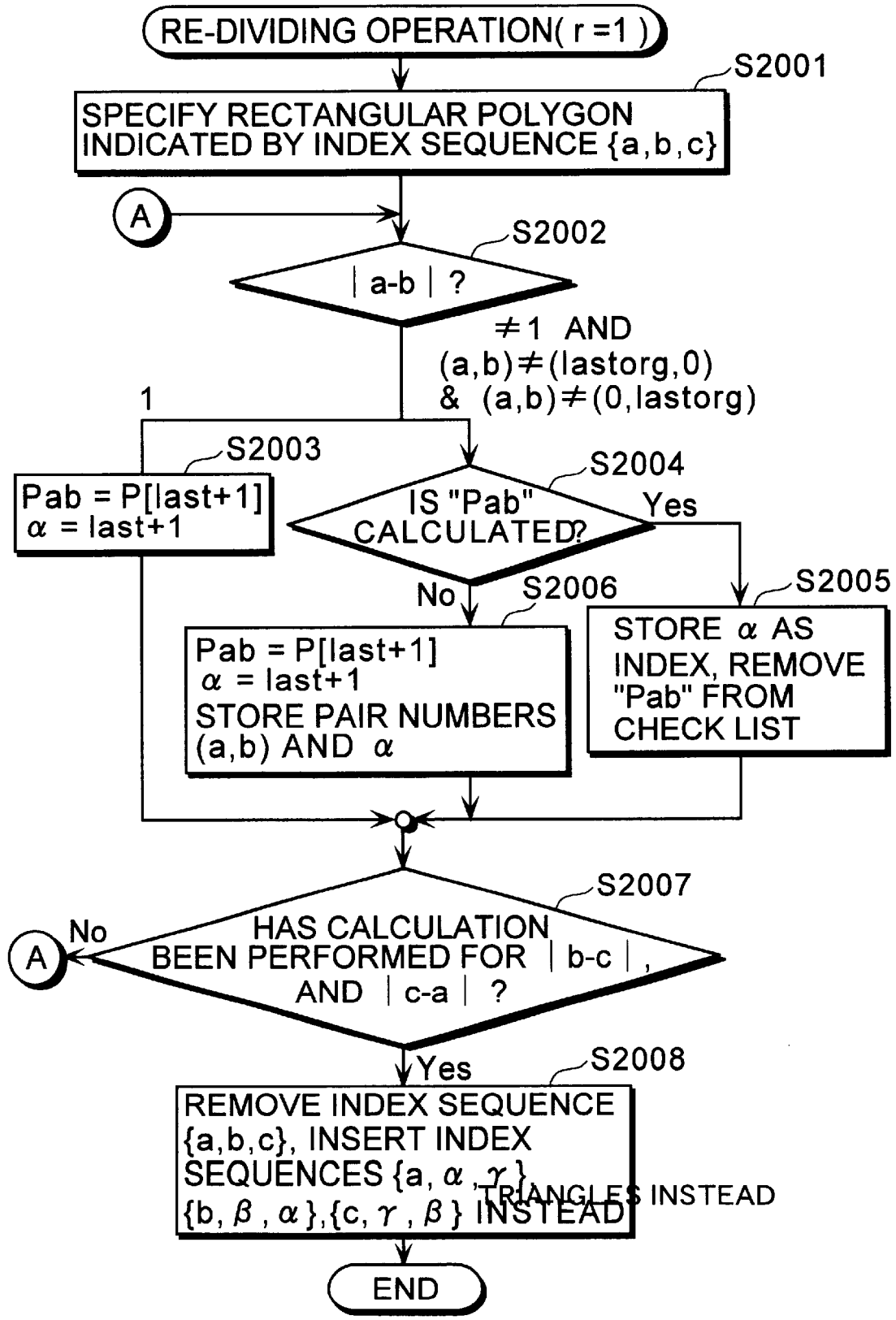
FIG. 20 is a flowchart showing the processing to re-divide an original rectangle into four triangles.

FIG. 20 is a flowchart showing the re-dividing procedure to divide an original triangle into four triangles.

Figure 22A:
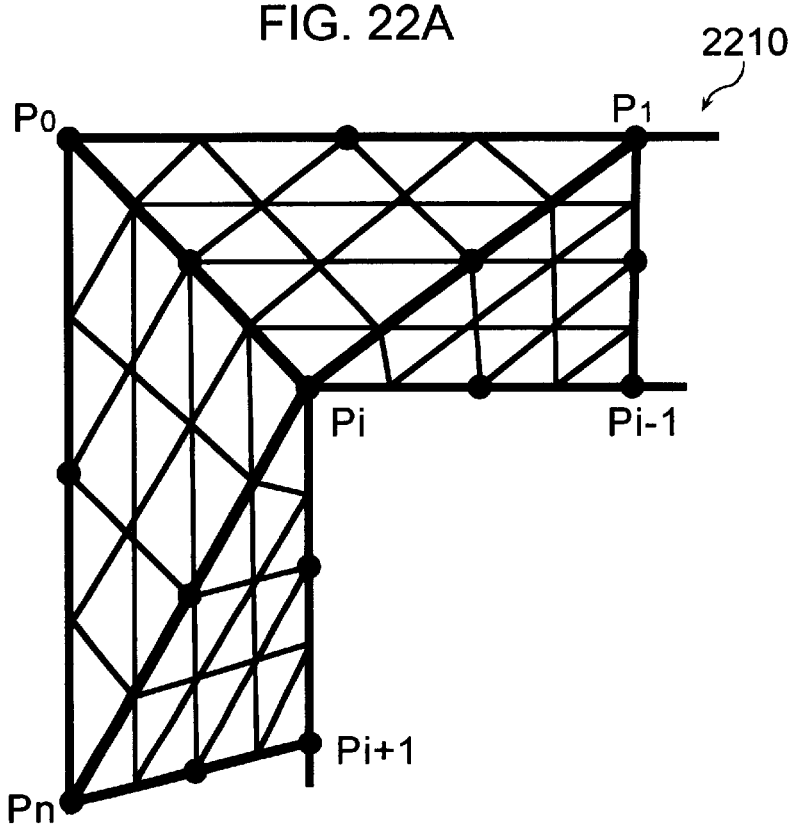
FIG. 22A shows a method to divide a triangle by using a midpoint of a side of the triangle.

FIG. 22A is a drawing used to describe the re-dividing method that uses a midpoint of a side of a triangle.

This re-dividing method shown in FIG. 22A is used for the present embodiment. According to this method, a midpoint of each side of a triangle is found, and three line segments are produced by connecting found midpoints. These three line segments divide the original triangle into four triangles. Accordingly, a number of triangles increases by four times each time a triangle is divided.

Here, assume that the integrated point sequence generated by the top/bottom dividing unit 5 is specified by {P[0], P[1], ... P[n]}, and the character outline point sequence is specified by {Po[0], Po[1], ... Po[I]}, and the hole outline point sequence by {Ph[x][0], Ph[x][1], ... Ph[x][kx]}. The following describes an algorithm of the re-dividing method applied to a triangular polygon specified by an index sequence {a, b, c}.

(1) Calculate values of |a–b|, |b–c|, and |c–a|.
(2) When an equality |a–b|=1 is satisfied, calculate a midpoint "Pab" for a line segment "P[a]P[b]", append "Pab=P[last+1]" into the end of the point sequence, and store an index "last+1=α".
(3) When expressions "|a–b|≠1" and "(a, b)≠(lastorg, 0) & (a, b)≠(0, lastorg)" are satisfied (with "lastorg" indicating a last value of an index of the point sequence obtained before division is performed), check whether the midpoint "Pab" for "P[a]P[b]" has been found. If so, "α" is stored as an index of the midpoint, and the midpoint is deleted from a check list, which is described later. If the midpoint "Pab" has not been found, find the midpoint "Pab", append "Pab=P[last+1]" to the end of the point sequence, and store index "last+1=α". At the same time, store a pair of indexes "(a, b)", and "α" into the check list. Consequently, the check list includes the pair of indexes and an index generated by the pair. In this checking, pairs are compared in random order.
(4) Perform the above operations in (2) and (3) for |b–c| and |c–a|, and store an index "β" for |b–c|, and an index "γ" for |c–a|.
(5) Remove the index sequence {a, b, c} defining the triangle, and instead add four index sequences defining four triangles, namely, {a, α, γ}, {b, β, α}, {c, γ, β}, and {α, β, γ}.

The following describes the processing to reconstruct a character outline point sequence in accordance with a result of the above re-dividing operation. The following operation is performed for a point sequence of an original character outline.

(1) For a character point sequence {Po[0], Po[1] ... Po[n]}, find a midpoint "W[I]" of each segment "Po[I]Po[I+1]" (I=0, 1, ... n; and Po[n+1]=Po[0]).

(2) Multiply the indexes of the character point sequence {Po[0], Po[1] ... Po[n]} by two to change it to {Po[0], Po[2], Po[4], Po[6] ... Po[2n]}, and insert "Po[2I+1]" as "W[I]" into the changed point sequence. As a result, a new character point sequence {Po[0], Po[1], Po[2] ... Po[2n], Po[2n+1]} is generated from re-divided triangles.

By performing operations similar to above, a new hole outline point sequence corresponding to re-divided triangles can be also obtained.

According to the above re-dividing method, the original triangle is divided into four triangles, and therefore a number of triangles increases by four times. Here, assume that an initial state before the re-division is level "0" and one re-division operation increases this level by one. Then, the number of triangles increases by 4r times at the level "r".

With the above re-dividing method, the re-dividing operation needs to be performed r times to reach the re-division level of "r". The following describes a method for increasing this re-division level to "2" or higher through only one re-dividing operation with reference to FIGS. 21 and 22B.

Figure 21:
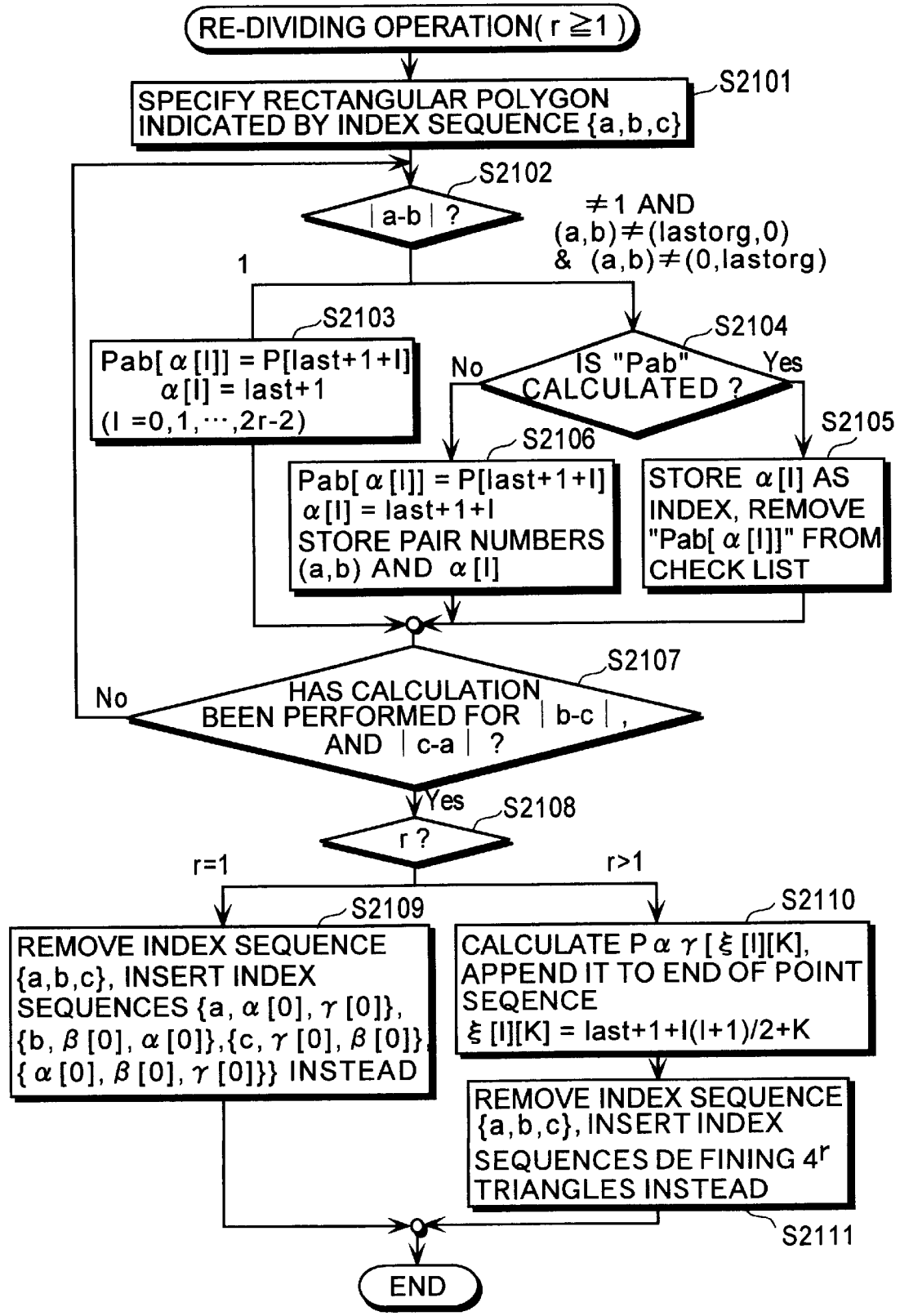
FIG. 21 is a flowchart showing the processing to re-divide a triangle at re-division level "r"

FIG. 21 is a flowchart showing a processing flow of this re-dividing operation.

Figure 22B:
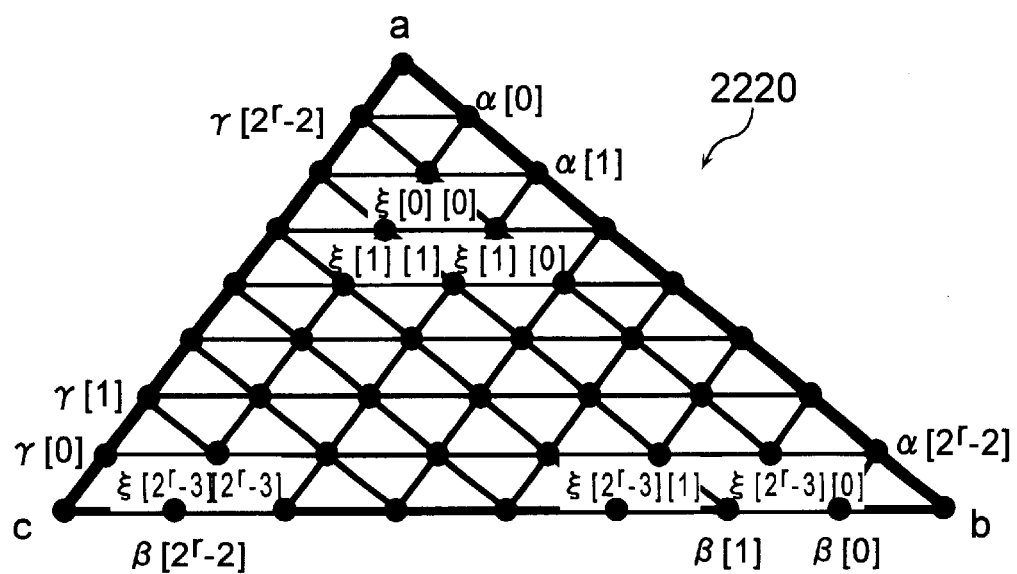
FIG. 22B shows a state in which the re-division level "0" is increased to "r" at a time.

FIG. 22B shows a state obtained when one re-dividing operation that raises the re-division level from "0" to "r" is performed.

In FIG. 22B, "α[I]" (I=0, 1, ... 2**r−2) is an index of a dividing point "Pab[α[I]]" of a line segment "P[a]P[b]". The dividing point "Pab[α[I]]" can be obtained as follows.

$$Pab[\alpha[I]]=\{(I+1)P[b]+(2^{}r-I-1)P[a]\}/2^{}r$$

Similarly, "β[I]" (I=0, 1, ... 2r−2) is an index of a dividing point "Pbc[β[I]]" of a line segment "P[b]P[c]". The dividing point "Pbc[β[I]]" can be obtained as follows.

$$Pbc[\beta[I]]=\{(I+1)P[c]+(2^{}r-I-1)P[b]\}/2^{}r$$

Similarly, "γ[I]" (I=0, 1, ... 2r−2) is an index of a dividing point "Pca[γ[I]]" of a line segment "P[c]P[a]". The dividing point "Pca[γ[I]]" can be obtained as follows.

$$Pca[\gamma[I]]=\{(I+1)P[a]+(2^{}r-I-1)P[c]\}/2^{}r$$

Likewise, "ξ[I][k]" (I=0, 1, ... 2**r−3; and 0≦k≦I) is an index of a dividing point "Pαγ[ξ[I][k]]" of a line segment "P[α]P[γ]". The dividing point "Pαγ[ξ[I][k]]" can be obtained as follows.

$$P\alpha\gamma[\xi[I][k]] = \{(I+1-k)P[\alpha[I+1]]+(k+1)P[\gamma[2^{**}r-I-3]]\}/(I+2)$$

The following describes an algorithm of this re-dividing method based on the above dividing points.

(1) Calculate values of |a−b|, |b−c|, and |c−a|.
(2) When an equality |a−b|=1 is satisfied, find the above dividing point "Pab[α[I]]" (I=0, 1, ... 2**r−2) of the line segment "P[a]P[b]", append the dividing point as "Pab=P[last+1+I]" to the end of the point sequence, and store an index "last+1+I=α[I]".
(3) When expressions "|a−b|≠1" and "(a, b)≠(lastorg, 0) & (a, b)≠(0, lastorg)" are satisfied (with "lastorg" indicating a last value of an index of the point sequence obtained before division is performed), check whether the dividing point "Pab[α[I]]" for the line segment "P[a]P[b]" has been found. If so, "α[I]" is stored as an index of the dividing point, and the dividing point is deleted from the check list, which is described later. If the dividing point "Pab[α[I]]" has not been found, find this dividing point "Pab[α[I]]", append "Pab=P[last+1+I]" to the end of the point sequence, and store an index "last+1+I=α[I]". At the same time, store a pair of indexes "(a, b)", and "α[I]" into the check list. Consequently, the check list includes the pair and an index generated by the pair. For the checking, pairs are compared in random order.
(4) Perform the above operations in (2) and (3) for |b−c| and |c−a|, and find a dividing point of a line segment "P[b]P[c]" and that of a line segment "P[c]P[a]". Add these dividing points if necessary. Store a pair of indexes "(b, c)" and "β[I]", and a pair of indexes "(c, a)" and "γ[I]" in accordance with necessity.
(5) In a case of r>1, find the above dividing point "Pαγ[ξ[I][k]]" of the line segment "P[α]P[γ]", append the found dividing point to the end of the point sequence, and store an index "last+1+I(I+1)/2+k=ξ[I][k]" (I=0, 1, ... 2**r−3; and 0≦k≦I).
(6) In a case of r=1, remove the index sequence {a, b, c} defining the triangle, and instead add four index sequences defining four triangles, namely, {a, α[0], γ[0]}, {b, β[0], α[0]}, {c, γ[0], β[0]}, and {α[0], β[0], γ[0]}.
(7) In a case of r>1, remove the index sequence {a, b, c} defining the triangle, and instead add the following index sequences defining 4r triangles. Calculations are performed in accordance with "I" (I=0, 1, ... 2**r−1).

In a case of I=0:
Add index sequence {a, α[0], γ[2**r−2]} instead.
In a case of I=1:
Add index sequences of {α[0], α[1], ξ[0][0]}, {α[0], ξ[0][0], γ[2r−2]}, and {γ[2−2], ξ[0][0], γ[2**−3]}.
In a case of I=2:
Add index sequences of {α[1], α[2], ξ[1][0]}, {α[1], ξ[1][0], ξ[0][0]}, {ξ[0][0], ξ[1][0], ξ[1][1]}, {ξ[0][0], ξ[1][1], γ[2r−3]}, and {γ[2r−3], ξ[1][1], γ[2**r−4]}.
In a case of 3≦I≦2r−2:
Add index sequences of {α[I−1], α[I], ξ[I−1][0]} and {α[I−1], ξ[I−1][0], ξ[I−2][0]}, and repeatedly add a pair of sequences {ξ[I−2][k], ξ[I−1][k], ξ[I−1][k+1]} and {ξ[I−2][k], ξ[I−1][k+1], ξ[I−2][k+1]} (0≦k≦I−3; and addition of this pair is repeated I−2 times), and add {ξ[I−2][I−2], ξ[I−2][I−2], ξ[I−1]}, {ξ[I−2][I−2], ξ[I−1][I−1], γ[2r−1−I]}, and {γ[2r−1−I], ξ[I−1][I−1], γ[2**r−2−I]}.
In a case of I=2**r−1:
Add index sequences of {α[2r−2], b, β[0]} and {α[2r−2], β[0], ξ[2r−3][0]}, and repeatedly add a pair of sequences {ξ[2r−3][k], β[k], β[k+1]} and {ξ[2r−3][k], β[k+1], ξ[2r−3][k+1]} (0≦k≦2r−4; and addition of this pair is repeated 2r−3 times), and add sequences {ξ[2r−3][2r−3], β[2r−3], β[2r−2]}, {ξ[2r−3][2r−3]β[2r−2], γ[0]}, and {γ[0], ξβ[2r−2], c}.

The following describes the processing to reconstruct the character outline point sequence.

(1) For a character outline point sequence {Po[0], Po[1] ... Po[n]}, find a dividing point "W[I][k]" of a line segment "Po[I]Po[I+1]" obtained when the character point sequence is divided into 2r triangles (I=0, 1, ... n Po[n+1]=Po[0]; and k=0, 1, ... 2r−2). Each dividing point "W[I][k]" is found using an expression below.

$$W[I][k]=\{(k+1)Po[I+1]+(2^{}r-k-1)Po[I]\}/2^{}r$$

(2) Multiply indexes of the character point sequence {Po[0], Po[1], ... Po[n]} by $2^{}r$ to generate a point sequence {Po[0], Po[$2^{}r$], Po[$2^{*}2^{**}r$], Po[$3^{*}2^{**}r$] ... Po[$n^{*}2^{**}r$]}, and add "Po[$I^{*}2^{}r+k+1$]" as "W[I][k]" into the generated point sequence (I=0, 1, ... n; and k=0, 1, ... $2^{}r-2$). This generates a new character outline point sequence {Po[0], Po[1], Po[2], Po[3], Po[4], ... Po[$n^{*}2^{**}r$], Po[$n^{*}2^{**}r+1$]}, Po[$(n+1)^{*}2^{**}r-1$]}, which is formed by re-divided triangles. The point sequence of a hole outline can be also re-constructed by performing operations similar to above.

When the top/bottom re-dividing unit 22 stores data corresponding to the original re-division level "0", it becomes possible to reverse a finely divided triangle into a roughly divided triangle by always performing re-division, starting at the re-division level "0". For instance, when the re-division level "r" needs to be lowered to the level "p", data for the level "r" is first discarded, and then data for the level "p" is generated by starting re-division at the level "0". This can provide a re-divided state transition that looks as if a re-divided state at the level "r" directly changed into a re-divided state at the level "p".

The side generating unit 23 generates indexed surface data for top, bottom, and side planes of each character structure element in a similar way to the side generating unit 6 of the first embodiment and the bevel side generating unit 11 of the second embodiment. The side generating unit 23 then outputs the generated indexed surface data to the texture coordinate generating unit 24.

The texture coordinate generating unit 24 generates a smallest possible square that contains both the top and bottom planes. The generated square is moved in parallel to itself in such a way that a lowest point of the square coincides with a lowest point of the bottom plane at the origin. The texture coordinate generating unit 24 then finds coordinates of the translated point sequences, and divides the found coordinates by a length of a side of the square. The divided coordinates are used as mapping coordinates, which correspond to coordinates of the normalized denotative square. For the side plane, the texture coordinate generating unit 24 finds a circumference length (i.e., a total of a length between each two consecutive points of the point sequence) for a closed curve that forms each of a character outline and a hole outline. The texture coordinate generating unit 24 then assigns, as parameters ($0 \leq s \leq 1$) showing a length between a starting point and each point, a ratio between: (a) a length from the starting point to each point; and (b) the circumference length. (A starting point is assigned parameters "0" and "1".) As for the height direction, the bottom plane is assigned "t=0" and the top plane is assigned "t=1".

Texture coordinates may be alternatively determined as follows. A cylinder that contains a structure element (or all the structure elements) is provided. Cylindrical coordinate system is defined in this cylinder, and a vertex of the structure element is projected from a center coordinate of the cylinder to produce coordinates in the cylindrical coordinate system. Texture coordinates can be determined using such coordinates in the cylindrical coordinate system. In this case, the cylindrical coordinate system needs to be normalized. Alternatively, a sphere that contains a structure element (or all the structure elements) may be used. Polar coordinates are defined in this sphere, and a vertex of the structure element is projected from a center of the sphere to produce coordinates in the polar coordinate system. Texture coordinates can be determined using such coordinates in the polar coordinate system. In this case, the polar coordinate system needs to be normalized.

The texture coordinates generated above are added, as a point sequence, to indexed surface data in such a way that order of texture coordinates coincides with that of coordinates indicated in point sequence coordinate data in the indexed surface data. The texture coordinate generating unit 24 then outputs them to the form data output unit 25.

The form data output unit 25 receives the indexed surface data, to which the texture coordinates are added, for each top and bottom structure element, and also receives indexed surface data, to which the texture coordinates are added, for each side structure element. The form data output unit 25 then puts them together by using a hierarchical representation, and outputs it to the periphery. When a format of this data needs to be converted, the format conversion is first performed and then converted data is outputted.

As has been described, the 3-D character data generating device of the present embodiment interpolates points between points of character and hole outline point sequences, and polygon division is performed based on these points. This makes it possible to generate 3-D characters with higher definition.

Fourth Embodiment

The first embodiment describes an example for which a 3-D character is generated. The present embodiment describes an example for which a base having a cylindrical form or other form is provided below the 3-D character. Structure elements of the present embodiment that are the same as in the first embodiment will not be described.

Figure 23:
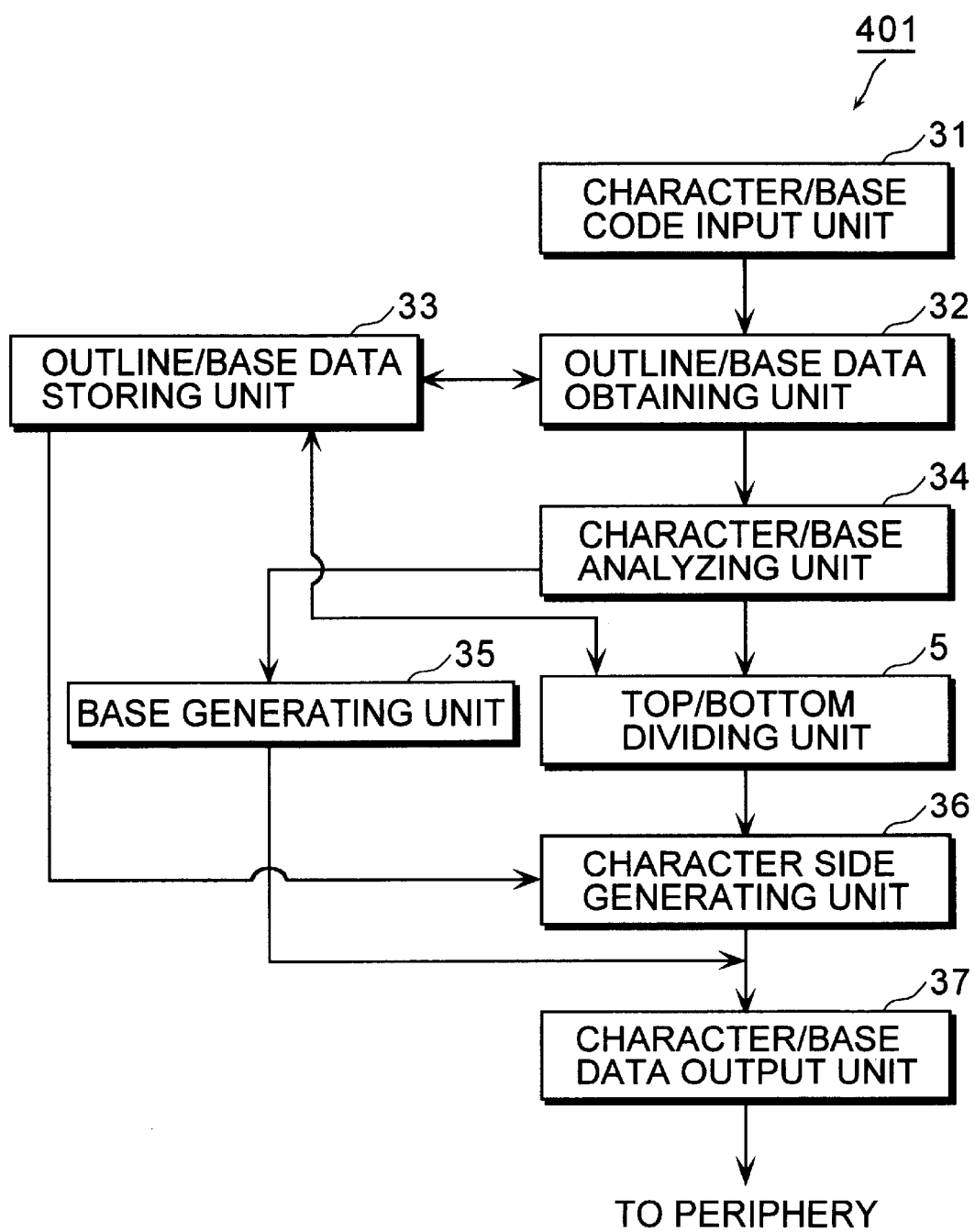
FIG. 23 is a block diagram showing a function configuration of a 3-D character data generating device according to the fourth embodiment.

FIG. 23 is a block diagram showing a function configuration of a 3-D character data generating device 401 according to the fourth embodiment. The 3-D character data generating device 401 includes a base generating unit 35 that is unique to the present embodiment. The 3-D character data generating device 401 also includes the following units: a character/base code input unit 31 instead of the character code input unit 1; an outline/base data obtaining unit 32 instead of the outline data obtaining unit 2; an outline/base data storing unit 33 instead of the outline data storing unit 3; a character/base analyzing unit 34 instead of the form analyzing unit 4; a character side generating unit 36 instead of the side generating unit 6; and a character/base data output unit 37 instead of the form data output unit 7. The following describes the above 3-D form generating unit 401 in more detail.

Like the character code input unit 1 of the first embodiment, the character/base code input unit 31 is an input unit, such as a keyboard and a mouse. The character/base code input unit 31 converts an input signal to generate a character code such as an ASCII code and a JIS code, and a base code that specifies a base form. The generated character code and base code are outputted to the outline/base data obtaining unit 32.

The outline/base data obtaining unit 32 obtains, from the outline/base data storing unit 33, outline data for a character associated with the above character code, and 3-D base data associated with the above base code.

The outline/base data storing unit 33 stores, in advance, outline data associated with character codes in a similar way to the outline data storing unit 3 of the first embodiment. The outline/base data storing unit 33 additionally stores 3-D base data associated with base codes.

The obtained outline data and 3-D base data are outputted to the character/base analyzing unit 34. Note that the 3-D base data includes information that defines which plane is a top plane of the base.

The character/base analyzing unit 34 generates, for a character, form analyzing information, as does the form analyzing unit 4 of the first embodiment. This form analyzing information specifies, for each hole, a sole character part that includes the hole. The character/base analyzing unit 34 also calculates the following values: a boundary box corresponding to the whole character; center coordinates of the boundary box; a 3-D boundary box (a rectangular parallelepiped) corresponding to the base; center coordinates of a boundary box corresponding to the top plane of the base; and a base scaling quantity. The following describes the base scaling quantity. An "enlarged rectangle" is produced by adding a predetermined margin quantity to the boundary box of the character. The base scaling quantity is a smallest quantity that allows this enlarged rectangle to be contained in the boundary box of the base top plane when the boundary box of the character is moved in such a way that the center of the character boundary box coincides with the center of the base-top boundary box. Form analyzing information for the character is sent to the top/bottom dividing unit 5, where it is processed as described in the first embodiment. The center coordinates of the enlarged rectangle, center coordinates of the base top plane, and the base scaling quantity are sent to the base generating unit 35.

The base generating unit 35 performs scaling conversion on the 3-D base data by using the base scaling quantity sent from the character/base analyzing unit 34. After this, the base generating unit 35 moves the scaling-converted 3-D base data in parallel to itself in such a way that center coordinates of the base obtained after the scaling conversion coincides with those of the character. The base generating unit 35 then corrects 3-D coordinates of the moved base, and outputs the converted 3-D base data to the character/base data output unit 37.

The character side generating unit 36 generates a top plane, a bottom plane, a side plane, and a bevel side in accordance with each structure element, and outputs them to the character/base data output unit 37, as do the side generating unit 6 of the first embodiment and the bevel side generating unit 11 of the second embodiment.

The character/base data output unit 37 receives the following sets of data: the 3-D base data sent from the base generating unit 35; and indexed surface data for each of top, bottom, side planes based on structure elements. The character/base data output unit 37 puts together these sets of data by using a hierarchical representation, and outputs it to the periphery. When a format of data needs to be converted into a certain format, the data is first represented as indexed surface data, and then converted into data in the certain format.

Figure 24:
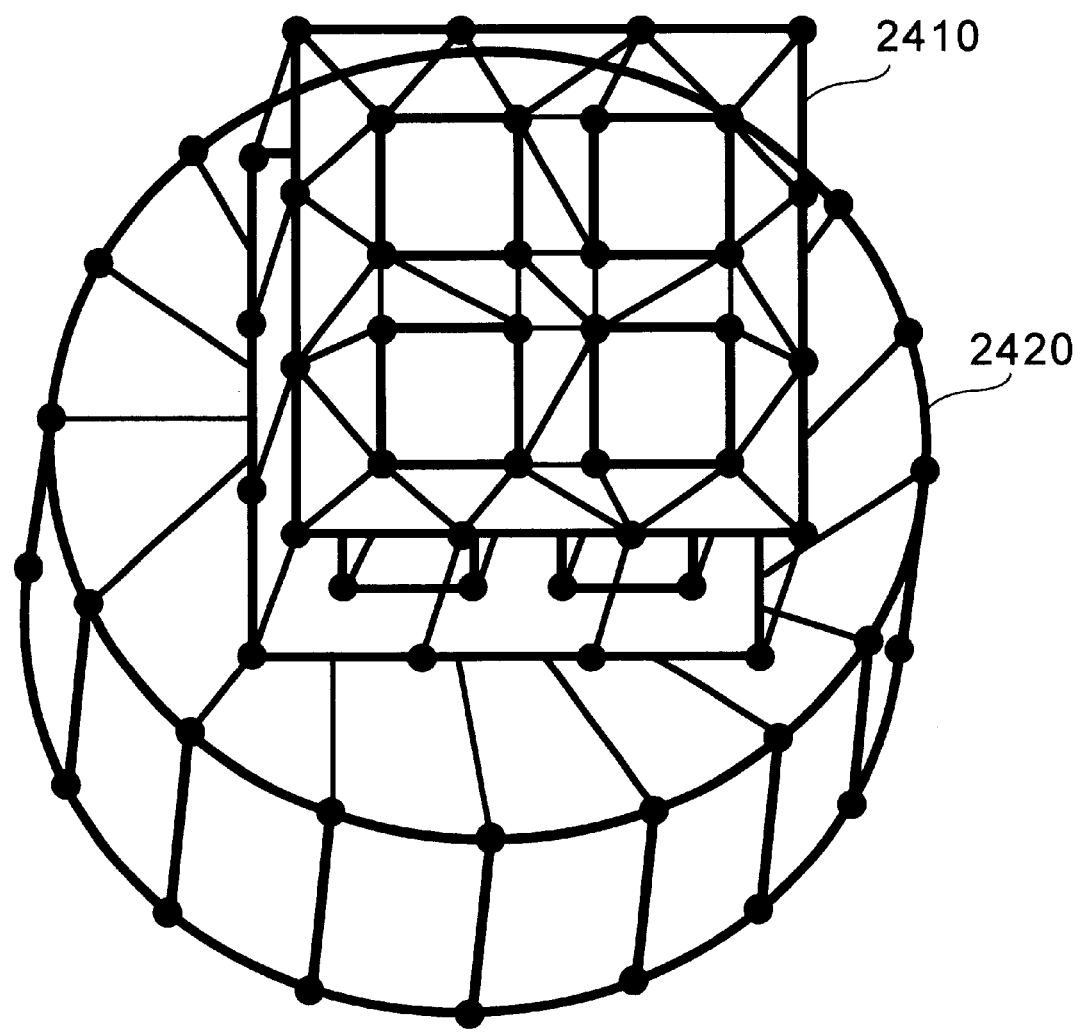
FIG. 24 shows a character with a base.

FIG. 24 shows an external view of a 3-D character "田" with a base generated according to the fourth embodiment.

As has been described, the present embodiment generates a base based on 3-D base data, and provides the generated base below a 3-D character. In this way, the present embodiment is capable of presenting ornamental 3-D characters, increasing the variety of ornamental representations.

Fifth Embodiment

The above fourth embodiment describes an example for which a 3-D character with a base is generated based on the 3-D base data. The present embodiment describes an example for which a 3-D character with a base is generated based on outline data of the base. Note that structure elements of the present embodiment that are the same as the fourth embodiment will not be described.

Figure 25:
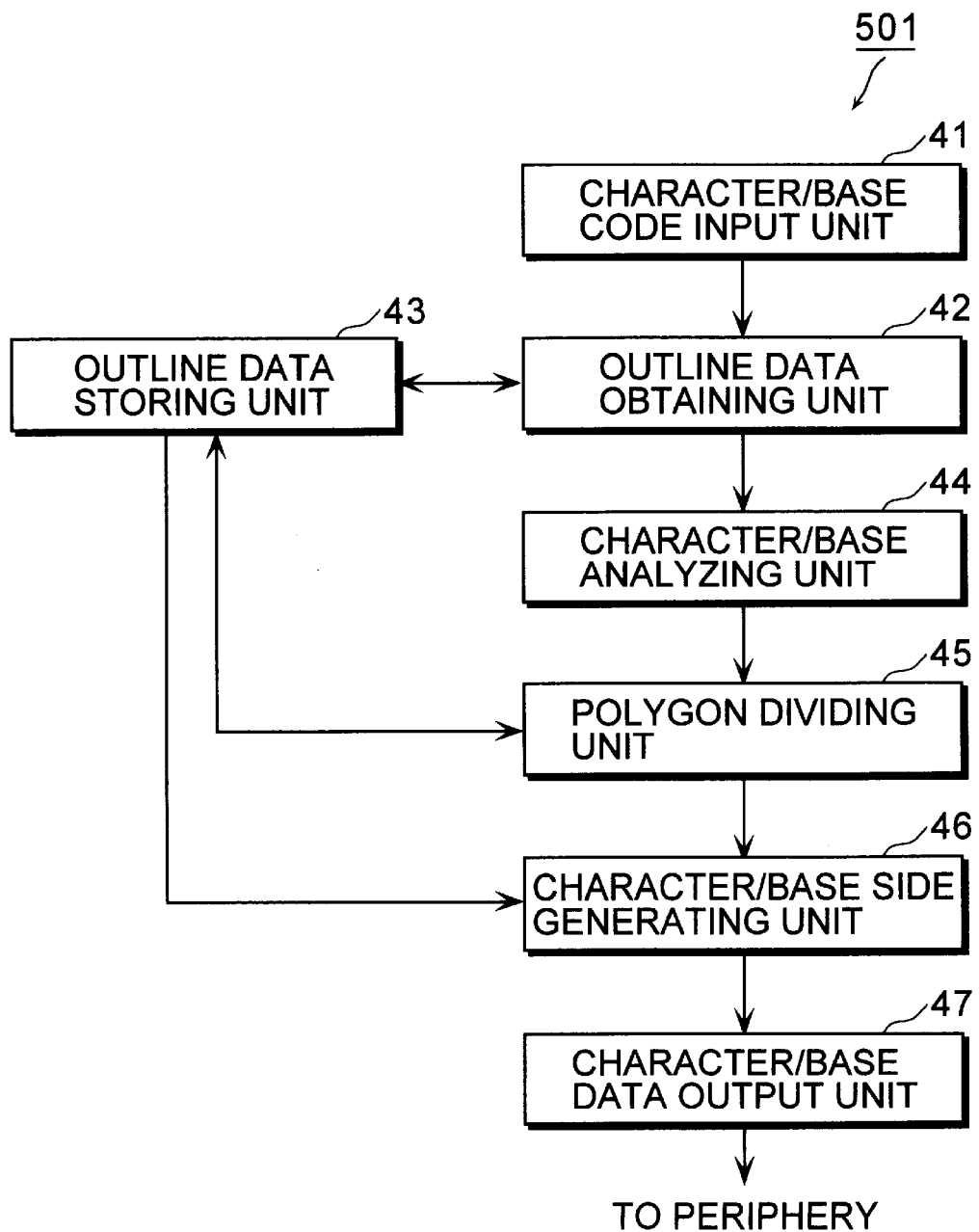
FIG. 25 is a block diagram showing a function configuration of a 3-D character data generating device according to the fifth embodiment.

FIG. 25 is a block diagram showing a function configuration of a 3-D character data generating device 501 according to the fifth embodiment. The 3-D character data generating device 501 includes a character/base code input unit 41, an outline data obtaining unit 42, an outline data storing unit 43, a character/base analyzing unit 44, a polygon dividing unit 45, a character/base side generating unit 46, and a character/base data output unit 47. The following describes the above 3-D form generating unit 501 in more detail.

Like the character code input unit 1 of the first embodiment, the character/base code input unit 41 is an input unit such as a keyboard and a mouse. The character/base code input unit 41 converts an input signal to generate a character code such as an ASCII code and a JIS code, and a base code that specifies outline data of a base. The generated character code and base code are sent to the outline data obtaining unit 42.

The outline data obtaining unit 42 obtains, from the outline data storing unit 43, outline data for a character associated with the above character code, and outline data associated the above base code.

The outline data storing unit 43 stores, in advance, outline data associated with character codes, as does the outline data storing unit 3 of the first embodiment. The outline data storing unit 43 additionally stores outline data associated with base codes. For a base in which a hole is formed, the outline data storing unit 43 also stores outline data of the hole.

The outline data obtaining unit 42 outputs the two sets of obtained outline data for the character and the base to the character/base analyzing unit 44.

The character/base analyzing unit 44 generates, separately for the character and the base, form analyzing information, as does the form analyzing unit 4 of the first embodiment. The generated form analyzing information specifies, for each hole of a character, a sole character part that includes the hole. For a base in which a hole is formed, the form analyzing information specifies a base that includes the hole. In this way, the form analyzing information shows inclusion relation between a hole and a character or a base. As in the fourth embodiment, the character/base analyzing unit 44 also calculates the following values: a boundary box corresponding to the whole character; center coordinates of this boundary box; a boundary box corresponding to the whole base; center coordinates of this boundary box for the base; and a base scaling quantity. The following describes this base scaling quantity. An "enlarged quadrangle" is produced by adding a predetermined margin quantity to the boundary box of the character. The base scaling quantity is a smallest quantity that allows this enlarged quadrangle to be contained in the boundary box of the base when the character boundary box is moved in such a way that the center of this boundary box coincides with the center of the boundary box of the base. The form analyzing information for the character and the base, the center coordinates of the character boundary box, center coordinates of the base boundary box, and the base scaling quantity are sent to the polygon dividing unit 45.

The polygon dividing unit 45 performs, for a character structure element, the same operation as described in the first embodiment. For a base structure element, the polygon dividing unit 45 performs scaling conversion on the base structure element by using the base scaling quantity. After this, the polygon dividing unit 45 moves this data for the base in parallel to itself in such a way that the center coordinates of the base boundary box coincides with center coordinates of the character boundary box. The polygon dividing unit 45 then performs, for the moved data for the base, the same operation as performed for the character structure element. Consequently, the polygon dividing unit 45 generates indexed surface data for each structure element of the character and the base, and outputs it to the character/base side generating unit 46.

The character/base side generating unit 46 generates a top plane, a bottom plane, and either a side plane or a bevel side of each character structure element and the base structure element, as do the side generating unit 6 of the first embodiment and the bevel side generating unit 11 of the second embodiment. The character/base side generating unit 46 also moves the base structure elements below and parallel to themselves in the direction of the z axis by an amount corresponding to the raised height. When the side plane of the base is generated by rotational conversion, reverse rotational conversion is performed on the side plane of the base by an amount corresponding to the original rotational conversion. By performing these operations, the character/base side generating unit 46 generates indexed surface data, separately for top, bottom, and side structure elements of the character and the base, and outputs it to the character/base data output unit 47.

The character/base data output unit 47 receives this indexed surface data for the character and the base, puts them together by using a hierarchical representation, and outputs it to the periphery. When the data needs to be converted into a data form that uses cylindrical coordinates or polar coordinates, the data is first converted into the data form, and then outputted.

Note that in the fourth and fifth embodiments, a bottom plane of a 3-D character may be omitted because it is connected to a base and therefore invisible. This omission can reduce the total data amount.

As has been described, the present embodiment generates a base having a cylindrical form or other form, based on outline data for the base, and provides the generated base below a 3-D character. In this way, the present embodiment is capable of presenting ornamental 3-D characters and increasing the variety of ornamental representations.

Sixth Embodiment

The sixth embodiment describes an example for which a 3-D engraving is generated. Note that structure elements of the present embodiment that are the same as the above embodiments will not be described.

Figure 26:
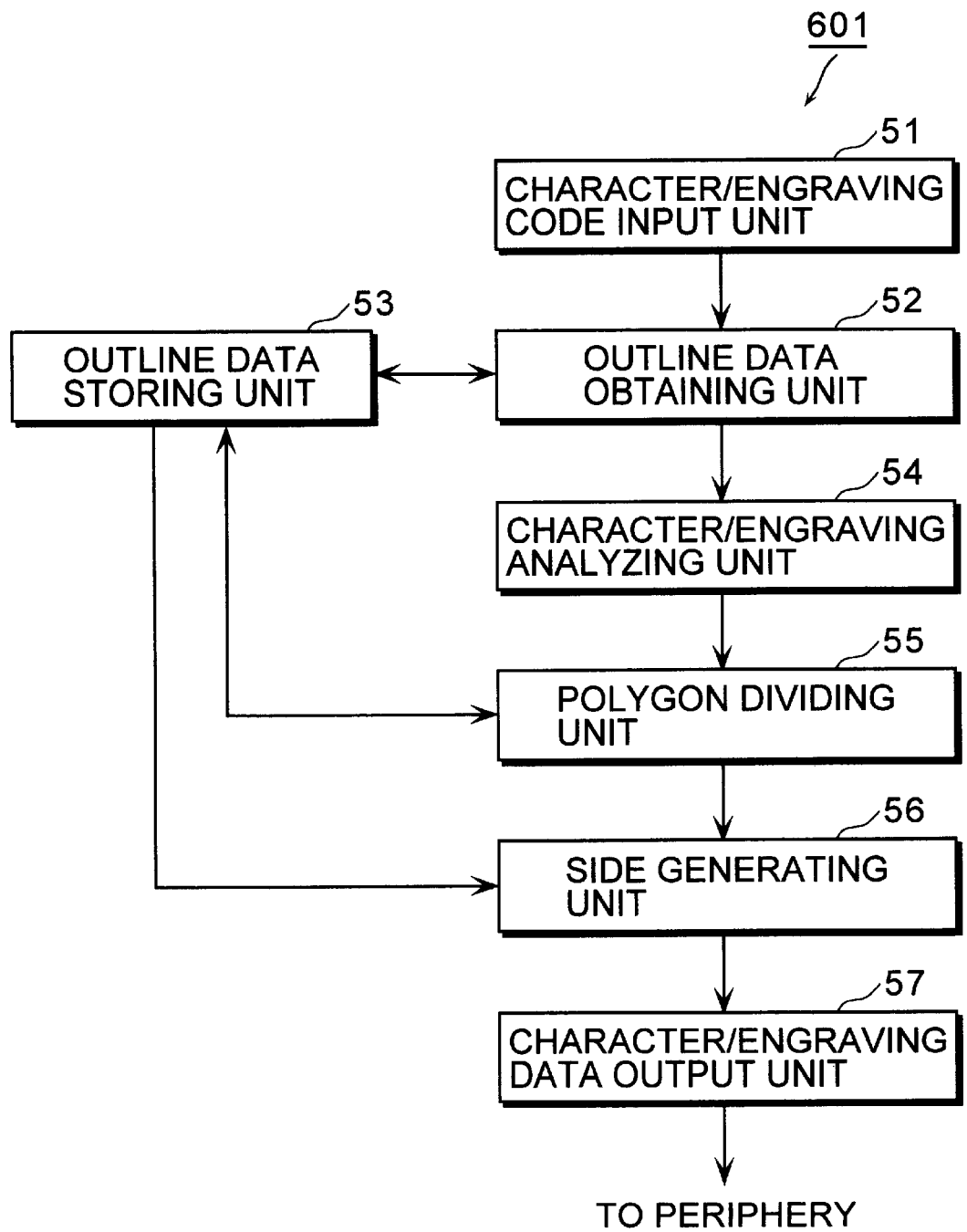
FIG. 26 is a block diagram showing a function configuration of a 3-D character data generating device according to the sixth embodiment.

FIG. 26 is a block diagram showing a function configuration of a 3-D character data generating device 601 according to the sixth embodiment. The 3-D character data generating device 601 includes a character/engraving code input unit 51, an outline data obtaining unit 52, an outline data storing unit 53, a character/engraving analyzing unit 54, a polygon dividing unit 55, a side generating unit 56, and a character/engraving data output unit 57. The following describes the above 3-D form generating unit 601 in more detail.

Like the character code input unit 1 of the first embodiment, the character/engraving code input unit 51 is an input unit such as a keyboard and a mouse. The character/engraving code input unit 51 converts an input signal to generate a character code such as an ASCII code and a JIS code. The character/engraving code input unit 51 also generates an engraving code that specifies outline data of an engraved base. The generated character code and engraving code are sent to the outline data obtaining unit 52.

The outline data obtaining unit 52 obtains, from the outline data storing unit 53, outline data for a character associated with the above character code, and outline data associated with the above engraving code.

The outline data storing unit 53 stores, in advance, outline data associated with character codes, as does the outline data storing unit 3 of the first embodiment. The outline data storing unit 53 additionally stores outline data, which is associated with engraving codes, of engraved bases. For an engraved base in which a hole is formed, the outline data storing unit 53 stores outline data of the hole.

The outline data obtaining unit 52 outputs the obtained outline data for the character and the engraved base to the character/engraving analyzing unit 54.

The character/engraving analyzing unit 54 calculates the following values: a rectangular boundary box corresponding to the whole character; center coordinates of this rectangular boundary box; a rectangular boundary box corresponding to the whole engraving base; center coordinates of this rectangular boundary box for the engraving base; and an engraving scaling quantity. The following describes this engraving scaling quantity. An "enlarged rectangle" is produced by adding a predetermined margin quantity to the rectangular boundary box of the character. The engraving scaling quantity is a smallest quantity that allows this enlarged rectangle to be contained in the boundary box of the engraved base when the character boundary box is moved in such a way that the center of this boundary box coincides with the center of the boundary box of the engraved base. Following this, the character/engraving analyzing unit 54 performs scaling conversion on a point sequence of the engraved base outline by using the engraving scaling quantity. The analyzing unit 54 then regards, as new outline data of the engraved base, the scaling-converted point sequence of the engraved base outline that is moved in parallel to itself in such a way that the center coordinates of the rectangular boundary box of the engraved base outline generated after the scaling conversion coincide with the center coordinates of the rectangular boundary box of the character.

The character/engraving analyzing unit 54 also generates form analyzing information separately for the character outline data and the new outline data of the engraved base in a similar way to the form analyzing unit 4 of the first embodiment. The generated form analyzing information specifies, for each hole of a character, a sole character part that includes the hole. For an engraved base in which a hole is formed, the form analyzing information specifies the engraved base that includes the hole. In this way, the form analyzing information shows inclusion relation between a hole and a character or an engraved base. This analyzing information for the engraved base outline corresponds to a bottom plane of the engraved base. The analyzing unit 54 also generates another form analyzing information corresponding to the top plane of the engraved base in a similar way to the form analyzing unit 4 of the first embodiment. This analyzing information is produced for data in which the following two sets of data are combined: (a) a character outline point sequence whose points are arranged in order used to arrange points forming a character hole; and (b) a hole outline point sequence whose points are arranged in order used to arrange points forming a character outline.

Figure 27A:
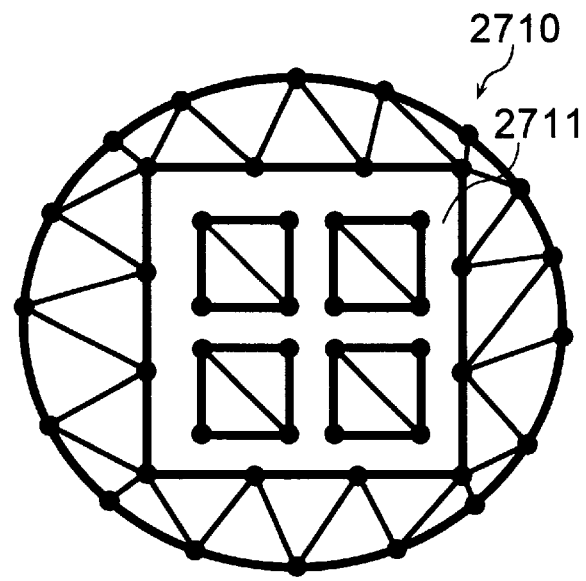
FIG. 27A shows a top plane of an engraving.
Figure 27B:
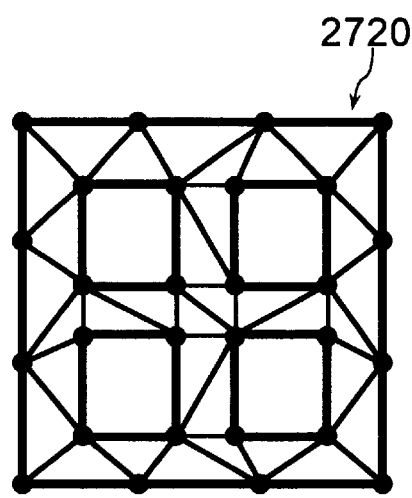
FIG. 27B shows a bottom surface of a pit portion of the engraving.
Figure 27C:
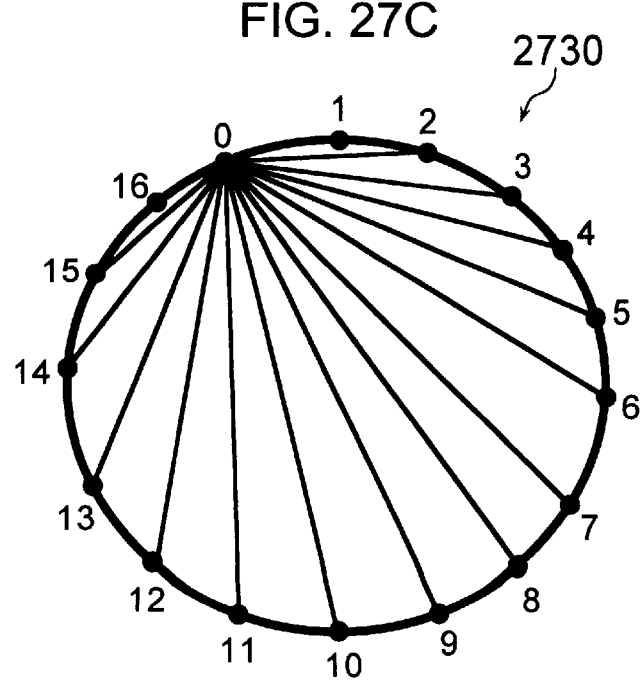
FIG. 27C shows a bottom plane of the engraving.

The polygon dividing unit 55 performs operation for each of top and bottom structure elements of the character and the engraved base, as does the top/bottom dividing unit 5 of the first embodiment. FIGS. 27A–27C show an example state obtained after the polygon division is performed. In this example, top and bottom planes of the character and the engraved base are shown. As a result of the above operations, the polygon dividing unit 55 generates indexed surface data for each top/bottom plane structure element of the character and the engraved base, and outputs it to the side generating unit 56.

The side generating unit 56 generates a top plane, a bottom plane, and either a side plane or a bevel side of each structure element of the engraved base, as do the side generating unit 6 of the first embodiment and the bevel side generating unit 11 of the second embodiment. After this, the side generating unit 56 moves each top plane structure element of the character below in a direction of the z axis with respect to a z-axis-directional position of the engraved base's top plane, so that a bottom surface of a pit portion on the top plane of the engraved base is generated. Lastly, the side generating unit 56 generates a side plane of the pit portion by connecting points forming the bottom surface of the pit portion, and corresponding points forming the top plane of the engraved base in a similar way to the side generating unit 6 of the first embodiment. When doing to, the side generating unit 56 changes order of indexes into order opposite to the above first embodiment.

As a result of the above operations, the side generating unit 56 generates indexed surface data for top, bottom, and side structure elements of the character and the engraved base, and outputs them to the character/engraving data output unit 57.

The character/engraving data output unit 57 receives this indexed surface data for the character and the engraved base, puts them together by using a hierarchical representation, and outputs it to the periphery. When the data needs to be converted into a data form that uses cylindrical coordinates or polar coordinates, the data is first converted, and then outputted.

As has been described, the 3-D character data generating device 601 of the present embodiment is capable of generating an engraving containing a 3-D character, based on outline data of an engraved base. This achieves complex representation of a 3-D character having a concave form.

Operations described in the above first to sixth embodiments may be applied to a character sequence by performing the operations on each character in the character sequence in order. It is also possible to provide a single (engraved) base to a character sequence by enlarging a boundary box of a single character to that of the character sequence, and then performing the above operations.

The above embodiments have been described by mainly using an example in which a character having a hole is processed. However, the above devices according to the present invention can generate 3-D data that allows high-definition 3-D graphics having holes to be automatically displayed.

Industrial Applicability

The 3-D character generating device and the 3-D graphics generating device of the present invention is useful as a 3-D data generating device for generating 3-D data used to represent 3-D characters and 3-D graphics in computer graphics. The devices of the present invention are also useful as a title generator (a "titler") that generates 3-D characters and 3-D graphics that are used by an editing device for a broadcast screen or used in website pages. The devices of the present invention are especially useful when 3-D characters and 3-D graphics are generated from their outline data.

What is claimed is:

1. A three-dimensional (3-D) character data generating device for generating 3-D character data from two-dimensional (2-D) character data, comprising:
   an outline specifying means for specifying: (a) a first outline that is an outline of a character part included in a character; and (b) a second outline that is an outline of a hole formed in the character, in accordance with the 2-D character data;
   an inclusion relation specifying means for specifying a first outline of a character part, which bears inclusion relation to the specified second outline and exists nearest the hole, wherein the inclusion relation shows that the first outline includes the second outline;
   a dividing means for dividing an area enclosed by the first outline specified by the inclusion relation specifying means into polygons, wherein the area excludes a portion enclosed by the hole, wherein the dividing means also divides a whole area enclosed by a first outline that is not specified by the inclusion relation specifying means; and
   a side generating means for moving a duplicate of the character part containing the divided area, and generating a side plane based on vertexes of the duplicate and vertexes of the original character part.

2. The 3-D character data generating device of claim 1, wherein the 2-D character data is outline data that is defined in a 2-D plane provided with coordinates to show the first and second outlines,
   wherein the outline specifying means: (a) obtains the outline data; (b) distinguishes the first outline data from the second outline data in the obtained outline data; and (c) specifies the first and second outlines in accordance with the first and second outline data, respectively.

3. The 3-D character data generating device of claim 2, wherein the dividing means regards, as a structure element, (a) the area which is enclosed by the first outline specified by the inclusion relation specifying means and (b) the whole area enclosed by the first outline that is not specified by the inclusion relation specifying means, divides each structure element into convex polygons, and generates structure element data showing the divided structure element.

4. The 3-D character data generating device of claim 3, wherein the side generating means moves a duplicate of the divided structure element in a direction perpendicular to the 2-D plane, and generates side data representing a side plane in accordance with vertexes of the duplicate and vertexes of the original structure element.

5. The 3-D character data generating device of claim 4, wherein the first outline data contains a sequence of points, which represent the first outline and are arranged either clockwise or counterclockwise,
   wherein the second outline data contains a sequence of points, which represent the second outline and are arranged in a direction opposite to a direction in which the sequence of points representing the first outline are arranged and
   wherein the outline specifying means makes the distinction based on a direction of each sequence of points.

6. The 3-D character data generating device of claim 5, wherein the inclusion relation specifying means includes:
   a first detecting unit for detecting a first rectangle that surrounds a first outline;
   a second detecting unit for detecting a second rectangle that surrounds the second outline;
   a first specifying unit for comparing each detected first rectangle with the detected second rectangle, and specifying at least one first rectangle which surrounds the second rectangle;
   a second specifying unit for specifying a first outline surrounded by an innermost first rectangle out of the at least one first rectangle; and
   a relation information generating unit for regarding the specified first outline as a sole first outline surrounding the second outline, and generating inclusion relation information showing inclusion relation between the sole first outline and the second outline.

7. The 3-D character data generating device of claim 6, wherein the side generating means includes:
a top/bottom generating unit for generating top/bottom data showing top and bottom planes of 3-D graphics in accordance with: (a) the generated structure element data; and (b) data obtained by moving a duplicate of the structure element data in a direction perpendicular to the 2-D plane, wherein the generated top/bottom data includes rim data showing rims of the top and bottom planes;
an intermediate outline generating unit for generating, in accordance with the rim data, intermediate outline data showing an intermediate outline; and
a side generating unit for connecting vertexes of the intermediate outline and vertexes of the rims to generate the side plane and the side data.

8. The 3-D character data generating device of claim 7, wherein the intermediate outline generating unit generates the intermediate outline data by: (a) calculating a normal vector of a vector formed by two consecutive points out of vertexes of a rim of either the top plane or the bottom plane, the two consecutive points representing a starting point and an endpoint of the vector; (b) specifying an intermediate point, which corresponds to the starting point and exists on the intermediate outline in accordance with:
x-y coordinates obtained by multiplying the normal vector by a factor;
x-y coordinates of the starting point; and
a predetermined z coordinate; and
(c) specifying, for the entire rim, each intermediate point forming the intermediate outline to generate the intermediate outline data.

9. The 3-D data character data generating device of claim 8, further comprising:
a texture coordinate generating means for: (a) generating a smallest square enclosing the top and bottom planes of the structure element; (b) translating the smallest square in a manner that the smallest square encloses sequences of points defining the top and bottom planes; (c) specifying each coordinate of the translated smallest square; (d) dividing each specified coordinate by a length of a side of the square; (e) regarding each divided coordinate as a mapping coordinate; (f) calculating a first ratio between a total of lengths between every two consecutive points in a sequence of points defining the generated side plane, and a total of lengths between every two consecutive points out of points that start with a starting point of the sequence and end with a given point; (g) calculating a second ratio between a height from the bottom plane to the top plane, and a height of a given point; and (h) generating texture coordinates based on the first ratio and the second ratio.

10. The 3-D character data generating device of claim 8, further comprising:
a texture coordinate generating means for: (a) providing a cylinder containing either one or all of structure elements; (b) defining normalized cylindrical coordinate system in the cylinder; (c) projecting each vertex of each structure element based on center coordinates of the cylinder; and (d) generating texture coordinates by using coordinates in the cylindrical coordinate system.

11. The 3-D character data generating device of claim 8, further comprising:
a texture coordinate generating means for: (a) providing a sphere containing either one of all of structure elements; (b) defining normalized polar coordinate system in the sphere; (c) projecting each vertex of each structure element based on center coordinates of the sphere; and (d) generating texture coordinates by using coordinates in the polar coordinate system.

12. The 3-D character data generating device of claim 5, wherein the inclusion relation specifying means includes:
a first detecting unit for detecting a first rectangle that surrounds a first outline;
a second detecting unit for detecting a second rectangle that surrounds the second outline;
a length detecting unit for detecting a shortest distance out of: (a) a length from a barycenter of the second rectangle to a side of the first rectangle; and (b) a length from the barycenter to a point in a sequence of points related to a character part corresponding to the detected first rectangle; and
a relation information generating unit for: (a) selecting a shortest length out of shortest lengths detected by the length detecting means for every character part making up the character; (b) judging that a first outline related to the selected shortest length is a sole first outline containing the second outline; and (c) generating inclusion relation information showing inclusion relation between the sole first outline and the second outline.

13. The 3-D character data generating device of claim 5, further comprising:
a data interpolating means for: (a) dividing, by a predetermined value, an average length between two consecutive points in the sequence of points, which are included in either the first outline data or the second outline data, so that a standard length is produced; and (b) interpolating at least one intermediate point between two consecutive points so as to make a length between the two consecutive points either equal to or shorter than the standard length.

14. The 3-D character data generating device of claim 3, further comprising:
a re-dividing means for re-dividing the convex polygons produced by the dividing means.

15. A three-dimensional (3-D) character data generating device, comprising:
a receiving means for receiving a character code and a base code, which are associated with a character and a base, respectively;
a character/base form storing means for storing outline data of the character, and storing 3-D data of the base;
a character/base form obtaining means for obtaining the stored outline data and the stored 3-D data according to the received character code and base code;
a character analyzing means for: (a) analyzing inclusion relation between an outline of the character and an outline of a hole formed in the character in accordance with the obtained outline data, wherein the inclusion relation shows that the outline of the character includes the outline of the hole; (b) specifying a structure element of the character; and (c) calculating a condition that allows the character to lie on a top plane of the base;
a base form generating means for converting the 3-D data in accordance with the calculated condition;

a top/bottom dividing means for dividing each specified structure element into convex polygons; and a character side generating means for moving each divided structure element to generate a top plane, a bottom plane, and a side plane of the character in 3-D.

16. A three-dimensional (3-D) character data generating device, comprising:

a receiving means for receiving a character code and a base code, which are associated with a character and a base, respectively;

a character/base form storing means for storing outline data of the character, and outline data of the base;

a character/base form obtaining means for obtaining the stored outline data of the character, and the stored outline data of the base according to the received character code and base code;

a character/base analyzing means for: (a) analyzing inclusion relation between an outline of the character and an outline of a hole formed in the character in accordance with the obtained outline data of the character, wherein the inclusion relation shows that the outline of the character includes the outline of the hole; (b) specifying a structure element of the character; (c) analyzing inclusion relation between an outline of the base and an outline of a hole formed in the base, in accordance with the obtained outline data of the base, wherein the inclusion relation shows that the outline of the base includes the outline of the hole; (d) specifying a structure element of the base; and (e) calculating a condition that allows the character to lie inside the outline of the base;

a character/base dividing means for: (a) dividing each specified structure element into convex polygons; (b) converting data representing each structure element of the base in accordance with the calculated condition; and (d) dividing each structure element related to the converted data into convex polygons; and a character/base generating means for moving each divided structure element to generate top planes, bottom planes, and side planes of the character and the base in 3-D.

17. The 3-D character data generating device of claim 16, wherein the character/base generating means generates the side planes having a bevel form.

18. A three-dimensional (3-D) character data generating device, comprising:

a receiving means for receiving a character code and a base code, which are associated with a character and an engraved base, respectively;

a character/base form storing means for storing outline data of the character, and outline data of the engraved base;

a character/base form obtaining means for obtaining the stored outline data of the character, and the stored outline data of the engraved base according to the received character code and base code;

a character/base analyzing means for: (a) analyzing inclusion relation between an outline of the character and an outline of a hole formed in the character in accordance with the obtained outline data of the character, wherein the inclusion relation shows that the outline of the character includes the outline of the hole; (b) specifying a structure element of the character; (c) calculating a condition that allows the character to lie inside the outline of the engraved base; (d) converting the outline data of the engraved base in accordance with the calculated condition; (e) analyzing inclusion relation between the outline of the engraved base and a hole formed in the engraved base in accordance with the converted outline data, wherein the inclusion relation shows that the outline of the engraved base includes the outline of the hole; (f) specifying a structure element of a bottom plane of the engraved base; (g) regarding a sequence of points representing the character outline as a sequence of points representing a hole outline, and regarding a sequence of points representing the hole outline as a sequence of points representing a character outline, so that new outline data of the character is generated; (h) combining the new outline data with the converted outline data of the engraved base, so that combination outline data is generated; and (i) analyzing inclusion relation between an outline related to the converted outline data and an outline related to the new outline data in accordance with the combination outline data to specify a structure element of a top plane of the engraved base;

a character/base dividing means for dividing each structure element specified by the character/base analyzing means into convex polygons; and a character/base side generating means for moving each divided structure element of the engraved base to generate the top plane, the bottom plane, and a side plane, and moving the structure element of the top plane of the character by a predetermined depth to generate a bottom surface and a side surface of a pit portion of the engraved base.

19. The 3-D character data generating device of claim 18, wherein the character/base side generating means generates the side planes having a bevel form.

20. A three-dimensional (3-D) graphics data generating device for generating 3-D graphics data from two-dimensional (2-D) graphics data, comprising:

an outline specifying means for specifying: (a) a first outline that is an outline of a graphic part included in a graphic; and (b) a second outline that is an outline of a hole formed in the graphic, in accordance with the 2-D graphic data;

an inclusion relation specifying means for specifying a first outline of a graphic part, which bears inclusion relation to the specified second outline and exists nearest the hole, wherein the inclusion relation shows that the first outline includes the second outline;

a dividing means for dividing an area enclosed by the first outline specified by the inclusion relation specifying means into polygons, wherein the area excludes a portion enclosed by the hole, wherein the dividing means also divides a whole area enclosed by a first outline that is not specified by the inclusion relation specifying means; and a side generating means for moving a duplicate of the graphic part containing the divided area, and generating a side plane based on vertexes of the duplicate and vertexes of the original graphic part.

21. The 3-D graphics data generating device of claim 20, wherein the 2-D graphic data is outline data that is defined in a 2-D plane provided with coordinates to show the first and second outlines, wherein the outline specifying means: (a) obtains the outline data; (b) distinguishes the first outline data from the second outline data in the obtained outline data; and (c) specifies the first and second outlines in accordance with the first and second outline data, respectively.

22. The 3-D graphics data generating device of claim 21,
wherein the dividing means regards, as a structure element, (a) the area which is enclosed by the first outline specified by the inclusion relation specifying means and (b) the whole area enclosed by the first outline that is not specified by the inclusion relation specifying means, divides each structure element into convex polygons, and generates structure element data showing the divided structure element.

23. The 3-D graphics data generating device of claim 22,
wherein the side generating means moves a duplicate of the divided structure element in a direction perpendicular to the 2-D plane, and generates side data representing a side plane based on vertexes of the duplicate and vertexes of the original structure element.

24. The 3-D graphics data generating device of claim 23,
wherein the first outline data contains a sequence of points, which represent the first outline and are arranged either clockwise or counterclockwise,
wherein the second outline data contains a sequence of points, which represent the second outline and are arranged in a direction opposite to a direction in which the sequence of points representing the first outline are arranged and
wherein the outline specifying means makes the distinction based on a direction of each sequence of points.

25. The 3-D graphics data generating device of claim 24,
wherein the inclusion relation specifying means includes:
a first detecting unit for detecting a first rectangle that surrounds a first outline;
a second detecting unit for detecting a second rectangle that surrounds the second outline;
a first specifying unit for comparing each detected first rectangle with the detected second rectangle, and specifying at least one first rectangle which surrounds the second rectangle;
a second specifying unit for specifying a first outline surrounded by an innermost first rectangle out of the at least one first rectangle; and
a relation information generating unit for regarding the specified first outline as a sole first outline surrounding the second outline, and generating inclusion relation information showing inclusion relation between the sole first outline and the second outline.

26. The 3-D graphics data generating device of claim 24,
wherein the inclusion relation specifying means includes:
a first detecting unit for detecting a first rectangle that surrounds a first outline;
a second detecting unit for detecting a second rectangle that surrounds the second outline;
a length detecting unit for detecting a shortest distance out of: (a) a length from a barycenter of the second rectangle to a side of the first rectangle; and (b) a length from the barycenter to a point in a sequence of points related to a graphic part corresponding to the detected first rectangle; and
a relation information generating unit for: (a) selecting a shortest length out of shortest lengths detected by the length detecting means for every graphic part making up the graphic; (b) judging that a first outline related to the selected shortest length is a sole first outline containing the second outline; and (c) generating inclusion relation information showing inclusion relation between the sole first outline and the second outline.

27. A method for generating 3-D character data from two-dimensional (2-D) character data, the method including:
an outline specifying step for specifying: (a) a first outline that is an outline of a character part included in a character; and (b) a second outline that is an outline of a hole formed in the character, in accordance with the 2-D character data;
an inclusion relation specifying step for specifying a first outline of a character part, which bears inclusion relation to the specified second outline and exists nearest the hole, wherein the inclusion relation shows that the first outline includes the second outline;
a dividing step for dividing an area enclosed by the first outline specified in the inclusion relation specifying step into polygons, wherein the area excludes a portion enclosed by the hole, wherein in the dividing step, a whole area enclosed by a first outline that is not specified by the inclusion relation specifying means is also divided; and
a side generating step for moving a duplicate of the character part containing the divided area, and generating a side plane based on vertexes of the duplicate and vertexes of the original character part.

28. A program for generating 3-D character data from two-dimensional (2-D) character data, the program including:
an outline specifying step for specifying: (a) a first outline that is an outline of a character part included in a character; and (b) a second outline that is an outline of a hole formed in the character, in accordance with the 2-D character data;
an inclusion relation specifying step for specifying a first outline of a character part, which bears inclusion relation to the specified second outline and exists nearest the hole, wherein the inclusion relation shows that the first outline includes the second outline;
a dividing step for dividing an area enclosed by the first outline specified in the inclusion relation specifying step into polygons, wherein the area excludes a portion enclosed by the hole, wherein in the dividing step, a whole area enclosed by a first outline that is not specified by the inclusion relation specifying means is also divided; and
a side generating step for moving a duplicate of the character part containing the divided area, and generating a side plane based on vertexes of the duplicate and vertexes of the original character part.

29. A computer readable recording medium storing a program for generating 3-D character data from two-dimensional (2-D) character data, the program including:
an outline specifying step for specifying: (a) a first outline that is an outline of a character part included in a character; and (b) a second outline that is an outline of a hole formed in the character, in accordance with the 2-D character data;
an inclusion relation specifying step for specifying a first outline of a character part, which bears inclusion relation to the specified second outline and exists nearest the hole, wherein the inclusion relation shows that the first outline includes the second outline;
a dividing step for dividing an area enclosed by the first outline specified in the inclusion relation specifying step into polygons, wherein the area excludes a portion enclosed by the hole, wherein in the dividing step, a whole area enclosed by a first outline that is not specified by the inclusion relation specifying means is also divided; and a side generating step for moving a duplicate of the character part containing the divided area, and generating a side plane based on vertexes of the duplicate and vertexes of the original character part.

30. A method for generating 3-D graphic data from two-dimensional (2-D) graphic data, the method including:

an outline specifying step for specifying: (a) a first outline that is an outline of a graphic part included in a graphic; and (b) a second outline that is an outline of a hole formed in the graphic, in accordance with the 2-D graphic data;

an inclusion relation specifying step for specifying a first outline of a graphic part, which bears inclusion relation to the specified second outline and exists nearest the hole, wherein the inclusion relation shows that the first outline includes the second outline;

a dividing step for dividing an area enclosed by the first outline specified in the inclusion relation specifying step into polygons, wherein the area excludes a portion enclosed by the hole, wherein in the dividing step, a whole area enclosed by a first outline that is not specified by the inclusion relation specifying means is also divided; and a side generating step for moving a duplicate of the graphic part containing the divided area, and generating a side plane based on vertexes of the duplicate and vertexes of the original graphic part.

31. A program for generating 3-D graphic data from two-dimensional (2-D) graphic data, the program including:

an outline specifying step for specifying: (a) a first outline that is an outline of a graphic part included in a graphic; and (b) a second outline that is an outline of a hole formed in the graphic, in accordance with the 2-D graphic data;

an inclusion relation specifying step for specifying a first outline of a graphic part, which bears inclusion relation to the specified second outline and exists nearest the hole, wherein the inclusion relation shows that the first outline includes the second outline;

a dividing step for dividing an area enclosed by the first outline specified in the inclusion relation specifying step into polygons, wherein the area excludes a portion enclosed by the hole, wherein in the dividing step, a whole area enclosed by a first outline that is not specified by the inclusion relation specifying means is also divided; and a side generating step for moving a duplicate of the graphic part containing the divided area, and generating a side plane based on vertexes of the duplicate and vertexes of the original graphic part.

32. A computer readable recording medium storing a program for generating 3-D graphic data from two-dimensional (2-D) graphic data, the program including:

an outline specifying step for specifying: (a) a first outline that is an outline of a graphic part included in a graphic; and (b) a second outline that is an outline of a hole formed in the graphic, in accordance with the 2-D graphic data;

an inclusion relation specifying step for specifying a first outline of a graphic part, which bears inclusion relation to the specified second outline and exists nearest the hole, wherein the inclusion relation shows that the first outline includes the second outline;

a dividing step for dividing an area enclosed by the first outline specified in the inclusion relation specifying step into polygons, wherein the area excludes a portion enclosed by the hole, wherein in the dividing step, a whole area enclosed by a first outline that is not specified by the inclusion relation specifying means is also divided; and a side generating step for moving a duplicate of the graphic part containing the divided area, and generating a side plane based on vertexes of the duplicate and vertexes of the original graphic part.

* * * * *